United States Patent
Ikeda et al.

(10) Patent No.: US 11,216,179 B2
(45) Date of Patent: Jan. 4, 2022

(54) INFORMATION PROCESSING APPARATUS AND INFORMATION PROCESSING METHOD

(71) Applicant: SONY CORPORATION, Tokyo (JP)

(72) Inventors: Tetsuo Ikeda, Tokyo (JP); Eisuke Fujinawa, Tokyo (JP); Kosuke Yoshitomi, Kanagawa (JP); Masaki Handa, Kanagawa (JP); Junji Otsuka, Kanagawa (JP); Kenji Gotoh, Chiba (JP); Katsuji Miyazawa, Tokyo (JP); Shoji Watanabe, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/969,515

(22) PCT Filed: Jan. 23, 2019

(86) PCT No.: PCT/JP2019/001996
§ 371 (c)(1),
(2) Date: Aug. 12, 2020

(87) PCT Pub. No.: WO2019/163372
PCT Pub. Date: Aug. 29, 2019

(65) Prior Publication Data
US 2020/0409547 A1    Dec. 31, 2020

(30) Foreign Application Priority Data
Feb. 20, 2018 (JP) .............................. JP2018-027881

(51) Int. Cl.
*G06F 3/0488* (2013.01)
*G06F 3/01* (2006.01)
*G06F 9/54* (2006.01)

(52) U.S. Cl.
CPC .......... *G06F 3/04883* (2013.01); *G06F 3/011* (2013.01); *G06F 3/017* (2013.01); *G06F 9/542* (2013.01)

(58) Field of Classification Search
CPC ...... G06F 3/04883; G06F 3/011; G06F 3/017; G06F 2203/04101; G06F 2203/04108;
(Continued)

(56) References Cited

U.S. PATENT DOCUMENTS 8,971,572 B1 * 3/2015 Yin .................... G06K 9/00624
382/103
9,477,324 B2 * 10/2016 Ajmera ................ G06F 3/0304
(Continued)

FOREIGN PATENT DOCUMENTS

| CN | 101751222 A | 6/2010 |
| CN | 104816726 A | 8/2015 |

(Continued)

OTHER PUBLICATIONS

International Search Report and Written Opinion of PCT Application No. PCT/JP2019/001996, dated Apr. 23, 2019, 08 pages of ISRWO.

*Primary Examiner* — Mong-Shune Chung
(74) *Attorney, Agent, or Firm* — Chip Law Group

(57) ABSTRACT

Provided is an information processing apparatus including a processing unit that determines an angle between at least a part of an upper limb of a user and one of a vector or a plane. The processing unit further determines whether an operation of the user is a pointing operation or a hover operation on the basis of the angle that is between at least the part of the upper limb of the user and one of the vector or the plane.

21 Claims, 53 Drawing Sheets

(58) Field of Classification Search
CPC ........ G06F 3/041; G06F 3/042; G06F 3/0425;
G06K 9/00355; G06K 9/00375
See application file for complete search history.

(56) References Cited

U.S. PATENT DOCUMENTS

| | | | | |
|---|---|---|---|---|
| 2006/0227116 | A1* | 10/2006 | Zotov | G06F 3/0418 345/173 |
| 2010/0177121 | A1 | 7/2010 | Homma et al. | |
| 2013/0147793 | A1* | 6/2013 | Jeon | G06F 3/0488 345/419 |
| 2015/0062004 | A1* | 3/2015 | Rafii | G06F 3/0304 345/156 |
| 2015/0217781 | A1 | 8/2015 | Lee et al. | |
| 2015/0277760 | A1* | 10/2015 | Tagaya | G06F 3/04886 715/711 |

FOREIGN PATENT DOCUMENTS

| | | |
|---|---|---|
| EP | 2933713 A1 | 10/2015 |
| JP | 2010-140321 A | 6/2010 |
| JP | 2013-214238 A | 10/2013 |
| JP | 2014-092988 A | 5/2014 |
| JP | 2015-090524 A | 5/2015 |
| JP | 2017-211884 A | 11/2017 |
| KR | 10-2015-0092561 A1 | 8/2015 |
| WO | 2014/069504 A1 | 5/2014 |

\* cited by examiner

FIG.24

| ATTRIBUTE | FORMAT | DESCRIPTION |
|---|---|---|
| identifier | INTEGER TYPE | UNIQUE FINGER ID |
| gestureType | ENUMERATION TYPE | DETERMINED OPERATION TYPE (TAP, DRAG, HOVER, POINTING) |
| spacePositionX | FLOATING POINT NUMBER TYPE | FINGERTIP x-POSITION IN SPACE |
| spacePositionY | FLOATING POINT NUMBER TYPE | FINGERTIP y-POSITION IN SPACE |
| spacePositionZ | FLOATING POINT NUMBER TYPE | FINGERTIP z-POSITION IN SPACE |
| rotX | FLOATING POINT NUMBER TYPE | FINGERTIP x-AXIS ROTATION ANGLE |
| rotY | FLOATING POINT NUMBER TYPE | FINGERTIP y-AXIS ROTATION ANGLE |
| rotZ | FLOATING POINT NUMBER TYPE | FINGERTIP z-AXIS ROTATION ANGLE |
| screenPositionX | FLOATING POINT NUMBER TYPE | x-POSITION ON PROJECTION SURFACE MATCH spacePositionX IN CASE OF TAP, DRAG, AND HOVER INTERSECTION WITH PROJECTION SURFACE IN CASE OF POINTING |
| screenPositionY | FLOATING POINT NUMBER TYPE | y-POSITION ON PROJECTION SURFACE MATCH spacePositionY IN CASE OF TAP, DRAG, AND HOVER INTERSECTION WITH PROJECTION SURFACE IN CASE OF POINTING |

FIG.25

```
enum gestureType
{
        gestureType_Tap = 0,
        gestureType_Drag,
        gestureType_Hover,
        gestureType_Pointing
};

enum detectionType
{
        detectionType_FingerZ = 0,
        detectionType_HandHorizontalAngle,
        detectionType_FingerJointAngle,
        detectionType_ArmJointAngle,
        detectionType_EyeAndHandIntersection,
        detectionType_ThumbAndIndexFingerAngle,
        detectionType_EyeAndHandAngle
};

struct handData
{
        int identifier;
        gestureType type;
        float spacePositionX;
        float spacePositionY;
        float spacePositionZ;
        float rotX;
        float rotY;
        float rotZ;
        float screenPositionX;
        float screenPositionY;
};

class gestureDetectionListener
{
        virtual void onGestureDetected(handData data) = 0;
};

class gestureDetector
{
public:
        int addDetectionProcess(detectionType type, float weight);
        void startDetection(gestureDetectionListener* listener);
};
```

FIG.26

```
class myListener : gestureDetectionListener
{
    gestureDetector* detector;

void initialize()
    {
        detector = new gestureDetector();

// IN CASE WHERE ONE DETERMINATION PROCESS IS USED
        detector->addDetectionProcess(detectionType_FingerZ, 1.0f);

// IN CASE WHERE TWO DETERMINATION PROCESSES ARE USED TOGETHER
        detector->addDetectionProcess(detectionType_FingerJointAngle, 0.6f);
        detector->addDetectionProcess(detectionType_ArmJointAngle, 0.4f);

// START DETECTION
        detector->startDetection(this);
    };

virtual void onGestureDetected(handData data)
    {
        switch (data.type)
        {
            case gestureType_Tap:
            {
                // TAP PROCESS
                break;
            }
            case gestureType_Drag:
            {
                // DRAG PROCESS
                break;
            }
            case gestureType_Hover:
            {
                // HOVER PROCESS
                break;
            }
            case gestureType_Pointing:
            {
                // POINTING PROCESS
                break;
            }
            default:
            {
                break;
            }
        }
    };
};
```

FIG.27

| OPERATION | PROCESS |
|---|---|
| TAP | ENLARGED DISPLAY OF PHOTO |
| DRAG | MOVE PHOTO |
| HOVER | DISPLAY AUXILIARY INFORMATION OF PHOTO |
| POINTING | AFTER SEVERAL SECONDS, PHOTO SHIFTS TO SELECTED STATE, AND MOVE PHOTO |

FIG.32

| OPERATION | PROCESS |
|---|---|
| TAP | DRAW PICTURE WITH PEN |
| DRAG | DRAW PICTURE WITH PEN |
| HOVER | DISPLAY CURRENTLY SELECTED PEN COLOR |
| POINTING | DRAW PICTURE WITH PEN |

| OPERATION | PROCESS |
|---|---|
| TAP | MOVE WALK-THROUGH CAMERA |
| DRAG | MOVE WALK-THROUGH CAMERA |
| HOVER | DISPLAY LOCATION INFORMATION |
| POINTING | MOVE LIGHT SOURCE |

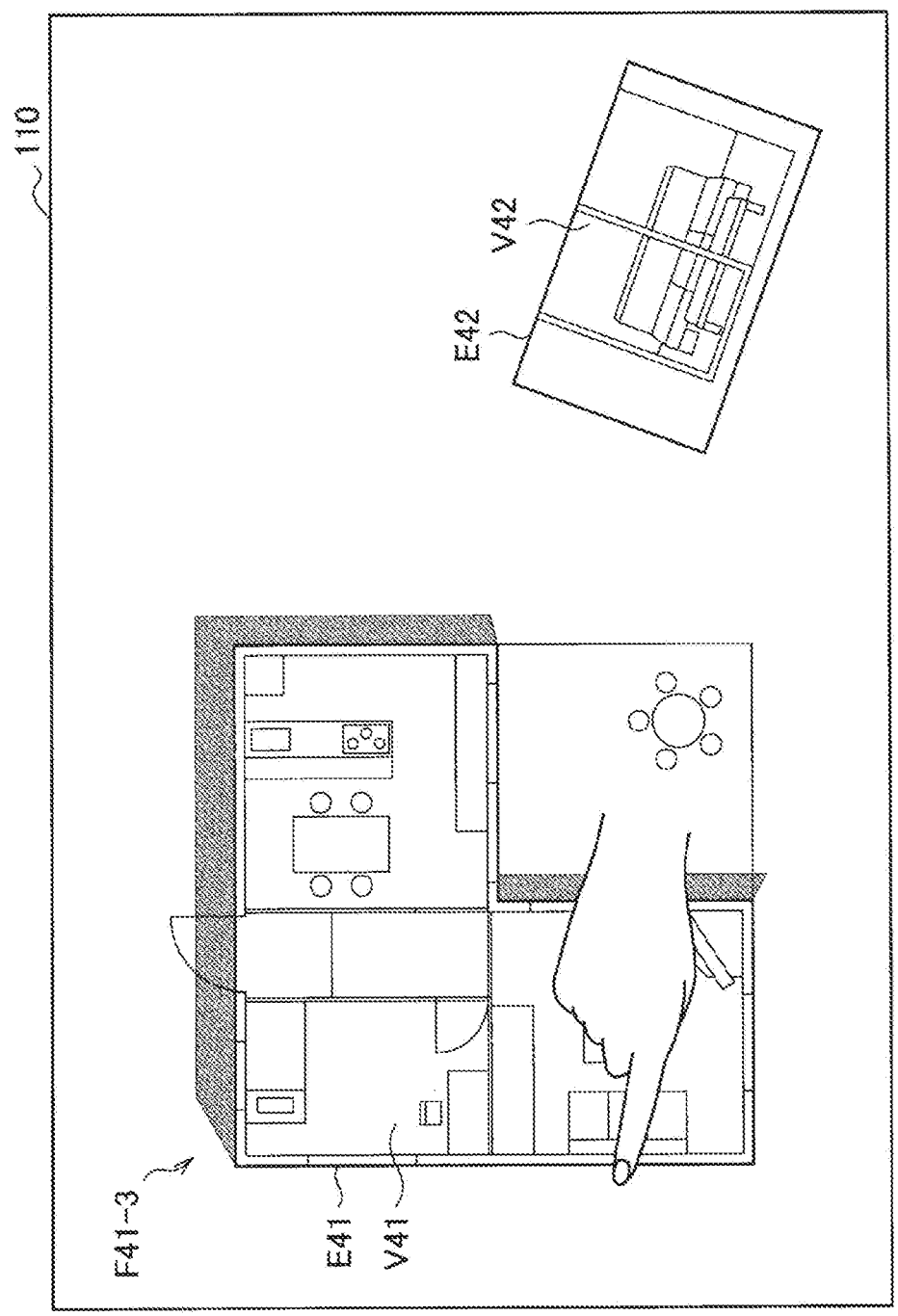

FIG.41

| OPERATION | PROCESS |
|---|---|
| TAP | N/A |
| DRAG | DRAW PADDLE AND BOUNCE BALL. WHEN BOUNCED BALL HITS CASTLE WALL, WALL IS BROKEN, AND WHEN CASTLE WALL IS BROKEN BY PREDETERMINED LEVEL, ENEMY RUNS AWAY FROM CASTLE. (WITH PADDLE DRAWN SHORT, REPULSIVE POWER OBTAINED BY PADDLE IS HIGH, ALTHOUGH COVER RANGE IS SMALL. IN CONTRAST, WITH PADDLE DRAWN LONG, REPULSIVE POWER OBTAINED BY PADDLE IS LOW, ALTHOUGH COVER RANGE IS LARGE.) |
| HOVER | N/A |
| POINTING | ATTACK ENEMY RUNNING FROM BROKEN CASTLE |

FIG.46

| OPERATION | PROCESS |
|---|---|
| TAP | MOVE ALPHABET |
| DRAG | MOVE ALPHABET |
| HOVER | DISPLAY HINT |
| POINTING | MOVE ALPHABET |

What is a smaller planet than the Earth?

What is the food of this shape?

FIG.52   What is this shaped object?
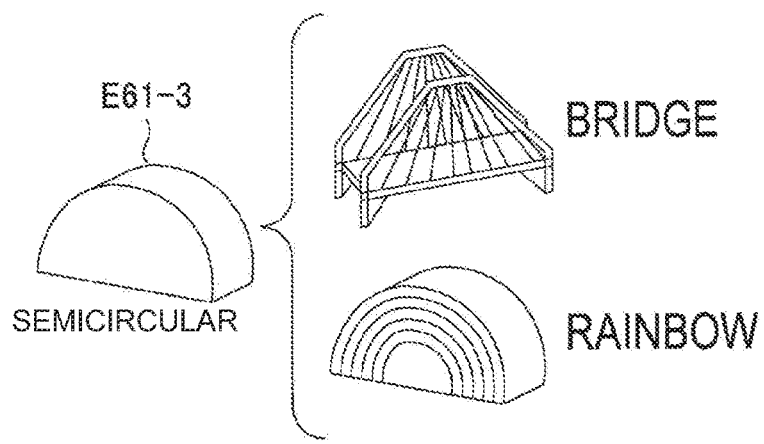
FIG.53   What is the food of this shape?
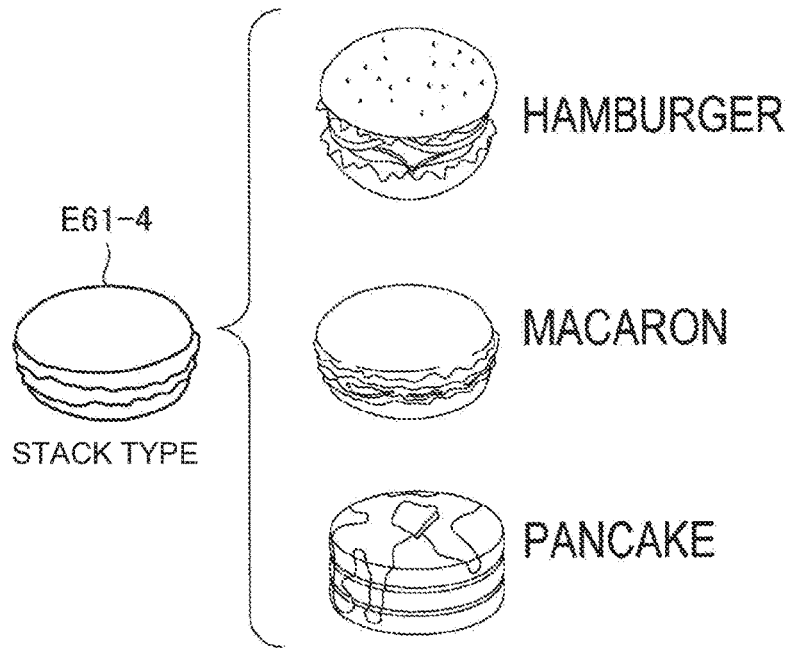
FIG.54
| OPERATION | PROCESS |
|---|---|
| TAP | ACQUIRE DISCOVERED ALPHABET |
| DRAG | N/A |
| HOVER | DISPLAY HINT |
| POINTING | PROJECT LIGHT ONTO THREE-DIMENSIONAL OBJECT TO ADD SHADOW |

FIG.59

| OPERATION | PROCESS |
|---|---|
| TAP | N/A |
| DRAG | N/A |
| HOVER | N/A |
| POINTING | PLAY MUSIC WHILE POINTING |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/001996 filed on Jan. 23, 2019, which claims priority benefit of Japanese Patent Application No. JP 2018-027881 filed in the Japan Patent Office on Feb. 20, 2018 Each of the above-referenced applications is hereby incorporated herein by reference in its entirety.

FIELD

The present disclosure relates to an information processing apparatus, an information processing method, and a program.

BACKGROUND

In recent years, there have been known technologies of recognizing an object and detecting various types of operations on the object. For example, there are disclosed technologies of recognizing a real object placed on a table surface or detecting operation on a virtual object displayed on the table surface (for example, refer to Patent Literature 1). In such technologies, when a real object is recognized, a virtual object corresponding to the real object is displayed, and when a touch operation is performed on the virtual object, a function corresponding to the virtual object is executed.

CITATION LIST

Patent Literature

Patent Literature 1: JP 2015-90524 A

SUMMARY

Technical Problem

However, in general, when a non-contact operation is performed with a fingertip separated from an object, it is difficult to determine whether the operation of the user is an operation on a pointed object (pointing operation) or an operation on an object immediately below the finger (hover operation). Therefore, it is desired to provide a technology capable of conveniently determining the type of operation in a case where a non-contact operation is performed with a fingertip separated from an object.

Solution to Problem

According to the present disclosure, an information processing apparatus is provided that includes: a processing unit that determines whether an operation of a user is a pointing operation or a hover operation on a basis of an angle of at least a part of an upper limb of the user.

Moreover, according to the present disclosure, an information processing method is provided that includes: determining whether an operation of a user is a pointing operation or a hover operation on a basis of an angle of at least a part of an upper limb of the user.

Moreover, according to the present disclosure, a program is provided that causes a computer to function as an information processing apparatus including a processing unit that determines whether an operation of a user is a pointing operation or a hover operation on a basis of an angle of at least a part of an upper limb of the user.

Advantageous Effects of Invention

As described above, according to the present disclosure, it is possible to provide a technology capable of conveniently determining the type of operation in a case where a non-contact operation is performed with a fingertip separated from an object. Note that the above-described effect is not necessarily limited, and it is also possible to use any of the effects illustrated in this specification together with the above-described effect or in place of the above-described effect, or other effects that can be assumed from this specification.

BRIEF DESCRIPTION OF DRAWINGS

FIG. 24 is a diagram illustrating an example of a structure of hand information.

FIG. 25 is a view illustrating a description example of a source code corresponding to a system using the programming language C++.

FIG. 26 is a view illustrating a description example of a source code corresponding to an application using the programming language C++.

FIG. 27 is a diagram illustrating an example of correspondence information in an implementation example of a photo application.

FIG. 32 is a diagram illustrating an example of correspondence information in an implementation example of a paint application.

FIG. 40 is a view illustrating an example of a process executed when a pointing operation is detected in an implementation example of an architectural design simulation application.

FIG. 41 is a diagram illustrating an example of correspondence information in an implementation example of a breakout game application.

FIG. 46 is a diagram illustrating an example of correspondence information in an implementation example of an association game application.

FIG. 52 is a view illustrating an example of a semicircular real object.

FIG. 53 is a view illustrating an example of a stack type real object.

FIG. 54 is a diagram illustrating an example of correspondence information in an implementation example of a word search game application.

FIG. 59 is a diagram illustrating an example of correspondence information in an implementation example of a music performance game application.

DESCRIPTION OF EMBODIMENTS

Figure 1:
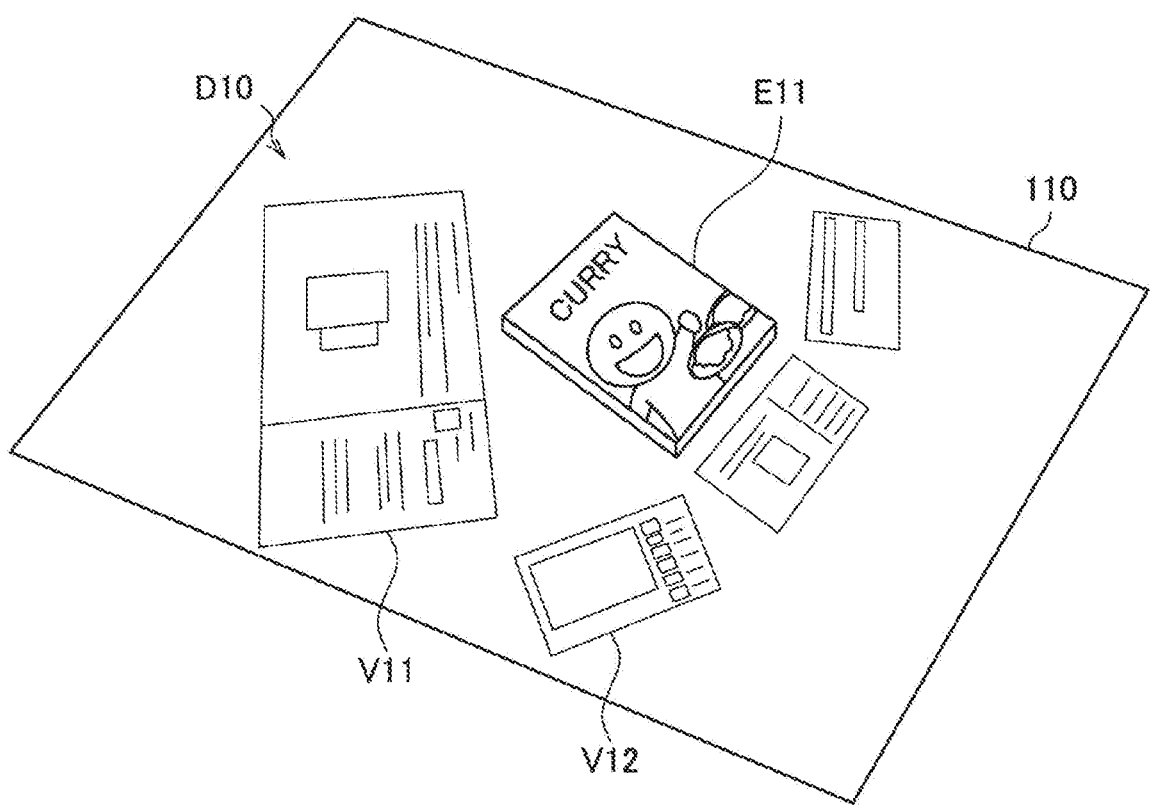
FIG. 1 is a view illustrating a known technology.

Hereinafter, preferred embodiments of the present disclosure will be described in detail with reference to the accompanying drawings. Note that same reference numerals are given to components having substantially a same functional configuration, and redundant description will be omitted in the present specification and the drawings.

Furthermore, in this specification and the drawings, a plurality of constituents having substantially a same or similar function may be distinguished by giving the same reference numerals followed by different numbers in some cases. However, in a case where there is no need to particularly distinguish each of a plurality of constituents having substantially the same or similar functional configuration, the same reference numerals alone will be attached. Furthermore, similar constituents of different embodiments will be distinguished by attaching different alphabets after the same reference numerals in some cases. However, in a case where there is no need to particularly distinguish each of similar constituents, the same reference numerals alone will be attached.

Figure 2:
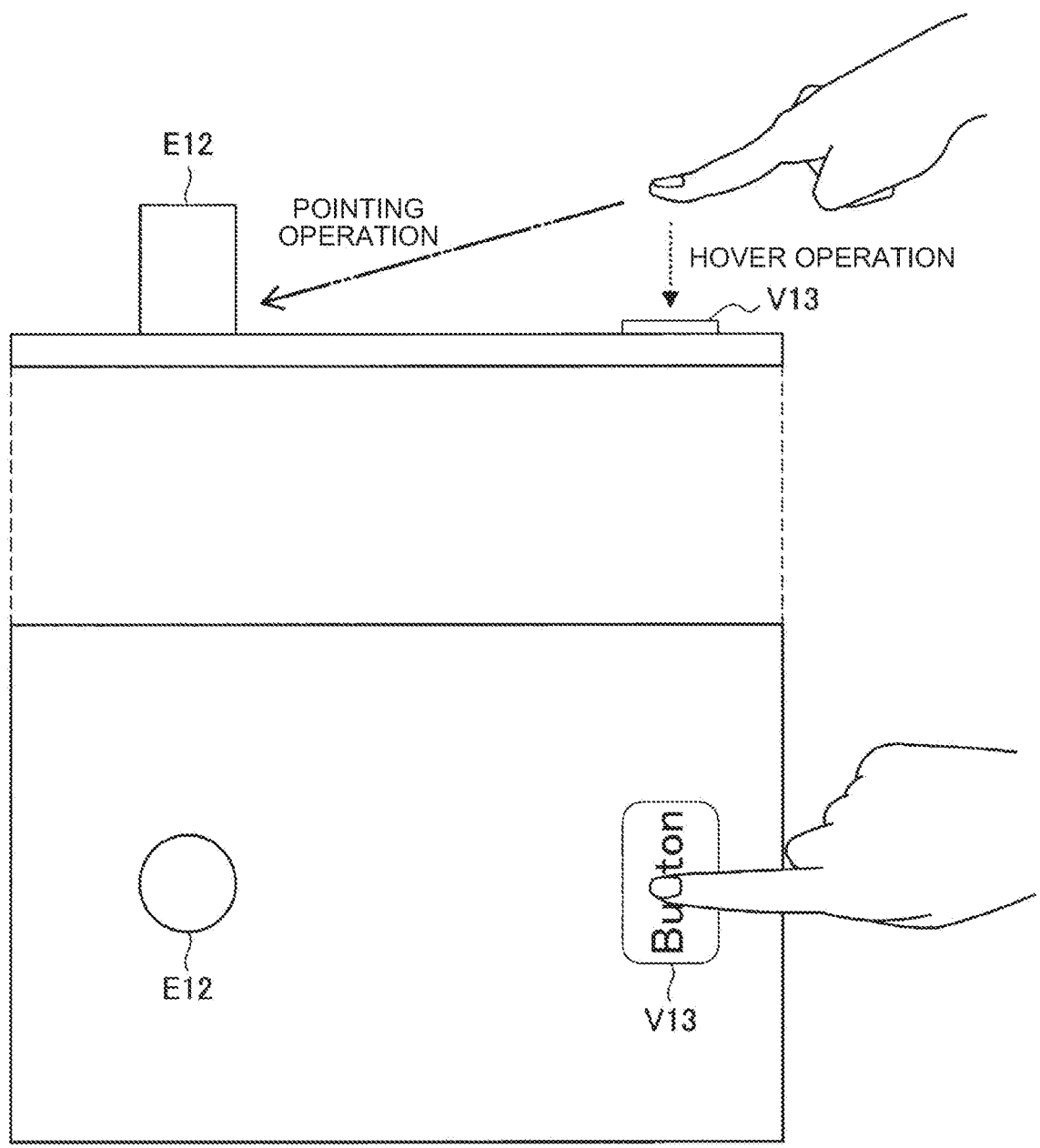
FIG. 2 is a view illustrating an issue having room for improvement in a known technology.

The description will be given in the following order.
0. Overview
1. Embodiment of the present disclosure
1.1. Configuration example of information processing system
1.2. Details of functions of information processing system
1.2.1. Processing flow of information processing system
1.2.2. Upper limb shape acquired from input unit
1.2.3. Determination of contact of fingertip with projection surface
1.2.4. Tap/Drag determination
1.2.5. Pointing/Hover determination
1.2.5.1. Using z-position of fingertip
1.2.5.2. Using horizontal angle of hand
1.2.5.3. Using finger joint angles
1.2.5.4. Using arm joint angles
1.2.5.5. Using intersection of line-of-sight vector and pointing vector
1.2.5.6. Using angle between line-of-sight vector and pointing vector
1.2.5.7. Using angle between thumb and index finger
1.2.6. Cooperation of application and system
1.2.7. Implementation example
1.2.7.1. Photo application
1.2.7.2. Paint application
1.2.7.3. Architectural design simulation application
1.2.7.4. Breakout game application
1.2.7.5. Association game application
1.2.7.6. Word search game application
1.2.7.7. Music performance game application
1.3. Hardware configuration
2. Conclusion 0. Overview In recent years, there have been known technologies of recognizing an object and detecting various types of operations on the object. For example, there are disclosed technologies of recognizing a real object placed on a table surface or detecting an operation on a virtual object projected on the table surface using a projector. First, an outline of such a known technology will be described with reference to FIGS. 1 and 2. FIG. 1 is a view illustrating a known technology. FIG. 2 is a view illustrating an issue having room for improvement in a known technology.

FIG. 1 illustrates a projection surface 110 on which an image is projected by a projector. As illustrated in FIG. 1, when a user places a real object E11 on a projection surface 110, the real object E11 is recognized, and then a virtual object V12 corresponding to the real object E11 is projected on the projection surface 110. Subsequently, when the user performs a touch operation on any of the virtual objects V12, a function corresponding to the virtual object V12 on which the touch operation has been performed is executed. Referring to FIG. 1, a virtual object V11 is displayed by execution of such a function.

However, in general, when a non-contact operation is performed with a fingertip separated from an object, it is difficult to determine whether the operation of the user is an operation on a pointed object (pointing operation) or an operation on an object immediately below the finger (hover operation). Referring to FIG. 2, as an example of an object, a real object E12 is placed, and a virtual object V13 is projected. At this time, the real object E12 is pointed, and the virtual object exists immediately under the finger. In such a situation, it is difficult to determine whether the operation of the user is a pointing operation or a hover operation.

Therefore, the embodiment of the present disclosure will mainly describe a technology capable of conveniently determining the type of a non-contact operation in a case where the operation is performed with a fingertip separated from an object. The pointing operation and the hover operation have spatial features as described above. That is, the pointing operation may be an operation performed toward the object pointed to, and the hover operation may be an operation performed toward an object immediately under the finger (operation toward an object over which the finger is held).

Note that there is no particular limitation on what types of process each of the pointing operation and the hover operation is performed for. Still, the pointing operation may be used as an operation for pointing at an object (pointing operation), or may be used as an operation for transition from an unconfirmed state to a confirmed state (confirming operation). Furthermore, the hover operation may be used as a proximity operation performed before a touch operation on the object, or may be used as an operation for an auxiliary operation related to the object.

Outline of one embodiment of the present disclosure has been described as above.

1. Embodiment of the Present Disclosure

[1.1. Configuration Example of Information Processing System]

Figure 3:
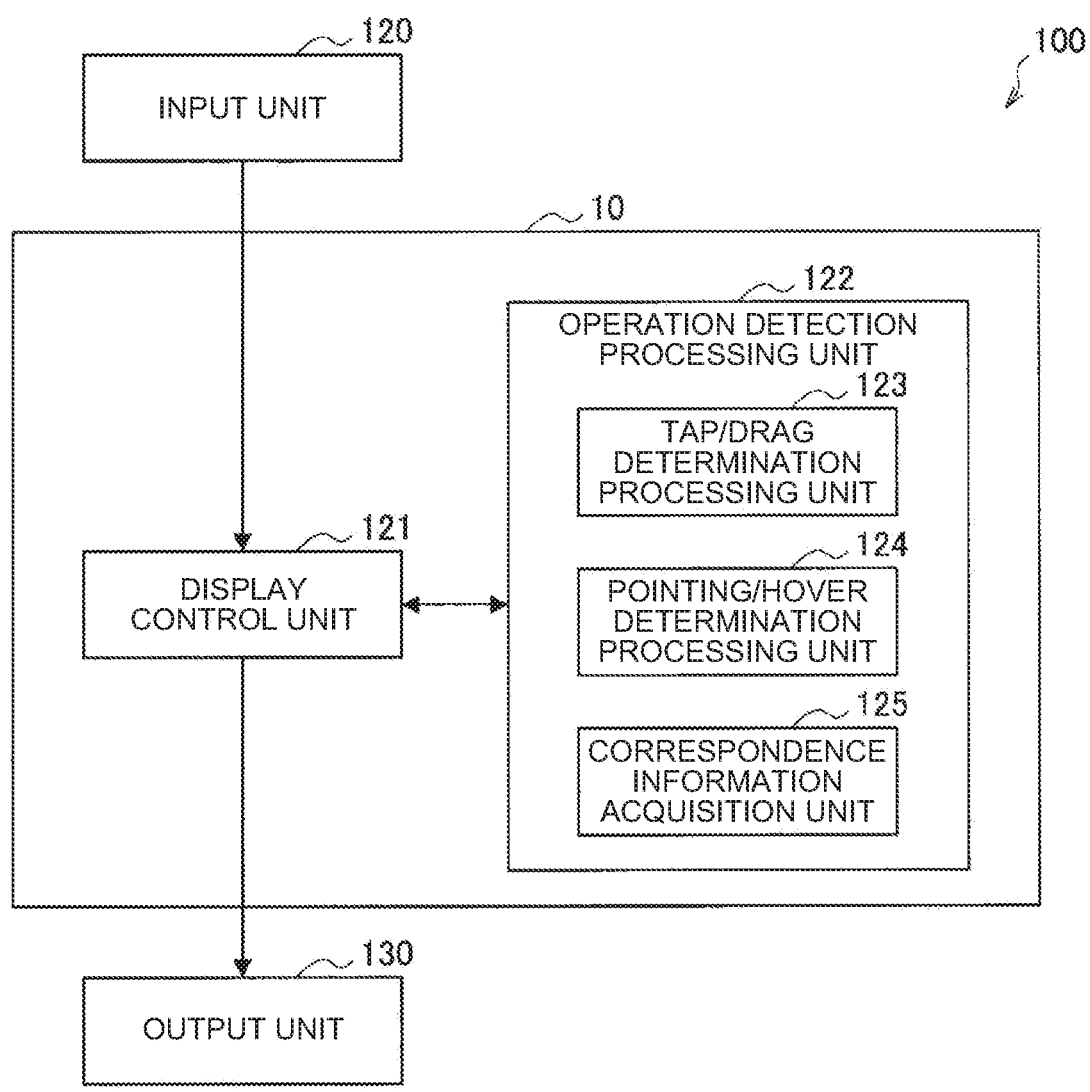
FIG. 3 is a diagram illustrating a functional configuration example of an information processing system according to an embodiment of the present disclosure.

Subsequently, a configuration example of an information processing system according to an embodiment of the present disclosure will be described with reference to the drawings. FIG. 3 is a diagram illustrating a functional configuration example of an information processing system according to an embodiment of the present disclosure. As illustrated in FIG. 3, an information processing system 100 includes an information processing apparatus 10, an input unit 120, and an output unit 130. Furthermore, the information processing apparatus 10 includes a display control unit 121 and an operation detection processing unit 122.

The input unit 120 includes an input device, and acquires the shape, movement, or the like of a part of or an entire body of a user as an example of input information. In one embodiment of the present disclosure, the shape, movement, or the like of the upper limb of the user are received as examples of input information. In addition, the input unit 120 acquires a state on a surface to which information is output by the output unit 130 (for example, the shape or pattern of an object (real object) placed on a surface to which information is output) as an example of input information. A surface to which information is output by the output unit 130 can correspond to a display surface. In particular, in a case where a projector is used, the display surface may correspond to a projection surface (for example, a table surface) to which information is projected by the projector. Although the following will mainly describe an assumable case where a projection surface is used as the display surface, the display surface is not limited to the projection surface.

Specifically, the input unit 120 may include an image sensor, a depth sensor, and a touch sensor. Note that not all of these sensors have to be used, and at least one of these sensors may be used to form the input unit 120. The following will mainly assume a case where information (image) projected on a projection surface is acquired by an image sensor, and the state on the projection surface (for example, the shape or pattern of an object (real object)

placed on the projection surface) is acquired by a depth sensor, while the shape and movement of the upper limb of the user are acquired by a touch sensor. However, there is no limitation on which sensor obtains these pieces of information.

Note that a visible light camera or an infrared camera may be used as the image sensor. It is allowable to use, as the depth sensor, a stereo camera, a time of flight (TOF) sensor, or a ranging image sensor using a structured light method. The touch sensor may be a camera that shoots from above or below, or may be a touch panel overlaid on the projection surface.

The output unit 130 includes an output device, and outputs information under the control of the display control unit 121. The following will mainly assume a case where the output unit 130 includes a projector, and the projector outputs information by projecting information on a projection surface. However, output unit 130 is not limited to a case including a projector. For example, the output unit 130 may be a touch panel display, a liquid crystal display (LCD), an organic electro-luminescence (EL) display, or the like.

The display control unit 121 and the operation detection processing unit 122 include a processing device such as one or more central processing units (CPUs). In a case where the display control unit 121 and the operation detection processing unit 122 include a processing device such as a CPU, the processing device may include an electronic circuit. As illustrated in FIG. 3, the operation detection processing unit 122 includes a tap/drag determination processing unit 123, a pointing/hover determination processing unit 124, and a correspondence information acquisition unit 125.

The display control unit 121 has a function of controlling display of graphics on the basis of input information received from the input unit 120. More specifically, the display control unit 121 controls the projector such that an object (for example, a button, a photograph, or the like) specified by an operation of the user is projected by the projector. The display control unit 121 may be provided as a control layer of a general operating system (OS) that performs drawing control of multi-content including windows or the like corresponding to an application or performs event output such as touching onto each of items of content. Furthermore, in the embodiment of the present disclosure, the input information is also output to the operation detection processing unit 122. Accordingly, the display control unit 121 controls the display of graphics on the basis of an operation detection result from the operation detection processing unit 122.

The operation detection processing unit 122 performs an operation detection process on the basis of the input information, and outputs an operation detection result to the display control unit 121. The tap/drag determination processing unit 123 determines whether an operation of the user is a tap operation or a drag operation when the finger is in contact with the projection surface on the basis of information (hand and finger information) related to the user's hand or finger. The pointing/hover determination processing unit 124 performs a process of determining whether the operation of the user is a pointing operation or a hover operation when the finger is held over the surface with no contact, on the basis of information regarding at least a part of the upper limb of the user.

The correspondence information acquisition unit 125 acquires information (correspondence information) in which an operation of the user is associated with a process to be executed, from a storage device (not illustrated). For example, the correspondence information may be implemented in a form of a relational database, a lookup table, or the like. Subsequently, the correspondence information acquisition unit 125 determines a process corresponding to the operation of the user on the basis of the acquired correspondence information, and then outputs the determined process to the display control unit 121. This allows the process corresponding to the operation of the user to be executed by the display control unit 121 (an effect corresponding to the operation is activated).

The functional configuration example of the information processing system 100 according to an embodiment of the present disclosure has been described above. Here, the information processing system 100 according to an embodiment of the present disclosure can include various modes. Hereinafter, first to fourth examples will be described as examples of the modes of the information processing system 100 according to an embodiment of the present disclosure. However, the form of the information processing system 100 according to an embodiment of the present disclosure is not limited to any of the first to fourth examples.

The following description will mainly assume a case where information is projected on a table surface by a projector. Accordingly, in the following description, a "table surface" is mainly used as an example of the projection surface. However, the area on which information is projected by the projector is not limited to the table surface. For example, the area on which the information is projected by the projector may be a floor surface, a wall surface, an object, or the like.

Figure 4:
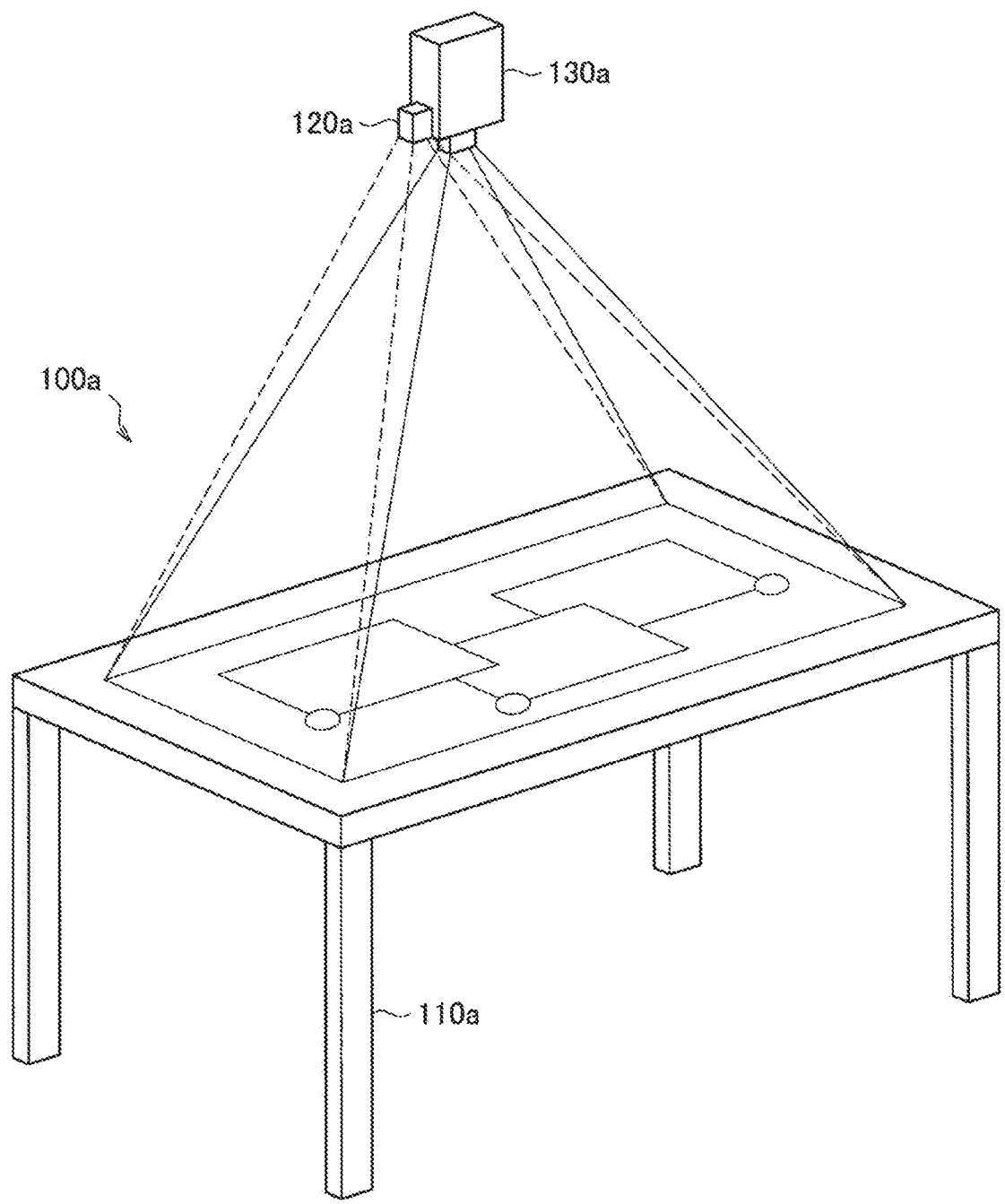
FIG. 4 is an explanatory view illustrating a first example of an information processing system according to the embodiment.

FIG. 4 is an explanatory view illustrating a first example of the information processing system 100 according to an embodiment of the present disclosure. As illustrated in FIG. 4, an information processing system 100a as a first example includes an input unit 120a and an output unit 130a. The information processing system 100a displays information on a top surface of a table 110a, and allows a user to operate on the information displayed on the table 110a. Such a method of displaying information on the top surface of the table 110a is also referred to as a "projection type".

The input unit 120a receives, as input information, an operation of the user and a shape and pattern of an object placed on the table 110a. In the example illustrated in FIG. 4, the input unit 120a is provided above the table 110a so as to be suspended from the ceiling. As described above, a method of projecting information from above the table 110a by the output unit 130a and displaying the information on the top surface of the table 110a is also referred to as "upper projection type". The input unit 120a can be implemented by using a camera that images the table 110a with one lens, a stereo camera capable of imaging the table 110a with two lenses to record information in the depth direction, or a microphone for picking up sound or environmental sounds emitted by the user.

In a case where a camera that images the table 110a with one lens is used as the input unit 120a, the information processing system 100a can recognize an object placed on the table 110a by analyzing an image captured by the camera. In a case where a stereo camera is used as the input unit 120a, the information processing system 100a can recognize an object (such as a hand) placed on the table 110a on the basis of the depth information acquired by the stereo camera. Furthermore, the information processing system 100a can recognize contact of the user's hand with the table 110a and separation of the hand from the table 110a on the basis of the depth information.

Furthermore, in a case where a microphone is used as the input unit 120a, the microphone may be provided as a microphone array for collecting sound in a specific direction. When a microphone array is used as the input unit 120a, the information processing system 100a may adjust the sound collection direction of the microphone array to any direction.

The output unit 130a displays information on the table 110a or outputs sound in accordance with the input information. The output unit 130a can be implemented by using a projector, a speaker, or the like. In the example illustrated in FIG. 4, the output unit 130a is provided above the table 110a so as to be suspended from the ceiling. In a case where the output unit 130a is implemented by using a projector, the output unit 130a projects information on the top surface of the table 110a. When the output unit 130a is implemented by using a speaker, the output unit 130a outputs sound on the basis of a sound signal. At this time, the number of speakers may be one or more. In a case where the output unit 130a includes a plurality of speakers, the information processing system 100a may limit the speakers that output the sound, or may adjust the direction in which the sound is output.

Furthermore, in a case where the information processing system 100 according to an embodiment of the present disclosure is a projection type information processing system 100a as illustrated in FIG. 4, the output unit 130a may include an illumination device. In a case where an illumination device is included in the output unit 130a, the information processing system 100a may control the states of on/off, etc. of the illumination device on the basis of the content of the input information received by the input unit 120a. Furthermore, in a case where the information processing system 100 according to an embodiment of the present disclosure is the information processing system 100a of the upper projection type as illustrated in FIG. 4, it is possible to display information not merely on the table 110a but also on an object placed on the table 110a.

The user can perform various types of operations with the finger or the like toward the information displayed on the table 110a by the output unit 130a. Furthermore, the user can place the object on the table 110a and cause the input unit 120a to recognize the object, so as to allow the information processing system 100a to execute various processes related to the object.

Figure 5:
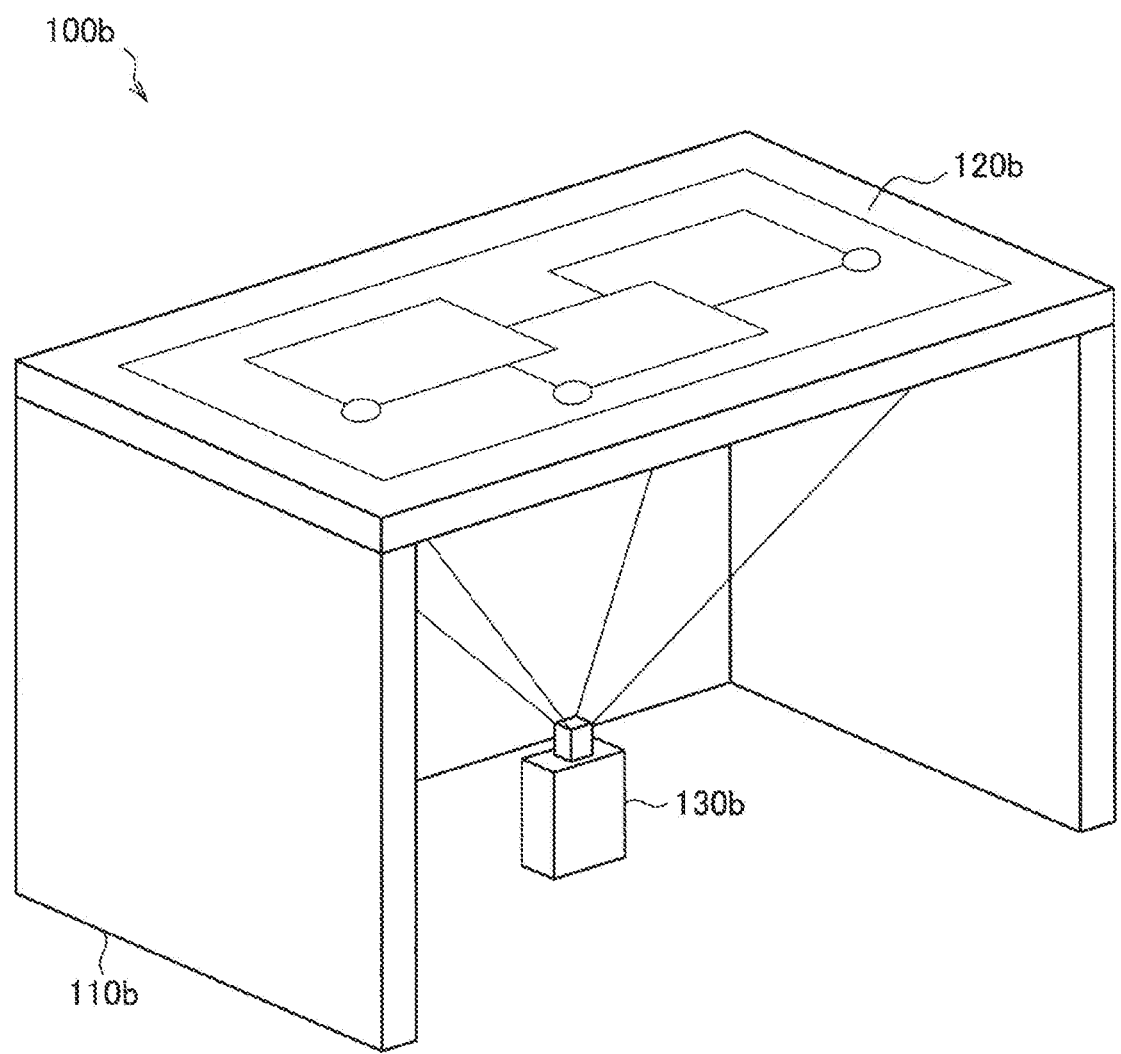
FIG. 5 is an explanatory view illustrating a second example of an aspect of the information processing system according to the embodiment.

FIG. 5 is an explanatory view illustrating a second example of the information processing system 100 according to an embodiment of the present disclosure. As illustrated in FIG. 5, an information processing system 100b as the second example displays information on the top surface of a table 110b by projecting information from below the table 110b by the output unit 130a. The top surface of the table 110b may be a translucent screen formed of a translucent material such as a glass plate or a plastic plate. The method of projecting information from below the table 110b by the output unit 130a and displaying the information on the top surface of the table 110b in this manner is also referred to as "rear projection type".

The example illustrated in FIG. 5 illustrates a configuration in which the input unit 120b is provided on the surface of the table 110b. However, the position where the input unit 120b is provided is not limited. For example, similarly to the information processing system 100a illustrated in FIG. 5, the input unit 120b may be provided below the table 110b, in a state of being separated from the table 110b.

Figure 6:
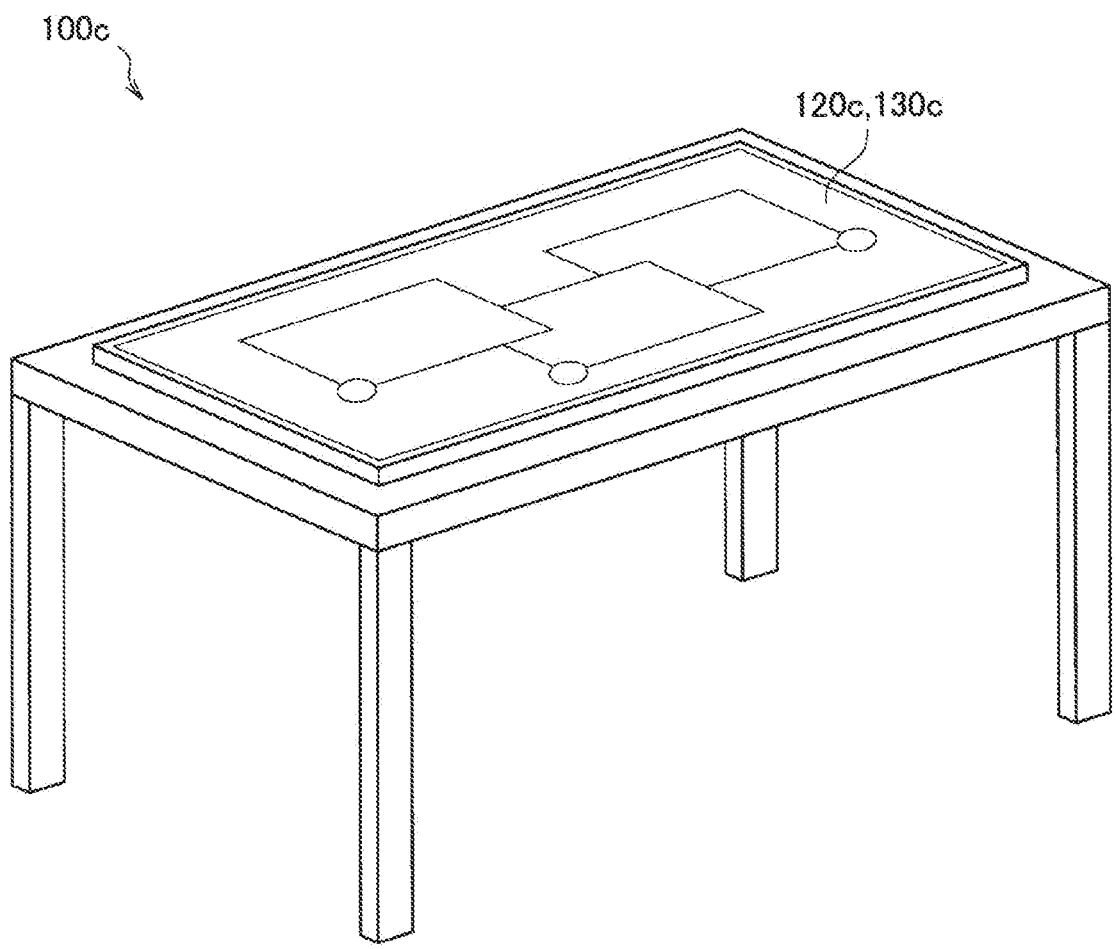
FIG. 6 is an explanatory view illustrating a third example of the information processing system according to the embodiment.

FIG. 6 is an explanatory view illustrating a third example of the information processing system 100 according to an embodiment of the present disclosure. As illustrated in FIG. 6, an information processing system 100c as the third example has a configuration in which a touch panel display is placed on a table. Such a method of displaying information on a touch panel type display placed on a table is also referred to as a "flat display type". An input unit 120c and an output unit 130c can be implemented as a touch panel display. In the information processing system 100c illustrated in FIG. 6, a camera for detecting a position of a user may be provided above the touch panel display, similarly to the information processing system 100a illustrated in FIG. 4.

Figure 7:
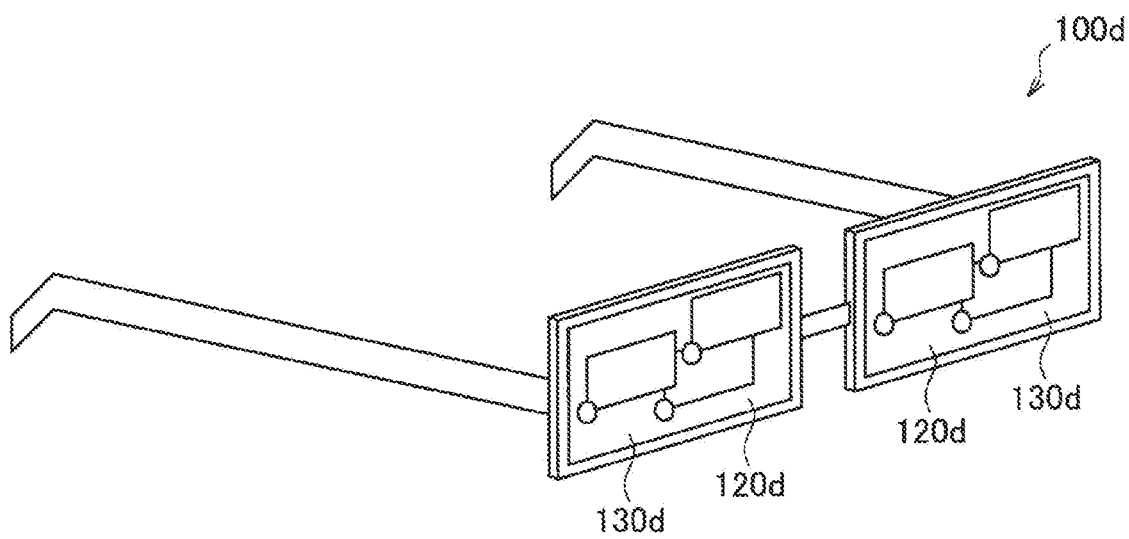
FIG. 7 is an explanatory view illustrating a fourth example of the information processing system according to the embodiment.

FIG. 7 is an explanatory view illustrating a fourth example of the information processing system 100 according to an embodiment of the present disclosure. As illustrated in FIG. 7, an information processing system 100d as the fourth example includes an eyewear terminal. The input unit 120d includes a camera capable of capturing the field of view of the user, enabling reception of a captured image as input information. In addition, the output unit 130d can be implemented as a display that presents information corresponding to the input information, in a field of view of the user. For example, the output unit 130d is implemented as a transmissive display, and allows a user to visually recognize an external environment through the output unit 130d.

The following description will mainly assume a case where the information processing system 100 according to an embodiment of the present disclosure uses the first example illustrated in FIG. 4. That is, it is mainly assumed a case where the input unit 120a and the output unit 130a are provided above the table 110a, being separated from the table 110a (display surface of information). Accordingly, in the following description, the information processing system 100a, the input unit 120a, and the output unit 130a are also simply referred to as the information processing system 100, the input unit 120, and the output unit 130. However, as described above, the mode of the information processing system 100 according to an embodiment of the present disclosure is not limited.

The configuration example of the information processing system 100 according to an embodiment of the present disclosure has been described above.

[1.2. Details of Functions of Information Processing System]

Next, details of functions of the information processing system 100 according to an embodiment of the present disclosure will be described.

(1.2.1. Processing Flow of Information Processing System)

Figure 8:
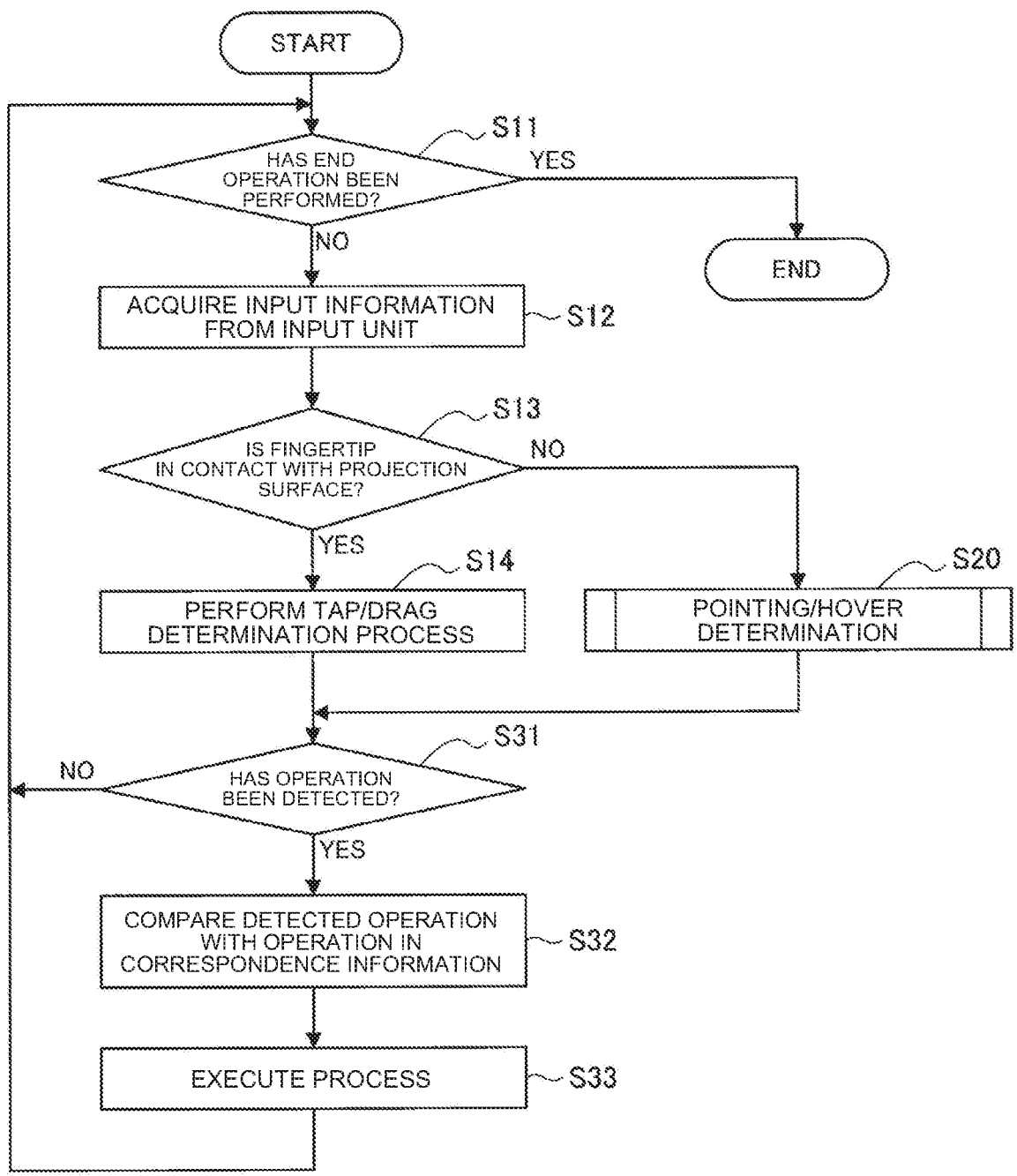
FIG. 8 is a diagram illustrating an example of a processing flow of the information processing system according to the embodiment.

First, an example of a processing flow of the information processing system 100 according to an embodiment of the present disclosure will be described. FIG. 8 is a diagram illustrating an example of a processing flow of the information processing system 100 according to an embodiment of the present disclosure. FIG. 8 merely illustrates an example of the processing flow of the information processing system 100. Therefore, the processing flow of the information processing system 100 is not limited to the example of the processing flow illustrated in FIG. 8.

First, the operation detection processing unit 122 determines whether an end operation has been performed by the user (S11). In a case where the operation detection processing unit 122 determines that the end operation has been performed by the user ("YES" in S11), the operation detection processing unit 122 ends the processing. In a case where the operation detection processing unit 122 determines that the end operation has not been performed by the user ("NO" in S11), the operation detection processing unit 122 acquires input information from the input unit 120 via the display control unit 121 (S12). As described above, the input information can include information projected on the projection surface, the shape and movement of the user's upper limb, and the state on the projection surface.

The shape of the upper limb acquired from the input unit 120 will be described below in detail with reference to FIGS. 10 to 13. Subsequently, the operation detection processing unit 122 detects a distance between the fingertip and the projection surface (z-position of the fingertip) on the basis of the input information, and determines whether the fingertip is in contact with the projection surface (S13). Details of the determination as to whether the fingertip is in contact with the projection surface will be described below with reference to FIG. 14.

In a case where it is determined that the fingertip is in contact with the projection surface ("YES" in S13), the operation detection processing unit 122 determines whether the operation of the user is a tap operation or a drag operation (S14), and proceeds to S31. Details of determination as to whether the operation of the user is a tap operation or a drag operation will be described below with reference to FIG. 15. In a case where it is determined that the fingertip is not in contact with the projection surface ("NO" in S13), the operation detection processing unit 122 determines whether the operation of the user is a pointing operation or a hover operation (S20), and proceeds to S31.

Figure 9:
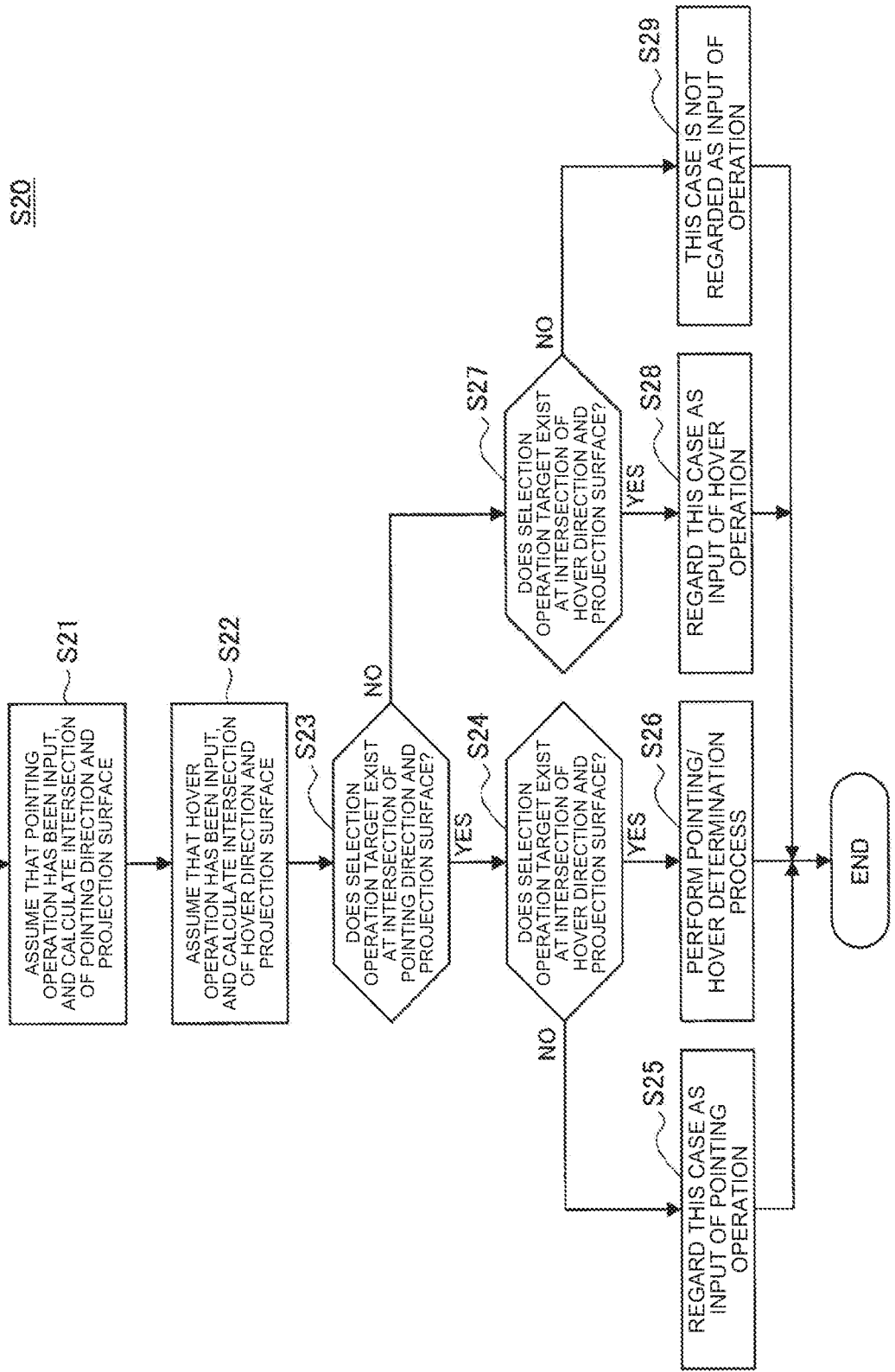
FIG. 9 is a diagram illustrating a detailed flow of pointing/hover determination.

FIG. 9 is a diagram illustrating a detailed flow of the pointing/hover determination. First, assuming that the pointing operation has been input, the pointing/hover determination processing unit 124 calculates an intersection of the pointing direction and the projection surface (S21). The pointing direction may be defined as a direction from a predetermined position of a hand (hand center position or finger joint position) to a tip position of the finger with reference to the predetermined position of the hand. The hand center position is not particularly limited as long as it is any position in the area between the base of each of the five fingers and the wrist.

Subsequently, assuming that the hover operation has been input, the pointing/hover determination processing unit 124 calculates an intersection of the hover direction and the projection surface (S22). The hover direction may be defined as a direction perpendicular to the projection surface with reference to the fingertip position (tip position of the finger).

Subsequently, the pointing/hover determination processing unit 124 determines whether a selection operation target exists at the intersection of the pointing direction and the projection surface (S23). An embodiment of the present disclosure mainly assumes a case where the selection operation target is an object (virtual object) projected by a projector. Examples of the virtual object include a button and a photograph. However, the selection operation target may be a real object.

In a case where a selection operation target exists at the intersection of the pointing direction and the projection surface (YES in S23), the pointing/hover determination processing unit 124 determines that the selection operation target exists at the intersection of the hover direction and the projection surface (S24).

In a case where no selection operation target exists at the intersection of the hover direction and the projection surface ("NO" in S24), the pointing/hover determination processing unit 124 regards this as an input of a pointing operation (S25), and ends the pointing/hover determination. In a case where the selection operation target exists at the intersection of the hover direction and the projection surface ("YES" in S24), the pointing/hover determination processing unit 124 performs the pointing/hover determination process (S26) and ends the pointing/hover determination. Details of the pointing/hover determination process will be described below with reference to FIGS. 16 to 22.

In a case where no selection operation target exists at the intersection of the pointing direction and the projection surface (NO in S23), the pointing/hover determination processing unit 124 determines whether the selection operation target exists at the intersection of the hover direction and the projection surface (S27).

In a case where a selection operation target exists at the intersection of the hover direction and the projection surface ("YES" in S27), the pointing/hover determination processing unit 124 regards this as an input of a hover operation (S28), and ends the pointing/hover determination. In a case where no selection operation target exists at the intersection of the hover direction and the projection surface ("NO" in S24), the pointing/hover determination processing unit 124 performs the pointing/hover determination process (S29) and ends the pointing/hover determination.

Returning to FIG. 9, the description will continue. The operation detection processing unit 122 determines whether an operation has been detected by the tap/drag determination processing unit 123 or the pointing/hover determination processing unit 124 (S31). In a case where no operation has been detected ("NO" in S31), the operation detection processing unit 122 returns to S11. In contrast, in a case where an operation has been detected ("YES" in S31), the operation detection processing unit 122 acquires correspondence information by the correspondence information acquisition unit 125, and compares the detected operation with the operation in the corresponding information (S32).

The display control unit 121 executes a process associated with the detected operation (S33). At this time, the correspondence information may include a different process assigned to each of operations. For example, the display control unit 121 may control to allow the first process to be executed in a case where the operation of the user is a pointing operation, and may control to allow the second process different from the first process to be executed in a case where the operation of the user is a hover operation. Thereafter, the display control unit 121 returns to S11.

The example of the processing flow of the information processing system 100 according to an embodiment of the present disclosure has been described as above.

(1.2.2. Upper Limb Shape Acquired from Input Unit)

Figure 10:
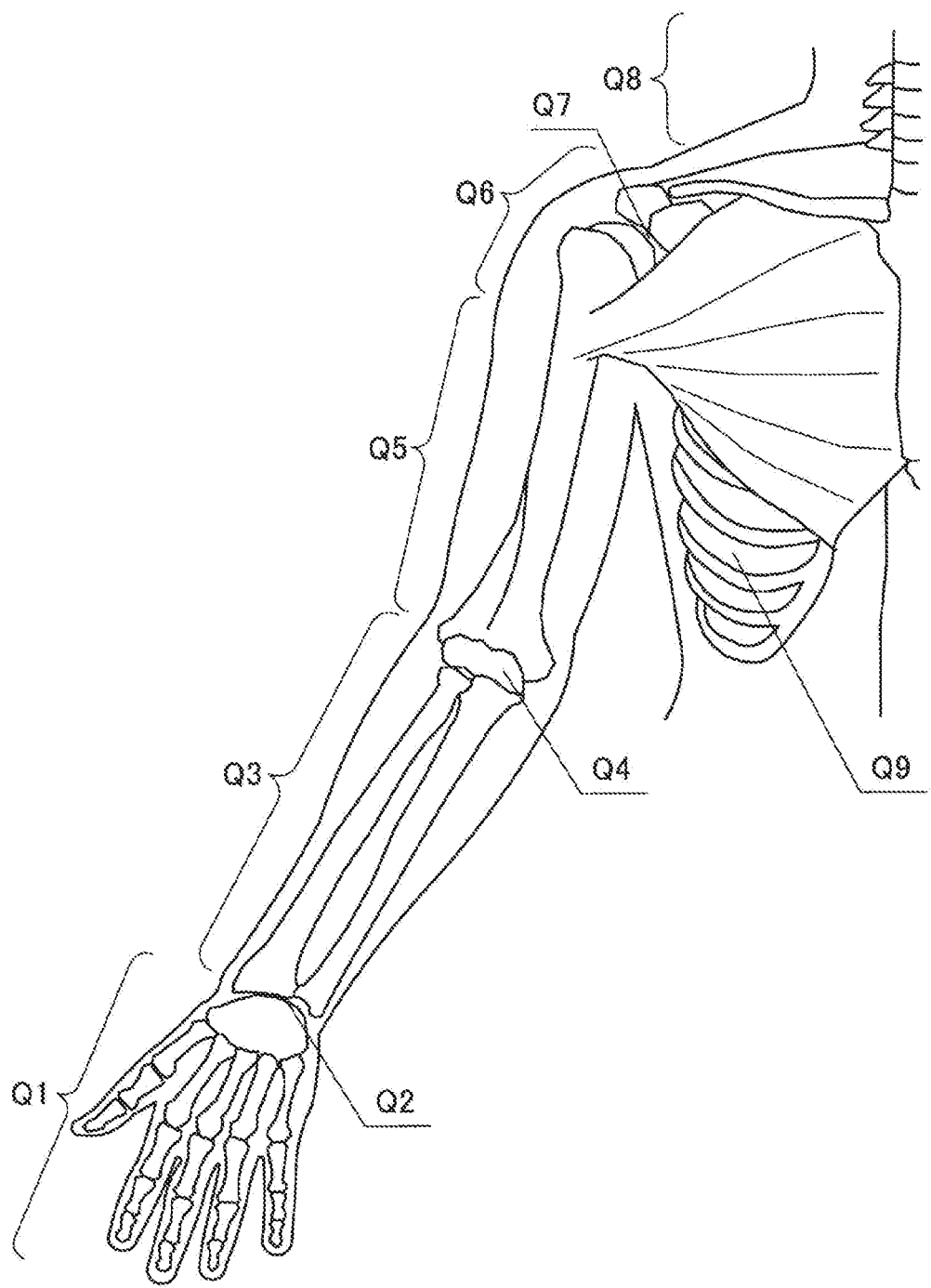
FIG. 10 is a view illustrating an example of an upper limb.

Subsequently, an example of the shape of an upper limb acquired from the input unit 120 will be described. First, the upper limb will be described with reference to FIG. 10. FIG. 10 is a view illustrating an example of an upper limb. Referring to FIG. 10, an upper limb includes a hand Q1 (including fingers), a wrist joint Q2, a forearm Q3, an elbow joint Q4, an upper arm (or arm) Q5, a shoulder Q6, a glenohumeral joint Q7, a neck Q8, and a thoracic wall Q9.

The glenohumeral joint Q7 can correspond to the base of the upper arm. One embodiment of the present disclosure is directed to at least a part of such an upper limb (at least one or more parts of the upper limb).

The following description mainly assumes a case where the first finger is the index finger and operation of the user is performed by the first finger. Therefore, in the following description, a "finger" represents an index finger unless otherwise specified. However, the first finger may be a finger other than the index finger. Moreover, the following description also includes a case where the second finger is the thumb and the operation of the user is performed by a combination of the first finger and the second finger. However, the second finger may be a finger other than the thumb, and is not particularly limited as long as it is different from the first finger.

In the following description, the thumb joint represents the second joint from the tip of thumb (the base of the thumb) and each of joints of fingers other than the thumb (that is, the index finger, the middle finger, the ring finger, and the little finger) represents the second joint from the tip of the finger, unless otherwise specified. However, the joint of the thumb may represent the first joint from the tip of the thumb, and each of the joints of fingers other than the thumb may represent the first joint from the tip of the finger or the third joint from the tip of the finger (the base of the finger).

Figure 11:
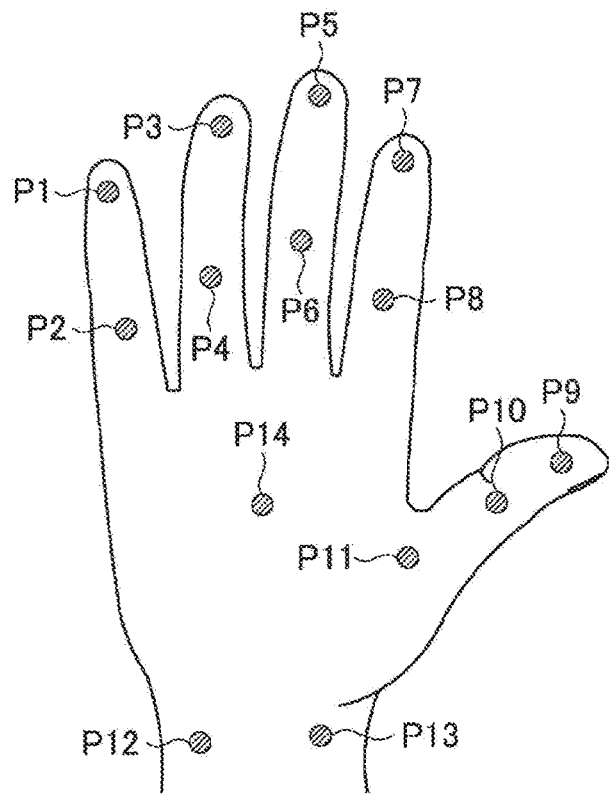
FIG. 11 is a view illustrating an example of each of positions of an upper limb acquired from an input unit.
Figure 12:
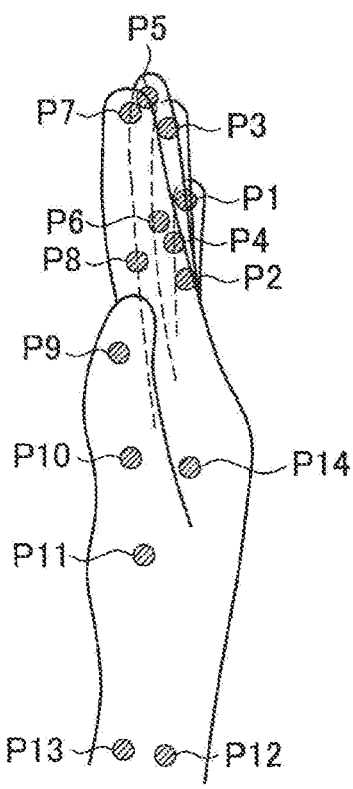
FIG. 12 is a view illustrating an example of each of positions of an upper limb acquired from an input unit.
Figure 13:
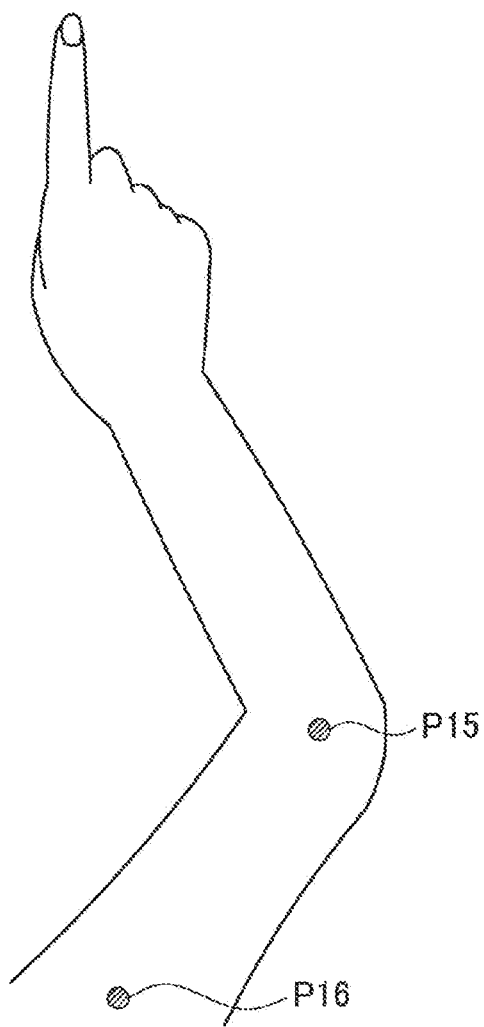
FIG. 13 is a view illustrating an example of each of positions of an upper limb acquired from an input unit.

Next, each of positions of the upper limb acquired from the input unit 120 will be described. FIGS. 11 to 13 are views illustrating an example of positions of the upper limb acquired from the input unit 120.

Referring to FIGS. 11 to 13, an example of positions of the upper limb acquired from the input unit 120 is illustrated as a little finger tip position P1, a little finger joint position P2, a ring finger tip position P3, a ring finger joint position P4, a middle finger tip position P5, a middle finger joint position P6, an index finger tip position P7, an index finger joint position P8, a thumb tip position P9, a thumb first joint position from tip P10, a second joint position from the tip of thumb P11, a wrist position (little finger side) P12, a wrist position (thumb side) P13, a hand center position P14, an elbow joint position P15, and an upper arm base position P16.

In one embodiment of the present disclosure, it is mainly assumed that all the positions P1 to P16 are acquired by the input unit 120 in principle. However, only a part of the positions P1 to P16 may be acquired by the input unit 120. Furthermore, there can be a case where a part of the positions P1 to P16 is not acquired depending on the positional relationship between the input unit 120 and the user. For example, as will be described below, the upper arm base position P16 might not be directly acquired in some cases. Even in such a case, after acquisition of any position between the elbow joint position P15 and the upper arm base position P16, the position can be used instead of the upper arm base position P16.

As described above, the hand center position is not particularly limited as long as it is any position in the area between the base of each of the five fingers and the wrist. Furthermore, the wrist position (little finger side) P12 may be a position closer to the thumb among the two positions obtained as a wrist position, and the wrist position (thumb side) P13 may be a position closer to the little finger among the two positions obtained as a wrist position. Each of the wrist position (little finger side) P12 and the wrist position (thumb side) P13 may be appropriately changed according to a detection algorithm of each of positions.

The example of the shape of the upper limb acquired from the input unit 120 has been described above.

(1.2.3. Determination of Contact of Fingertip with Projection Surface)

Figure 14:
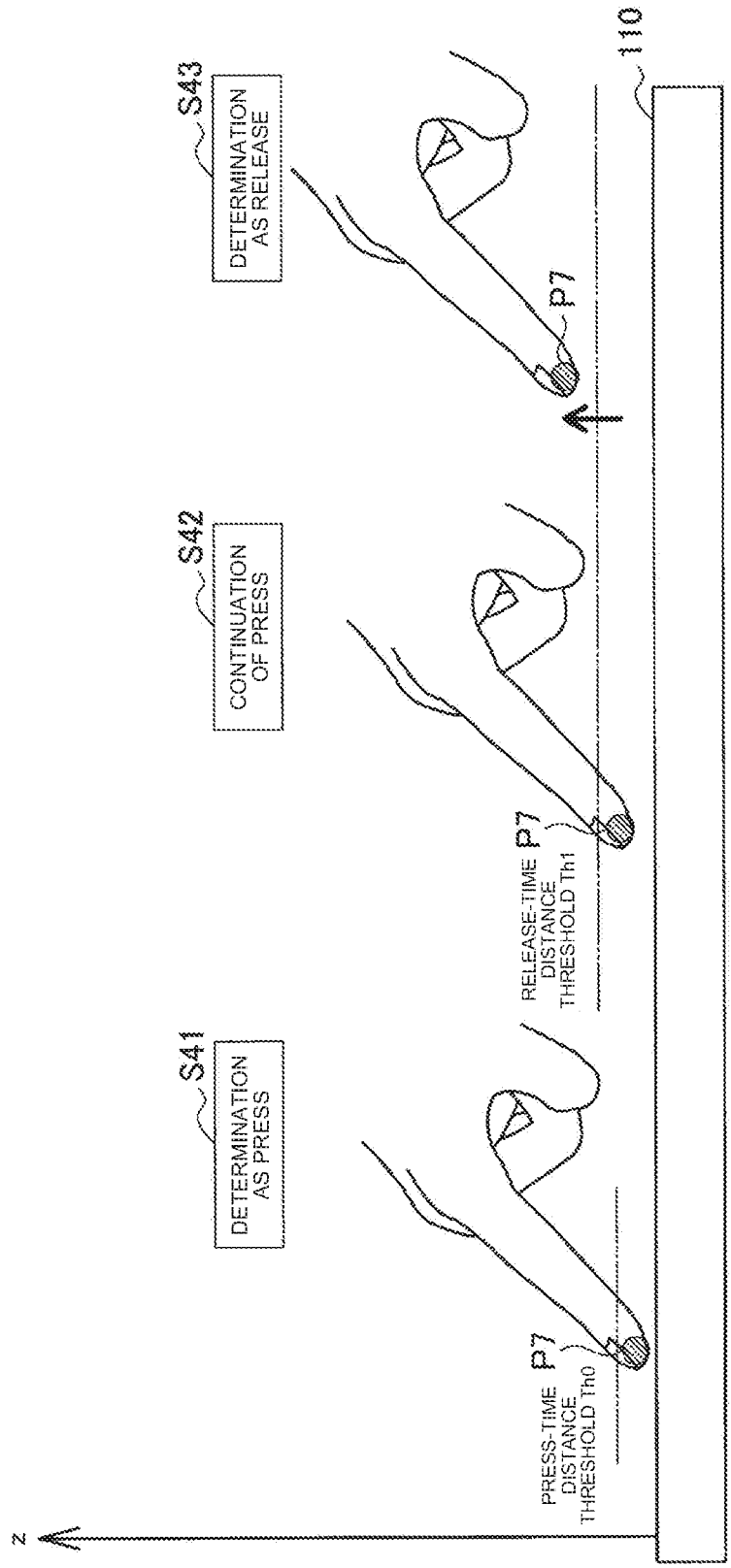
FIG. 14 is a view illustrating an example of a determination of contact of a fingertip with a projection surface performed by an operation detection processing unit.

Next, an example of determination of contact of a fingertip with the projection surface by the operation detection processing unit 122 will be described. FIG. 14 is a view illustrating an example of a determination of contact of a fingertip with a projection surface performed by the operation detection processing unit 122. The operation detection processing unit 122 can acquire the index finger tip position P7 and the position of the projection surface 110 from the input unit 120. Accordingly, the operation detection processing unit 122 can calculate the z-position of the index finger tip position P7 by calculating the distance between these positions.

Here, as illustrated in FIG. 14, in a case where the z-position of the index finger tip position P7 is at a press-time distance threshold Th0 or less, the operation detection processing unit 122 determines that the index finger tip position P7 is in a contact state (press) with respect to the projection surface 110 (S41). In addition, in a case where the z-position of the index finger tip position P7 has been continuously at a release-time distance threshold Th1 or less after staying at the press-time distance threshold Th0 or less, the operation detection processing unit 122 determines that the contact state (pres) is continuing (S42). At this time, the press-time distance threshold Th0 and the release-time distance threshold Th1 may be the same or different.

For example, as illustrated in FIG. 14, the release-time distance threshold Th1 may be set to be larger than the press-time distance threshold Th0. This makes it possible to suppress easy ending of the contact state (the start and end of the contact state can be provided with hysteresis). When the z-position of the index finger tip position P7 becomes larger than the release distance threshold Th1, the operation detection processing unit 122 determines that the contact state has ended (release) (S43).

The example of the determination of contact of the fingertip with the projection surface by the operation detection processing unit 122 has been described above.

(1.2.4. Tap/Drag Determination)

Figure 15:
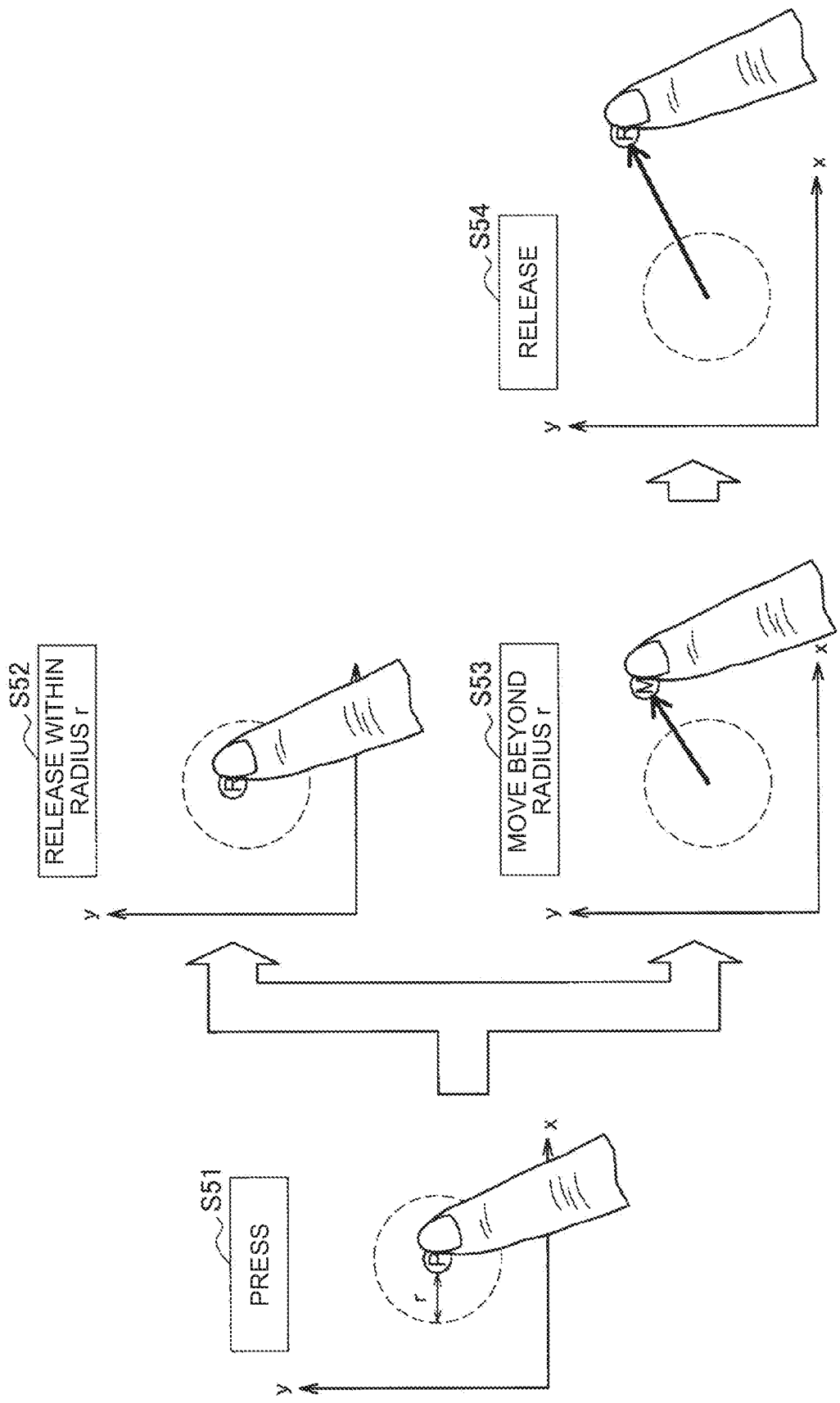
FIG. 15 is a view illustrating an example of a tap/drag determination process by a tap/drag determination processing unit.

Next, an example of determination as to whether the operation of the user is a tap operation or a drag operation will be described. FIG. 15 is a view illustrating an example of the tap/drag determination process by the tap/drag determination processing unit 123. As illustrated in FIG. 15, when the contact state (Press) of the index finger tip position to the projection surface 110 (Press) is started (S51), the tap/drag determination processing unit 123 sets an area located within a distance of radius r from the press start point as a clearance.

Subsequently, when the end of the contact state (release) is detected in any of the areas within a distance of radius r from the press start point (S52), the tap/drag determination processing unit 123 determines that the operation of the user is a tap operation. In contrast, the tap/drag determination processing unit 123 tracks the tip position of the index finger after the start of the press. In a case where the index finger tip position is detected in any of the areas beyond the radius r, the tap/drag determination processing unit 123 regards this detection as a move of the tip position of the index finger beyond the radius r (S53), and determines that the operation of the user is a drag operation.

Thereafter, the tap/drag determination processing unit 123 continues the activated state of the event of the drag operation until detecting the end (release) of the contact state. Subsequently, in a case where the end of the contact state (release) is detected (S54), the tap/drag determination processing unit 123 ends the activation of the event of the drag operation.

An example of determination as to whether the operation of the user is a tap operation or a drag operation has been described as above.

(1.2.5. Pointing/Hover Determination)

Next, an example of determination as to whether the operation of the user is a pointing operation or a hover operation will be described. The determination may be selectively used depending on the environment or the purpose of the application; a single determination may be used, or a plurality of determinations may be weighted, and a combination of the plurality of determinations may be used. For example, in an embodiment of the present disclosure, the pointing/hover determination processing unit 124 determines whether the operation of the user is a pointing operation or a hover operation on the basis of the angle of at least a part of the upper limb of the user. As described above, the input unit 120 recognizes each of specific points of the upper limb from the captured image (for example, points from the little finger tip position P1 to the upper arm base position P16), and thus, the pointing/hover determination processing unit 124 acquires information indicating each of the specific points of the upper limb from the input unit 120, and calculates an angle formed by lines connecting the plurality of specific points.

For example, the pointing/hover determination processing unit 124 determines whether the operation of the user is a pointing operation or a hover operation on the basis of an angle formed by at least a part of the upper limb and a predetermined vector or a predetermined plane. Here, the at least a part of the upper limb is not particularly limited. For example, the at least a part of the upper limb may be at least a part of a user's hand. Alternatively, the at least a part of the upper limb may be at least a part of the user's arm.

Specifically, the pointing/hover determination processing unit 124 may determine whether the operation of the user is a pointing operation or a hover operation on the basis of a relationship between the angle and the threshold.

In the following, examples of determination as to whether the operation of the user is a pointing operation or a hover operation are described in the order of "1.2.5.1. Using z-position of fingertip", "1.2.5.2. Using horizontal angle of hand", "1.2.5.3. Using finger joint angles", "1.2.5.4. Using arm joint angles", "1.2.5.5. Using intersection of line-of-sight vector and pointing vector", "1.2.5.6. Using angle between line-of-sight vector and pointing vector" and "1.2.5.7. Using angle between thumb and index finger".

(1.2.5.1. Using z-Position of Fingertip)

Figure 16:
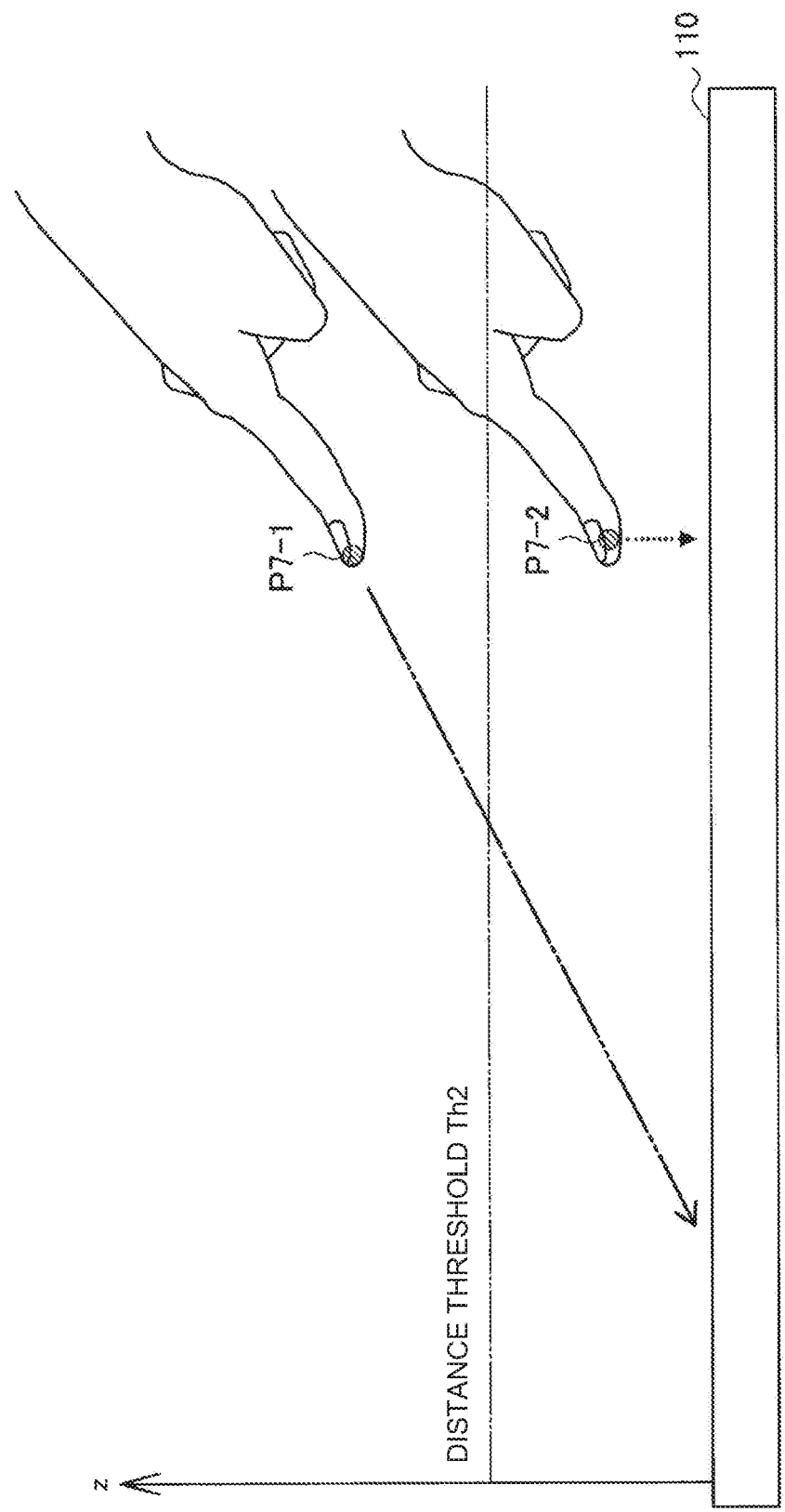
FIG. 16 is a view illustrating a pointing/hover determination process using a z-position of a fingertip.

FIG. 16 is a view illustrating the pointing/hover determination process using the z-position of the fingertip. Here, according to a human behavioral characteristic, the fingertip would not come so close to the projection surface 110 in a case where a pointing operation is performed by the user, leading to suppression of the z-position of the index finger tip position P7 from becoming extremely low (upper part in FIG. 16). In contrast, according to a human behavioral characteristic, the fingertip would come close to an object on the projection surface 110 in a case where a hover operation is performed by the user, leading to the z-position of the index finger tip position P7 that is likely to become extremely low (lower part in FIG. 16). The example illustrated in FIG. 16 utilizes such human behavioral characteristics.

Specifically, as illustrated in the upper part of FIG. 16, the pointing/hover determination processing unit 124 can determine that the operation of the user is a pointing operation when the z-position of the index finger tip position P7 (distance of the index finger tip position P7 from the projection surface) is a distance threshold Th2 or more.

In contrast, as illustrated in the lower part of FIG. 16, the pointing/hover determination processing unit 124 can determine that the operation of the user is a hover operation when the z-position of the index finger tip position P7 (distance of the index finger tip position P7 from the projection surface) is smaller than the distance threshold Th2.

(1.2.5.2. Using Horizontal Angle of Hand)

Figure 17:
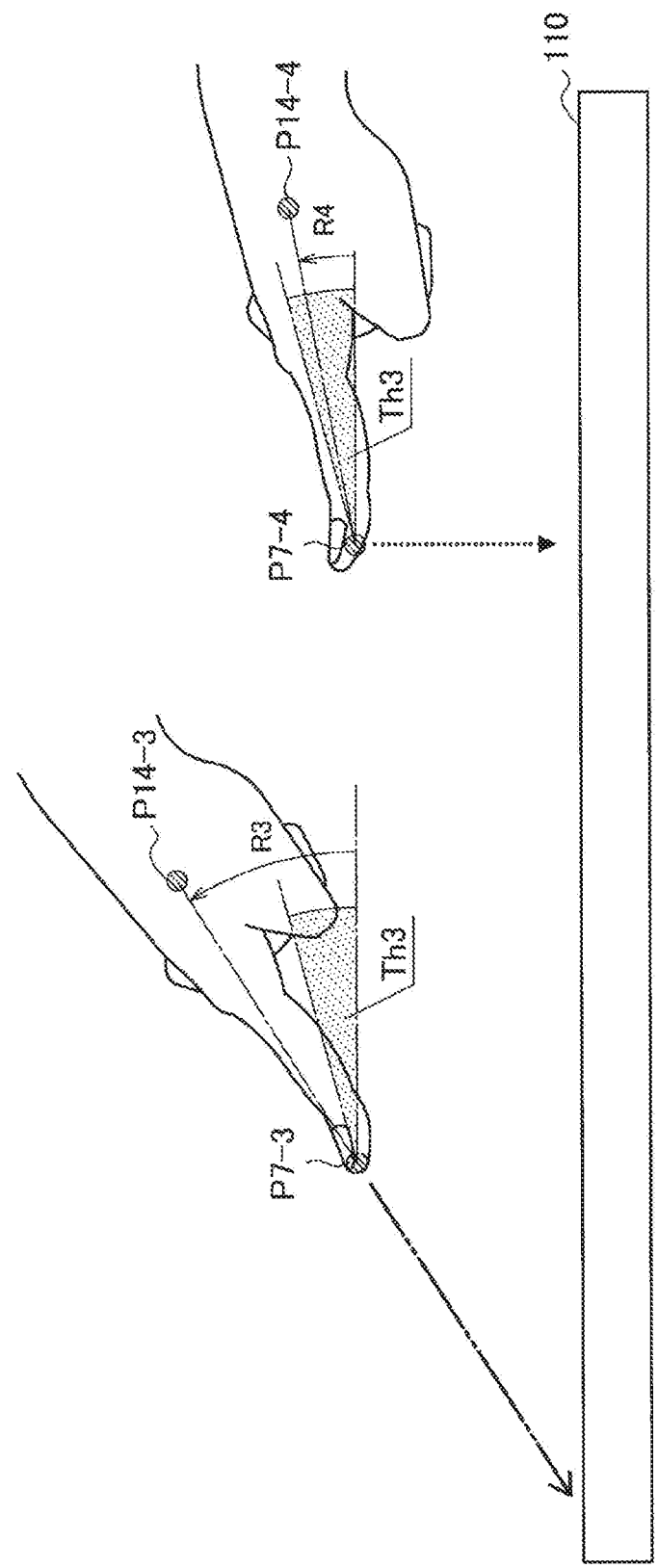
FIG. 17 is a view illustrating a pointing/hover determination process using a horizontal angle of a hand.

FIG. 17 is a view illustrating a pointing/hover determination process using the horizontal angle of a hand. Here, according to a human behavioral characteristic, the angle between the user's hand and the projection surface 110 is likely to be large in a case where a pointing operation is performed by the user (left side in FIG. 17). In contrast, according to a human behavioral characteristic, the user's hand is closer to parallel to the projection surface 110 and the angle between the user's hand and the projection surface 110 tends to be small in a case where the user performs a hover operation (right side in FIG. 17). The example illustrated in FIG. 17 utilizes such human behavioral characteristics.

As described above, the pointing/hover determination processing unit 124 may determine whether the operation of the user is a pointing operation or a hover operation on the basis of an angle formed by at least a part of the upper limb and a predetermined vector or a predetermined plane. For example, the at least a part of the upper limb may be at least a part of a user's hand. At least a part of the hand may be a vector based on a predetermined position of the hand and the index finger tip position P7. Alternatively, the predetermined position of the hand may be the hand center position P14, and the predetermined vector or the predetermined plane may be a surface of an object (projection surface 110) indicated by an operation of the user.

That is, in the example illustrated in FIG. 17, the pointing/hover determination processing unit 124 determines whether the operation of the user is a pointing operation or a hover operation on the basis of the angle formed by a vector directed from the index finger tip position P7 toward the hand center position P14 and the projection surface 110. Note that the predetermined position of the hand is not limited to the hand center position P14. That is, another hand position may be used instead of the hand center position P14. As an example, the index finger joint position P8 (FIG. 11) or the like may be used instead of the hand center position P14.

Specifically, as illustrated on the left side of FIG. 17, in a case where the angle formed by the vector directed from the index finger tip position P7-3 toward the hand center position P14-3 and the projection surface 110 is a threshold Th3 or more (for example, as in the case of an angle R3), the pointing/hover determination processing unit 124 may determine that the operation of the user is a pointing operation.

In contrast, as illustrated on the right side of FIG. 17, in a case where the angle formed by the vector directed from the index finger tip position P7-4 toward the hand center position P14-4 and the projection surface 110 is smaller than the threshold Th3 or more (for example, as in the case of an angle R4), the pointing/hover determination processing unit 124 may determine that the operation of the user is a hover operation.

(1.2.5.3. Using Finger Joint Angles)

Figure 18:
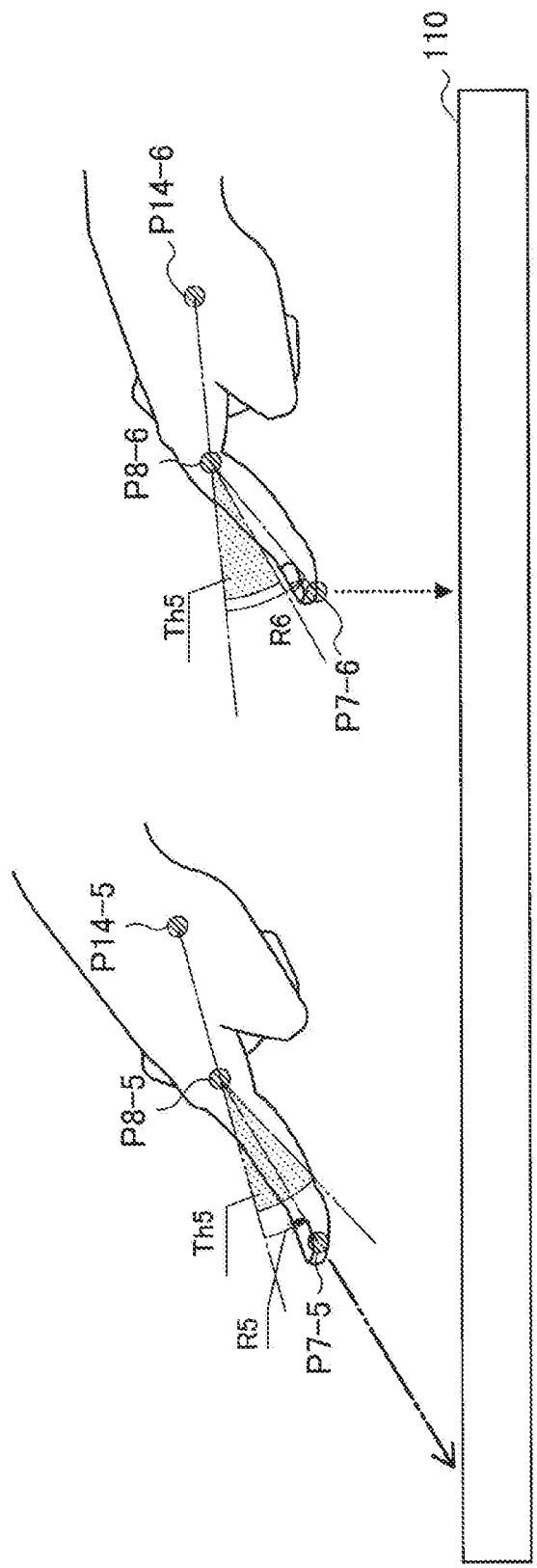
FIG. 18 is a view illustrating a pointing/hover determination process using a finger joint angle.

FIG. 18 is a view illustrating a pointing/hover determination process using finger joint angle. Here, according to a human behavioral characteristic, a user's finger is likely to stretch more in a case where a pointing operation is performed by the user (left side in FIG. 18). In contrast, according to a human behavioral characteristic, user's finger is likely to bend in a case where a hover operation is performed by the user (right side in FIG. 18). The example illustrated in FIG. 18 utilizes such human behavioral characteristics.

As described above, the pointing/hover determination processing unit 124 may determine whether the operation of the user is a pointing operation or a hover operation on the basis of an angle formed by at least a part of the upper limb and a predetermined vector or a predetermined plane. For example, the at least a part of the upper limb may be at least a part of a user's hand. At least a part of the hand may be a vector based on a predetermined position of the hand and the index finger tip position P7. Here, the predetermined position of the hand may be the index finger joint position P8, and the predetermined vector or the predetermined plane may be a vector based on the index finger joint position P8 and the hand center position P14.

That is, in the example illustrated in FIG. 18, the pointing/hover determination processing unit 124 determines whether the operation of the user is a pointing operation or a hover operation on the basis of the angle formed by the vector directed from the hand center position P14 toward the index finger joint position P8 and the vector directed from the index finger joint position P8 toward the index finger tip position P7. Note that the predetermined position of the hand is not limited to the hand center position P14. That is, another hand position may be used instead of the hand center position P14.

Specifically, as illustrated on the left side of FIG. 18, in a case where the angle formed by the vector directed from the hand center position P14-5 toward the index finger joint position P8-5 and vector directed from the index finger joint position P8-5 toward the index finger tip position P7-5 is smaller than a threshold Th5 (for example, as in the case of an angle R5), the pointing/hover determination processing unit 124 may determine that the operation of the user is a pointing operation.

In contrast, as illustrated on the right side of FIG. 18, in a case where the angle formed by the vector directed from the hand center position P14-6 toward the index finger joint position P8-6 and the vector directed from the index finger joint position P8-6 toward the index finger tip position P7-6 is the threshold Th5 or more (for example, as in the case of an angle R6), the pointing/hover determination processing unit 124 may determine that the operation of the user is a hover operation.

(1.2.5.4. Using Arm Joint Angles)

Figure 19:
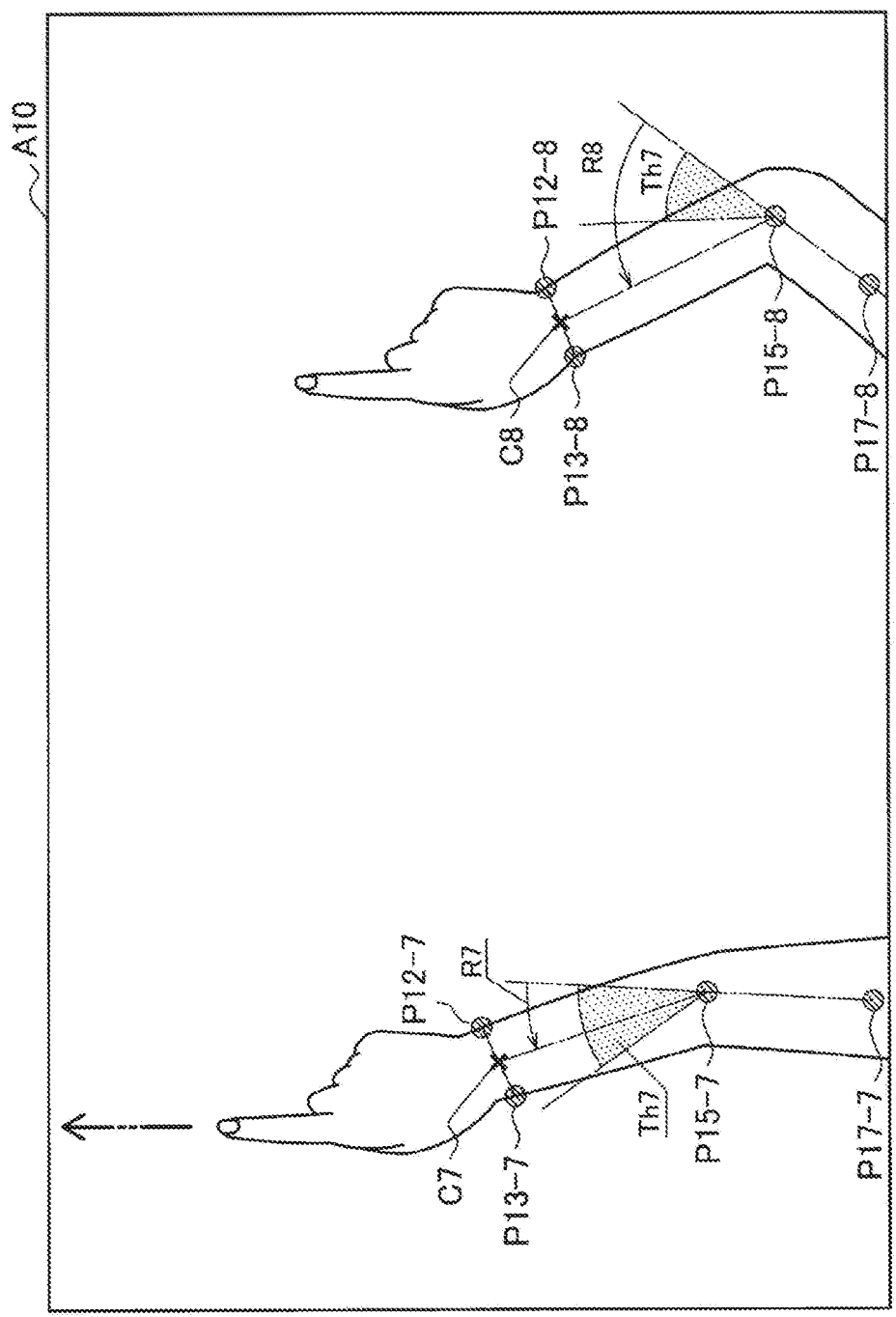
FIG. 19 is a view illustrating a pointing/hover determination process using a joint angle of an arm.

FIG. 19 is a view illustrating a pointing/hover determination process using arm joint angles. Here, according to a human behavioral characteristic, a user's arm is likely to stretch more in a case where a pointing operation is performed by the user (left side in FIG. 19). In contrast, according to a human behavioral characteristic, user's arm is likely to bend in a case where a hover operation is performed by the user (right side in FIG. 19). The example illustrated in FIG. 19 utilizes such human behavioral characteristics.

As described above, the pointing/hover determination processing unit 124 may determine whether the operation of the user is a pointing operation or a hover operation on the basis of an angle formed by at least a part of the upper limb and a predetermined vector or a predetermined plane. For example, the at least a part of the upper limb may be at least a part of a user's arm. At least a part of the arm may be a vector based on the user's wrist position (a midpoint between the wrist position (little finger side) P12 and the wrist position (thumb side) P13) and the elbow joint position P15. Here, the predetermined vector or the predetermined plane may be a vector based on the user's upper arm position (for example, the upper arm base position P16 (FIG. 13)) and the elbow joint position P15.

That is, in the example illustrated in FIG. 19, the pointing/hover determination processing unit 124 determines whether the operation of the user is a pointing operation or a hover operation on the basis of an angle formed by the vector directed from the user's upper arm position (the upper arm base position P16 (FIG. 13)) toward the elbow joint position P15 and the vector directed from the elbow joint position P15 toward a wrist position (a midpoint between the wrist position (little finger side) P12 and the wrist position (thumb side) P13).

Here, as described above, the upper arm base position P16 (FIG. 13) might not be directly acquired (image A10 in FIG. 19) in some cases. Even in such a case, after acquisition of any position between the elbow joint position P15 and the upper arm base position P16 (FIG. 13) as the upper arm position, the acquired position can be used instead of the upper arm base position P16 (FIG. 13). As illustrated in the image A10 of FIG. 19, here is an assumed case where the upper arm position P17, which is a position between the elbow joint position P15 and the upper arm base position P16 (FIG. 13) has been acquired at the end of the image A10.

Furthermore, the wrist position is not limited to the midpoint between the wrist position (little finger side) P12 and the wrist position (thumb side) P13. That is, another position of the hand may be used instead of the midpoint between the wrist position (little finger side) P12 and the wrist position (thumb side) P13. For example, any position between the wrist position (little finger side) P12 and the wrist position (thumb side) P13 may be used instead of the midpoint between the wrist position (little finger side) P12 and the wrist position (thumb side) P13.

Specifically, as illustrated on the left side of FIG. 19, in a case where the angle formed by the vector directed from the upper arm position P17-7 toward the elbow joint position P15-7 and the vector directed from the elbow joint position P15-7 toward a wrist position (midpoint between the wrist position (little finger side) P12-7 and the wrist position (thumb side) P13-7) is smaller than a threshold Th7 (for example, as in the case of an angle R7), the pointing/hover determination processing unit 124 may determine that the operation of the user is a pointing operation.

In contrast, as illustrated on the right side of FIG. 19, in a case where the angle formed by the vector directed from the upper arm position P17-8 toward the elbow joint position P15-8 and the vector directed from the elbow joint position P15-8 toward a wrist position (midpoint between the wrist position (little finger side) P12-8 and the wrist position (thumb side) P13-8) is the threshold Th7 or more (for example, as in the case of an angle R8), the pointing/hover determination processing unit 124 may determine that the operation of the user is a hover operation.

(1.2.5.5. Using Intersection of Line-of-Sight Vector and Pointing Vector)

Figure 20:
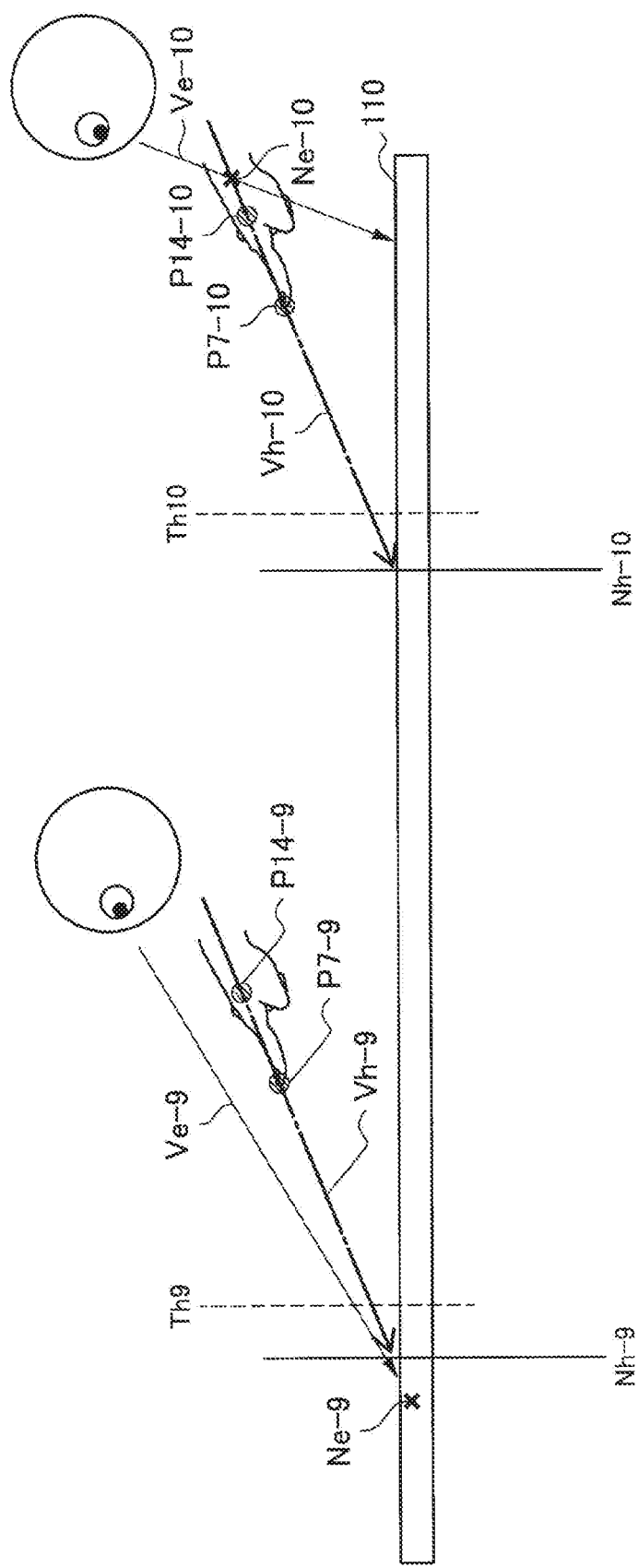
FIG. 20 is a view illustrating a pointing/hover determination process using an intersection of a line-of-sight vector and a pointing vector.

FIG. 20 is a view illustrating a pointing/hover determination process using an intersection of a line-of-sight vector and a pointing vector. Here, according to a human behavioral characteristic, in a case where the pointing operation is performed by the user, the line-of-sight vector runs in slightly more downward direction than the pointing vector because the object to be pointed is on more distant side (the left side of FIG. 20). In contrast, due to human behavioral characteristic, in a case where the hover operation is performed by the user, the line-of-sight vector runs in significantly more downward direction than the pointing vector because the object to be pointed is on less distant side (the right side of FIG. 20). The example illustrated in FIG. 20 utilizes such human behavioral characteristics.

That is, in the example illustrated in FIG. 20, the pointing/hover determination processing unit 124 regards a vector directed from the hand center position P14 toward the index finger tip position P7 as a pointing vector Vh, calculates a point (intersection Nh) at which the pointing vector Vh intersects the projection surface 110, and then calculates a reference position separated frontward from the intersection point Nh by a distance threshold. The pointing/hover determination processing unit 124 determines that the operation of the user is a pointing operation when the point (intersection Ne) at which the pointing vector Vh intersects the line-of-sight vector Ve is on more distant side than the reference position. In contrast, the pointing/hover determination processing unit 124 determines that the operation of the user is a hover operation when the intersection Ne is on less distant side than the reference position.

Here, it is mainly assumed that a vector directed from the hand center position P14 toward the index finger tip position P7 is defined as the pointing vector Vh. As described above, the hand center position P14 is not particularly limited as long as it is any position in the area between the base of each of the five fingers and the wrist. As described above, the pointing vector Vh may be defined as a direction from a predetermined position of a hand (hand center position P14 or index finger joint position P8) toward the finger tip position P7 on the basis of the predetermined position of the hand.

Furthermore, the line-of-sight vector Ve may be detected in any manner. For example, in a case where a projection type display method is adopted as in the information processing system 100a (FIG. 4), the line-of-sight vector Ve can be detected by a fisheye camera when the fisheye camera is provided above the table 110a in a state of being suspended from the ceiling. In another case, for example, where a rear projection type display method is adopted as in the information processing system 100b (FIG. 5), the line-of-sight vector Ve can be detected by a fisheye camera when the fisheye camera is provided on a top surface of the table 110a.

In still another case, for example, where a flat display type display method is adopted as in the information processing system 100c (FIG. 6), the line-of-sight vector Ve can be detected by a fisheye camera when the fisheye camera is provided on a top surface of the table 110a. Furthermore, for example, in a case where an eyewear terminal is adopted as in the information processing system 100d (FIG. 7), the line-of-sight vector detection vector Ve can be detected by a line-of-sight detection camera when the eyewear terminal is provided with the line-of-sight detection camera.

Specifically, as illustrated on the left side of FIG. 20, the pointing/hover determination processing unit 124 calculates a vector directed from a hand center position P14-9 to an index finger tip position P7-9 as a pointing vector Vh-9, calculates a point at which the pointing vector Vh-9 intersects the projection surface 110 as an intersection Nh-9, and then, calculates a reference position Th9 at a position separated frontward from the intersection Nh-9 by the distance threshold. The pointing/hover determination processing unit 124 calculates the point at which the pointing vector Vh-9 intersects the line-of-sight vector Ve-9 as an intersection Ne-9. When the intersection Ne-9 is on more distant side than the reference position Th9, the pointing/hover determination processing unit 124 may determine that the operation of the user is a pointing operation.

In contrast, as illustrated on the right side of FIG. 20, the pointing/hover determination processing unit 124 calculates a vector directed from a hand center position P14-10 to an index finger tip position P7-10 as a pointing vector Vh-10, calculates a point at which the pointing vector Vh-10 intersects the projection surface 110 as an intersection Nh-10, and then, calculates a reference position Th10 at a position separated frontward from the intersection Nh-10 by the distance threshold. The pointing/hover determination processing unit 124 calculates the point at which the pointing vector Vh-10 intersects the line-of-sight vector Ve-10 as an intersection Ne-10. When the intersection Ne-10 is on less distant side than the reference position Th10, the pointing/hover determination processing unit 124 may determine that the operation of the user is a hover operation.

(1.2.5.6. Using Angle Between Line-of-Sight Vector and Pointing Vector)

Figure 21:
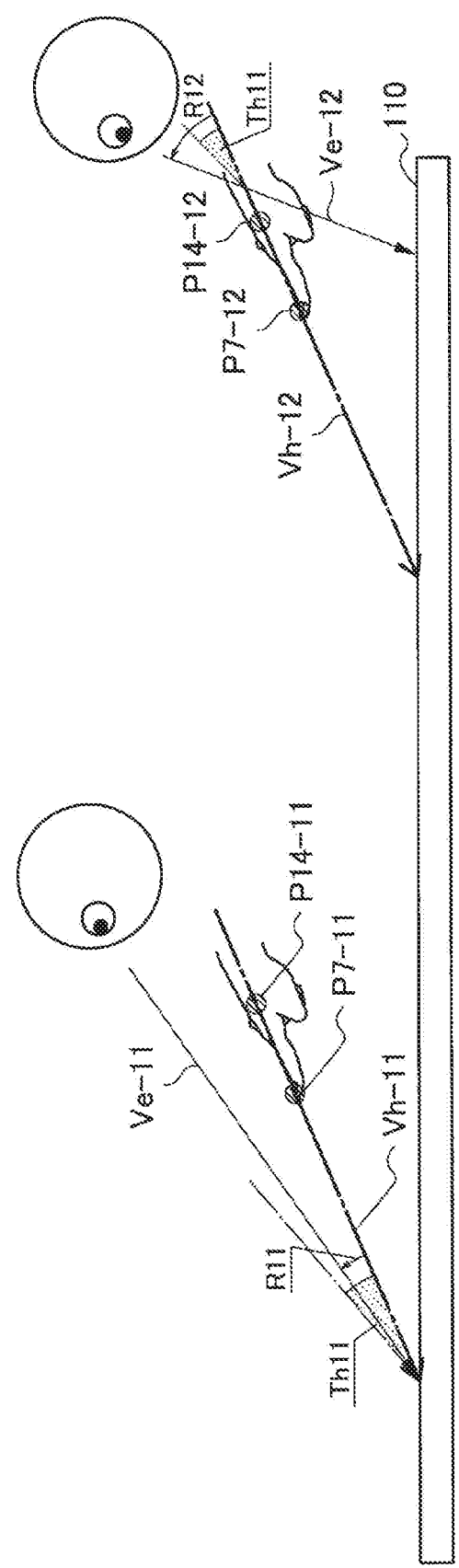
FIG. 21 is a view illustrating a pointing/hover determination process using an intersection of a line-of-sight vector and a pointing vector.

FIG. 21 is a view illustrating a pointing/hover determination process using an angle between a line-of-sight vector and a pointing vector. Similarly to the example illustrated in FIG. 20, according to a human behavioral characteristic, in a case where the pointing operation is performed by the user, the line-of-sight vector runs in slightly more downward direction than the pointing vector because the object to be pointed is on more distant side (the left side of FIG. 21). In contrast, according to a human behavioral characteristic, in a case where the hover operation is performed by the user, the line-of-sight vector runs in significantly more downward direction than the pointing vector because the object to be pointed is on less distant side (the right side of FIG. 21). The example illustrated in FIG. 21 utilizes such human behavioral characteristics.

As described above, the pointing/hover determination processing unit 124 may determine whether the operation of the user is a pointing operation or a hover operation on the basis of an angle formed by at least a part of the upper limb and a predetermined vector or a predetermined plane. For example, the at least a part of the upper limb may be at least a part of a user's hand. At least a part of the hand may be a vector based on a predetermined position of the hand and the index finger tip position P7. Furthermore, the predetermined position of the hand may be the hand center position P14. The predetermined vector or the predetermined plane may be the user's line-of-sight vector.

That is, in the example illustrated in FIG. 21, the pointing/hover determination processing unit 124 determines whether the operation of the user is a pointing operation or a hover operation on the basis of the angle formed by the vector directed from the hand center position P14 toward the index finger tip position P7 and the line-of-sight vector. Note that the predetermined position of the hand is not limited to the hand center position P14. That is, another hand position may be used instead of the hand center position P14. As an example, the index finger joint position P8 (FIG. 11) or the like may be used instead of the hand center position P14.

Specifically, as illustrated on the left side of FIG. 21, in a case where the angle formed by a vector Vh-11 directed from a hand center position P14-11 toward an index finger tip position P7-11 and a line-of-sight vector Ve-11 is smaller than a threshold Th11 (for example, as in the case of an angle R11), the pointing/hover determination processing unit 124 may determine that the operation of the user is a pointing operation.

In contrast, as illustrated on the right side of FIG. 21, in a case where the angle formed by a vector Vh-12 from a hand center position P14-12 toward an index finger tip position P7-12 and a line-of-sight vector Ve-12 is the threshold Th11 or more (for example, as in the case of an angle R12), the pointing/hover determination processing unit 124 may determine that the operation of the user is a hover operation.

(1.2.5.7. Using Angle Between Thumb and Index Finger)

Figure 22:
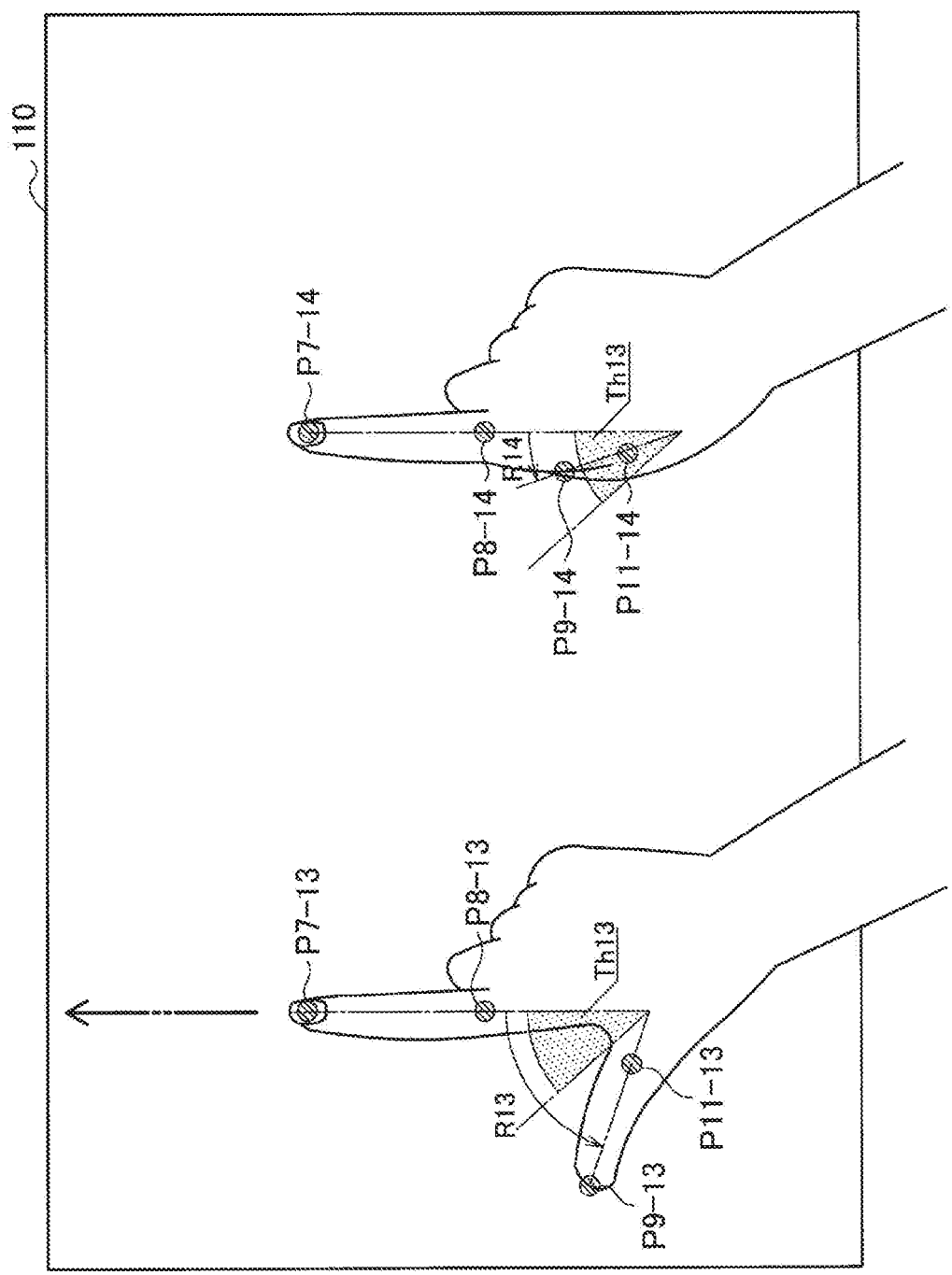
FIG. 22 is a view illustrating a pointing/hover determination process using an angle between a thumb and an index finger.

FIG. 22 is a view illustrating a pointing/hover determination process using an angle between a thumb and an index finger. The example illustrated in FIG. 22 assumes a case where the user performs a pointing operation and a hover operation with explicitly different hand shapes so that the pointing operation and the hover operation can be distinguished. The hand shape used for each of the pointing operation and the hover operation may be preliminarily determined in any manner. Here is an exemplary case where it is predetermined that the pointing operation is performed with a hand shape in which the thumb is opened with respect to the index finger (pistol gesture), while the hover operation is performed with a hand shape in which the thumb is closed with respect to the index finger.

As described above, the pointing/hover determination processing unit 124 may determine whether the operation of the user is a pointing operation or a hover operation on the basis of an angle formed by at least a part of the upper limb and a predetermined vector or a predetermined plane. For example, the at least a part of the upper limb may be at least a part of a user's hand. At least a part of the hand may be a vector based on a predetermined position of the hand and the index finger tip position P7. The predetermined position of the hand may be the index finger joint position P8. The predetermined vector or the predetermined plane may be a vector based on the second joint position from the tip of thumb P11 and the thumb tip position P9.

That is, in the example illustrated in FIG. 21, the pointing/hover determination processing unit 124 calculates the angle formed by the vector directed from the index finger joint position P8 toward the index finger tip position P7 and the vector directed from the second joint position from the tip of thumb P11 toward the thumb tip position P9. Subsequently, the pointing/hover determination processing unit 124 regards the angle as an angle formed by the thumb and the index finger, and then determines whether the operation of the user is a pointing operation or a hover operation on the basis of the angle. The predetermined position of the hand is not limited to the index finger joint position P8. That is, another position of the hand may be used instead of the index finger joint position P8. As an example, the hand center position P14 (FIG. 11) or the like may be used instead of the index finger joint position P8.

Specifically, as illustrated on the left side of FIG. 22, in a case where the angle formed by a vector directed from an index finger joint position P8-13 to an index finger tip position P7-13 and a vector directed from a second joint position from the tip of thumb P11-13 toward a thumb tip position P9-13 is a threshold Th13 or more (for example, as in the case of an angle R13), the pointing/hover determination processing unit 124 may determine that the operation of the user is a pointing operation.

In contrast, as illustrated on the right side of FIG. 22, in a case where the angle formed by a vector directed from an index finger joint position P8-14 to an index finger tip position P7-14 and a vector directed from a second joint position from the tip of thumb P11-14 toward a thumb tip position P9-14 is smaller than the threshold Th13 (for example, as in the case of an angle R14), the pointing/hover determination processing unit 124 may determine that the operation of the user is a hover operation.

An example of determination as to whether the operation of the user is a pointing operation or a hover operation has been described as above.

(1.2.6. Cooperation of Application and System)

In the information processing apparatus 10, an application and a system are executed, and the application and the system cooperate work in cooperation. More specifically, each of the application and the system is implemented as a program, and is executed by a processing device such as one or more CPUs in the information processing apparatus 10, enabling implementation of the display control unit 121 and the operation detection processing unit 122 or the like. A system can correspond to lower layer software such as an operating system (OS) or middleware. An application can correspond to software that performs individual processes on the system.

Figure 23:
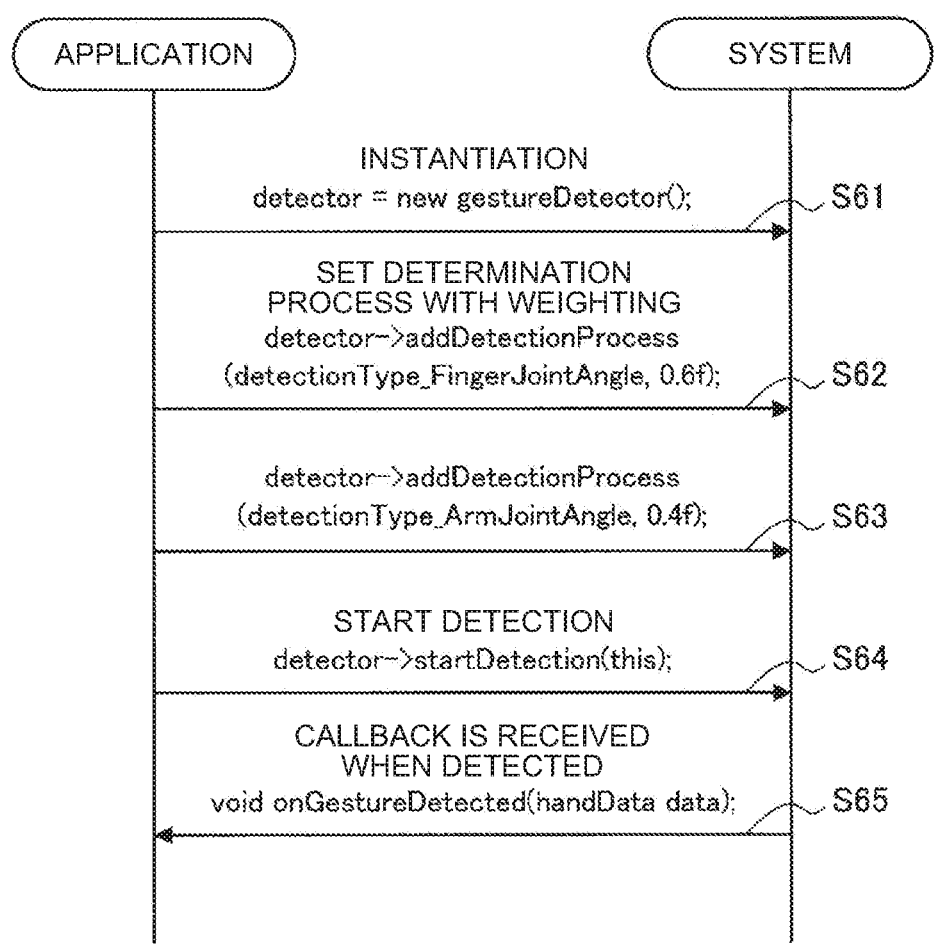
FIG. 23 is a sequence diagram illustrating cooperation of an application and a system.

Hereinafter, an example of cooperation of the application and the system will be described. FIG. 23 is a sequence diagram illustrating cooperation of an application and a system. First, as illustrated in FIG. 23, an application instantiates a class for acquiring hand information (S61). Subsequently, the application designates a gesture type determination condition indicating whether the operation of the user is a pointing operation or a hover operation. At this time, the application designates, as a determination condition, a weight assigned to one or more parameters used for determining the gesture type.

For example, in a case where the application designates the weight assigned to each of the plurality of parameters as the determination condition, the weight assigned to each of the plurality of parameters may be equal. For example, in a case where the application requests to determine the gesture type only by the determination process described in the section "1.2.5.1. Using z-position of fingertip" above, it is sufficient to set the parameter "detectionType_FingerZ" corresponding to the determination process to "1.0f" and call the method "detector→addDetectionProcess".

Here is a case of assuming that a different weight is assigned to each of the plurality of parameters. Specifically, here is a case of assuming that gesture type determination request is made using mutually different weights "0.6" and "0.4" for each of the determination process described in the section "1.2.5.3. Using finger joint angles" and the determination process described in the section "1.2.5.4. Using arm joint angles".

In such a case, the application can set the parameter "detectionType_FingerJointAngle" to "0.6f" and call the method "detector→addDetectionProcess" (S62). Subsequently, the application can set the parameter "detectionType_ArmJointAngle" to "0.4f" and call the method "detector→addDetectionProcess" (S63). Note that the determination process used for determining the gesture type is not limited to these.

When the designation of the determination condition is completed, the application issues a gesture detection start instruction (for example, by calling "detector→startDetection") (S64). In a case where a gesture is detected by the system, the application receives a callback (for example, by a method "onGestureDetected") (S65). In response to this, the application receives a notification based on the gesture type determination corresponding to the determination condition from the system. The notification includes hand information "handData".

FIG. 24 is a diagram illustrating an example of a structure of hand information. Referring to FIG. 24, the structure of hand information includes individual attributes. For example, the attributes of the structure of hand information includes "gesture type". That is, the system notifies the application of the determined gesture type as an example of hand information. In addition, the attributes of the structure of hand information include an x-position "screenPositionX" on the projection surface and a y-position "screenPositionY" on the projection surface, as indicated positions by the operation. The x-position and the y-position respectively represent a position on the x-axis and a position on the y-axis, parallel to the projection surface and perpendicular to each other.

Here, the indicated position may vary depending on whether the operation of the user is a pointing operation or a hover operation. That is, the system may notify the application of an indicated position according to whether the operation of the user is a pointing operation or a hover operation. Specifically, as illustrated in FIG. 24, in a case where the operation of the user is a hover operation, the system can notify the application of two-dimensional coordinates (x-position and y-position) of the index finger tip position P7 in space.

In contrast, in a case where the operation of the user is a pointing operation, the system can notify the application of two-dimensional coordinates (x-position and y-position) on a projection surface indicated by an extension of the index finger tip position P7. For example, the two-dimensional coordinates on the projection surface indicated by an extension of the index finger tip position P7 may be two-dimensional coordinates of a point at which the pointing vector directed from the hand center position P14 toward the index finger tip position P7 intersects the projection surface.

FIG. 25 is a view illustrating a description example of a source code corresponding to a system using the programming language C++. Since the example illustrated in FIG. 25 is merely an example of the source code corresponding to the system, the source code corresponding to the system is not limited to the example illustrated in FIG. 25. FIG. 26 is a view illustrating a description example of a source code corresponding to an application using the programming language C++. Similarly to the example illustrated in FIG. 25, since the example illustrated in FIG. 26 is merely an example of the source code corresponding to the application, the source code corresponding to the application is not limited to the example illustrated in FIG. 26.

The example of the cooperation of an application and a system has been described above.

(1.2.7. Implementation Example)

Subsequently, an implementation example of applications (for example, including game applications) using the above-described one embodiment of the present disclosure will be described. In the following, implementation examples of applications will be described in the order of "1.2.7.1. Photo application", "1.2.7.2. Paint application", "1.2.7.3. Architectural design simulation application", "1.2.7.4. Breakout game application", and "1.2.7.5. Association game application, "1.2.7.6. Word search game application" and "1.2.7.7. Performance game application".

(1.2.7.1. Photo Application)

FIG. 27 is a diagram illustrating an example of correspondence information in an implementation example of a photo application. As illustrated in FIG. 27, the correspondence information associates a process with each of the tap operation, the drag operation, the hover operation, and the pointing operation. In the photo application, a process corresponding to each of operations is executed on the basis of the correspondence information. Hereinafter, an execution example of the process corresponding to each of the tap operation, the drag operation, the hover operation, and the pointing operation will be described with reference to FIGS. 28 to 31.

Figure 28:
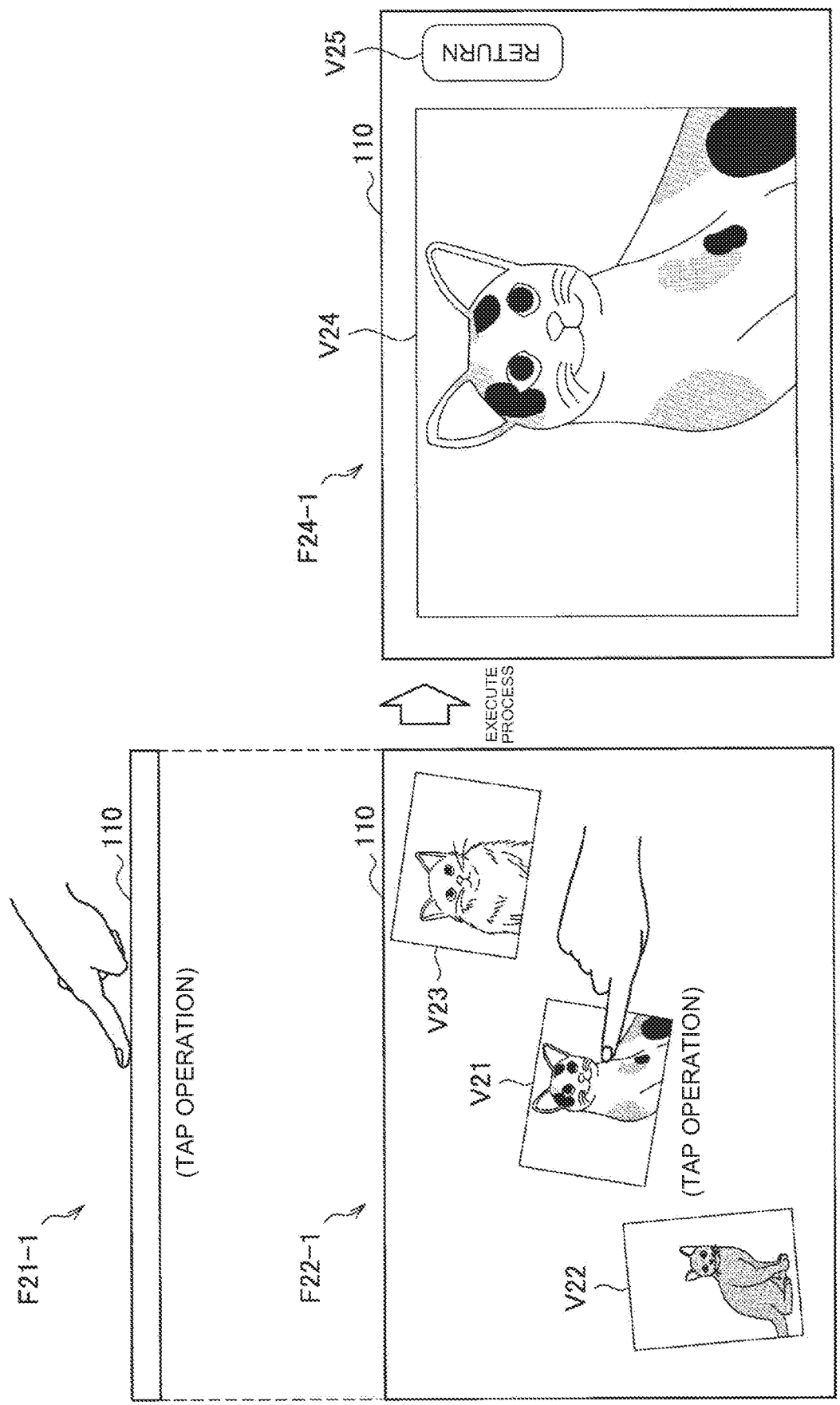
FIG. 28 is a view illustrating an example of a process executed when a tap operation is detected in an implementation example of a photo application.

FIG. 28 is a view illustrating an example of a process executed when a tap operation is detected in an implementation example of a photo application. Referring to a top view F22-1, photographs are projected on the projection surface 110 as virtual objects V21 to V23. As illustrated in a side view F21-1 and the top view F22-1, here assumes a case where a tap operation is performed on the virtual object V21 (photograph) by the user and the tap operation is detected by the tap/drag determination processing unit 123.

In such a case, the display control unit 121 performs a process of enlarged display of the virtual object V21 (photograph) on which the tap operation has been performed, as a process corresponding to the tap operation. Referring to the top view F24-1, the enlarged virtual object V24 (photograph) is projected on the projection surface 110 under the control of the display control unit 121. Furthermore, a virtual object V25 (button) for returning the virtual object V24 (photograph) to the original size is also projected on the projection surface 110.

Figure 29:
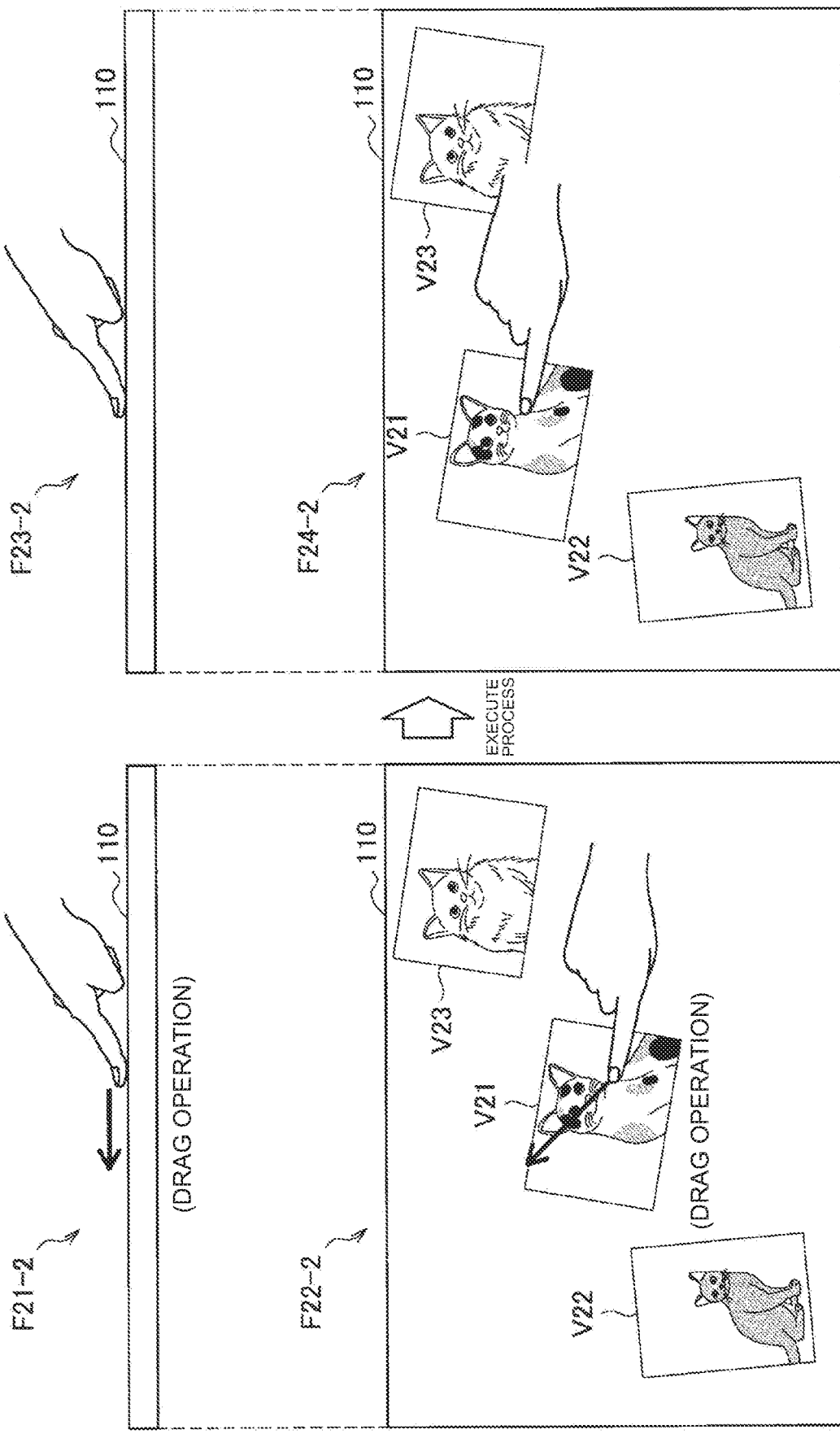
FIG. 29 is a view illustrating an example of a process executed when a drag operation is detected in an implementation example of a photo application.

FIG. 29 is a view illustrating an example of a process executed when a drag operation is detected in an implementation example of a photo application. Referring to the top view F22-2, photographs are projected on the projection surface 110 as virtual objects V21 to V23. As illustrated in the side view F21-2 and the top view F22-2, here assumes a case where a drag operation is performed on the virtual object V21 (photograph) by the user and the drag operation is detected by the tap/drag determination processing unit 123.

In such a case, the display control unit 121 performs a process of moving the virtual object V21 (photograph) on which the drag operation has been performed, as a process corresponding to the drag operation. Referring to a side view F23-2 and a top view F24-2, virtual object V21 (photograph) after movement is projected on the projection surface 110 under the control of the display control unit 121.

Figure 30:
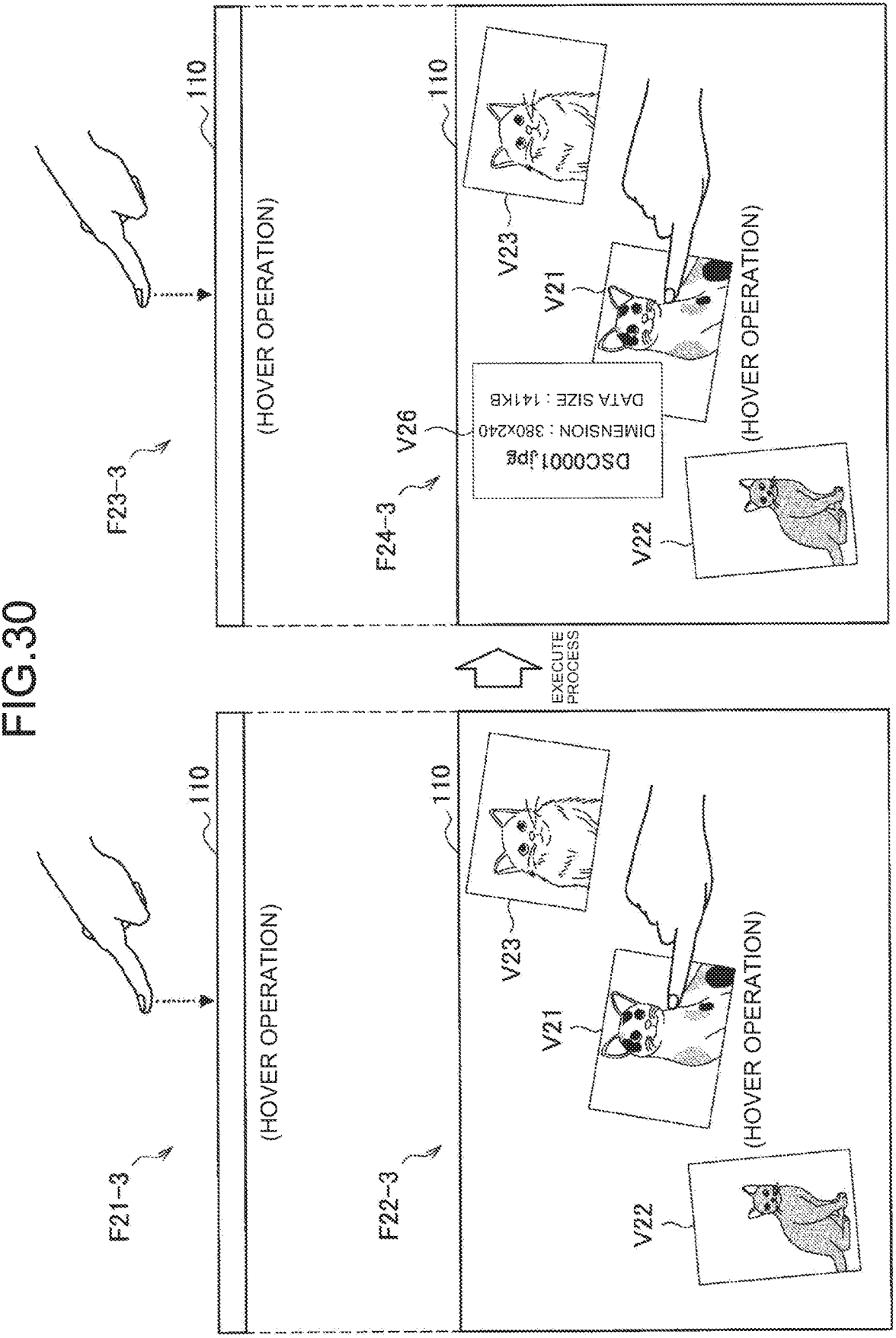
FIG. 30 is a view illustrating an example of a process executed when a hover operation is detected in an implementation example of a photo application.

FIG. 30 is a view illustrating an example of a process executed when a hover operation is detected in an implementation example of the photo application. Referring to a top view F22-3, photographs are projected on the projection surface 110 as virtual objects V21 to V23. As illustrated in a side view F21-3 and the top view F22-3, here assumes a case where a hover operation is performed on the virtual object V21 (photograph) by the user and the hover operation is detected by the pointing/hover determination processing unit 124.

In such a case, the display control unit 121 performs a process of displaying auxiliary information of the virtual object V21 (photograph) on which the hover operation has been performed, as a process corresponding to the hover operation. Referring to side view F23-3 and top view F24-3, a virtual object V26 (auxiliary information) corresponding to the virtual object V21 (photograph) is projected on the projection surface 110 under the control of the display control unit 121.

Figure 31:
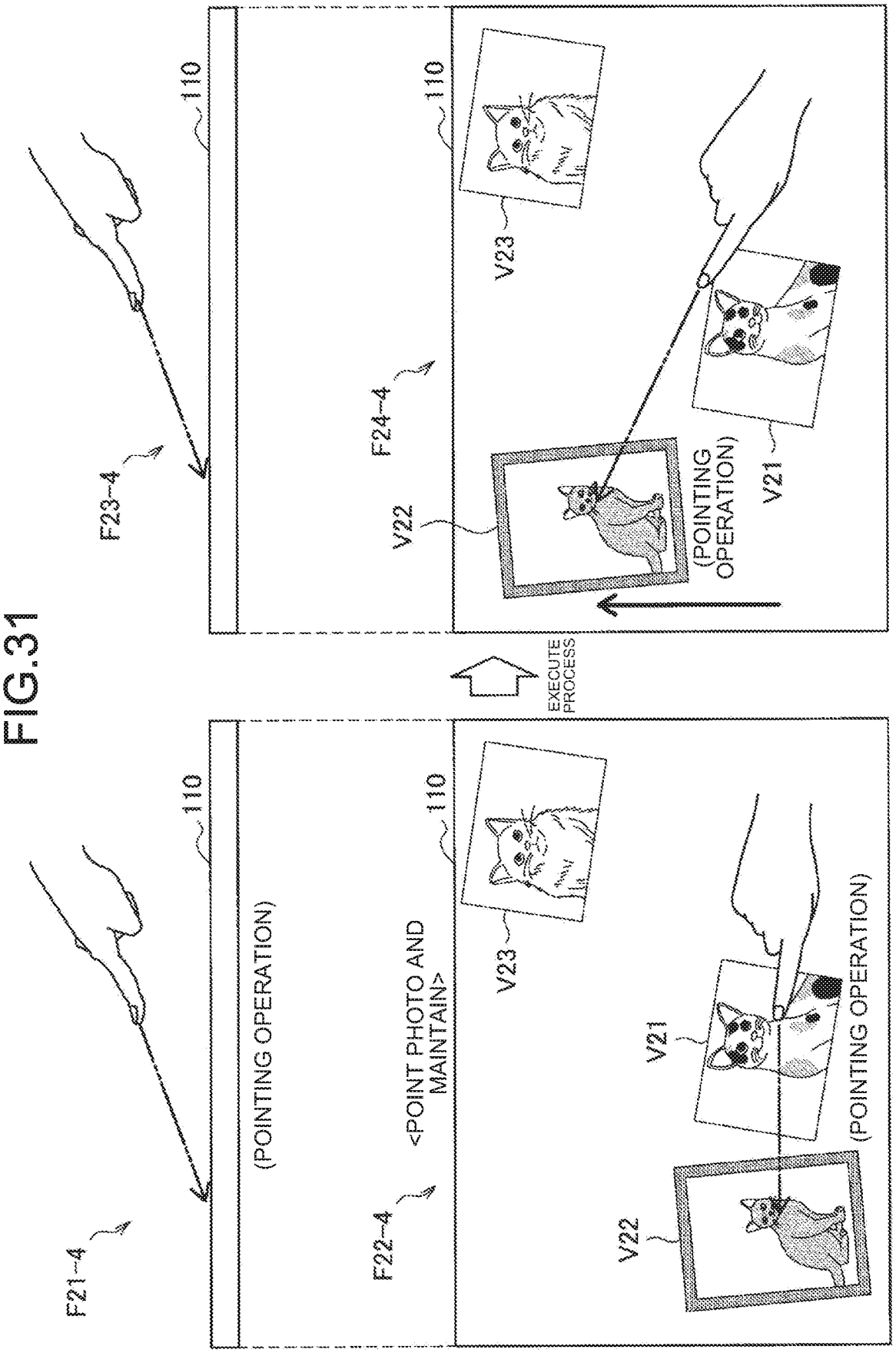
FIG. 31 is a view illustrating an example of a process executed when a pointing operation is detected in an implementation example of a photo application.

FIG. 31 is a view illustrating an example of a process executed when a pointing operation is detected in an implementation example of a photo application. Referring to a top view F22-4, photographs are projected on the projection surface 110 as virtual objects V21 to V23. As illustrated in the side view F21-4 and the top view F22-4, here assumes a case where a pointing operation is performed on the virtual object V22 (photograph) by the user for more than a predetermined time (for example, several seconds) and the pointing operation is detected by the pointing/hover determination processing unit 124.

In such a case, the display control unit 121 performs a process of setting the virtual object V22 (photograph) on which the pointing operation has been performed for more than a predetermined time as a process corresponding to the pointing operation to a selected state and then moving the virtual object V22 (photograph) in the selected state. Referring to side view F2343 and a top view F24-4, the virtual object V22 (photograph) after movement is projected on the projection surface 110 under the control of the display control unit 121.

(1.2.7.2. Paint Application)

FIG. 32 is a diagram illustrating an example of correspondence information in an implementation example of a paint application. As illustrated in FIG. 32, the correspondence information associates a process with each of the tap operation, the drag operation, the hover operation, and the pointing operation. In the paint application, a process corresponding to each of operations is executed on the basis of the correspondence information. Hereinafter, an execution example of the process corresponding to each of the tap operation, the drag operation, the hover operation, and the pointing operation will be described with reference to FIGS. 33 to 36.

Figure 33:
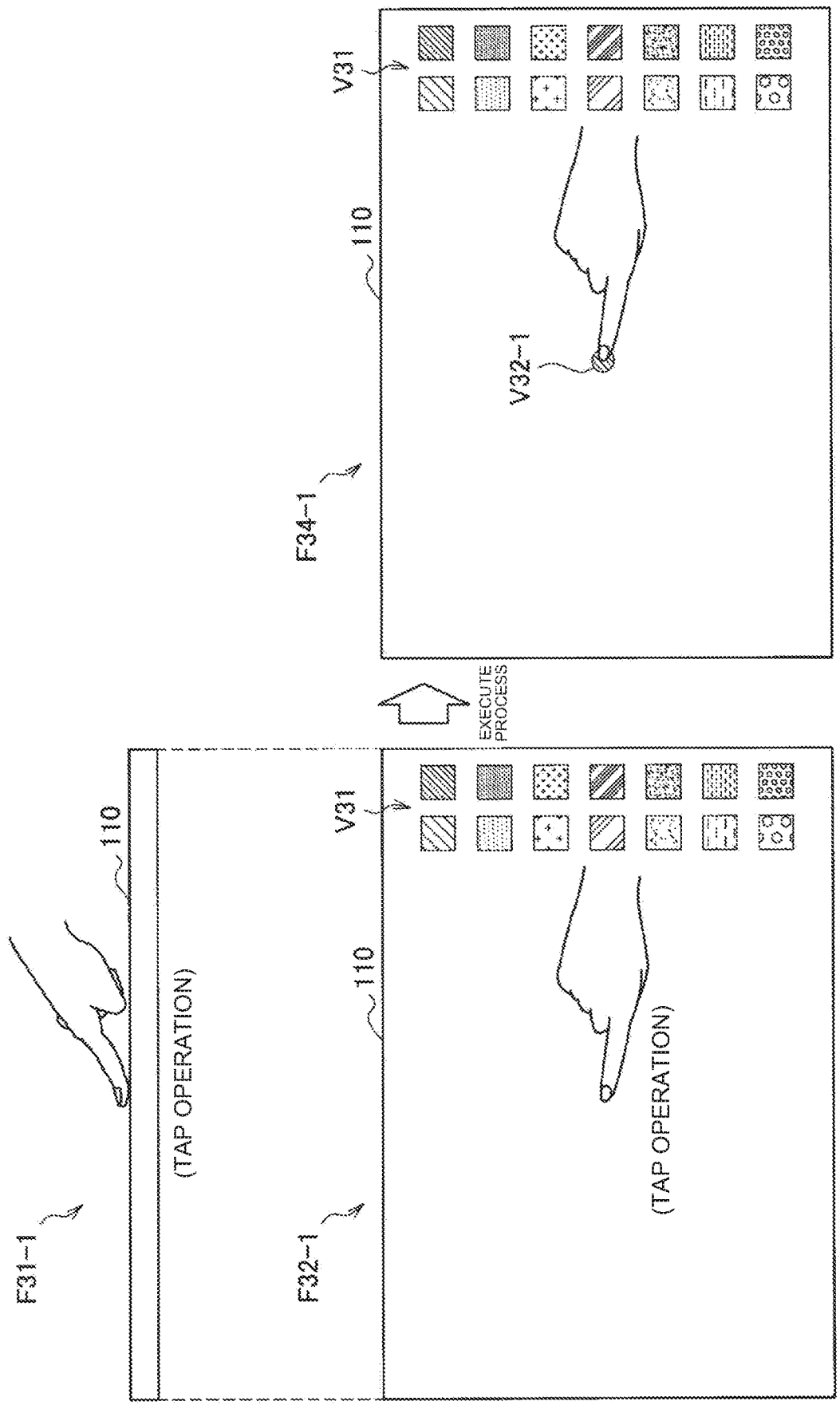
FIG. 33 is a view illustrating an example of a process executed when a tap operation is detected in an implementation example of a paint application.

FIG. 33 is a view illustrating an example of a process executed when a tap operation is detected in an implementation example of a paint application. Referring to a top view F32-1, a palette for selecting a pen color by a tap operation is projected on the projection surface 110 as a virtual object V31. As illustrated in a side view F31-1 and the top view F32-1, here assumes a case where the user performs a tap operation on an area (canvas) other than the virtual object V31 on the projection surface 110, and the tap/drag determination processing unit 123 has detected the tap operation.

In such a case, the display control unit 121 performs a process of drawing a picture at the position where the tap operation has been performed on the canvas, as a process corresponding to the tap operation. Referring to top view F34-1, a virtual object V32-1 (picture) drawn by the tap operation is projected on the projection surface 110 under the control of the display control unit 121.

Figure 34:
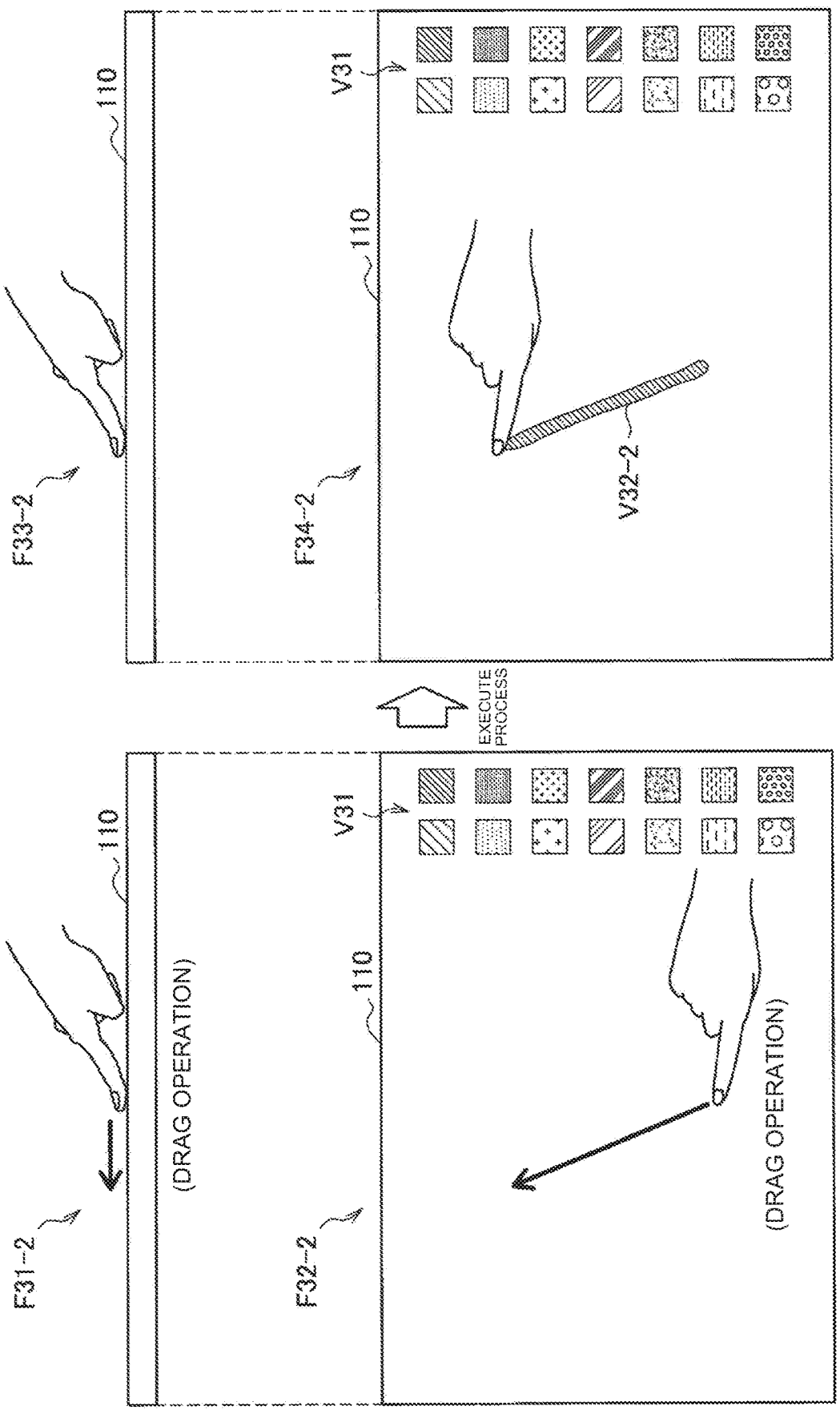
FIG. 34 is a view illustrating an example of a process executed when a drag operation is detected in an implementation example of a paint application.

FIG. 34 is a view illustrating an example of a process executed when a drag operation is detected in an implementation example of the paint application. Referring to a top view F32-2, a palette for selecting a pen color by a tap operation is projected on the projection surface 110 as the virtual object V31. As illustrated in a side view F31-2 and the top view F32-2, here assumes a case where the user performs a drag operation on an area (canvas) other than the virtual object V31 on the projection surface 110, and the tap/drag determination processing unit 123 has detected the drag operation.

In such a case, the display control unit 121 performs a process of drawing a picture at the position (trajectory) where the drag operation has been performed on the canvas, as a process corresponding to the drag operation. Referring to a side view F33-2 and a top view F34-2, a virtual object V32-2 (picture) drawn by the drag operation is projected on the projection surface 110 under the control of the display control unit 121.

Figure 35:
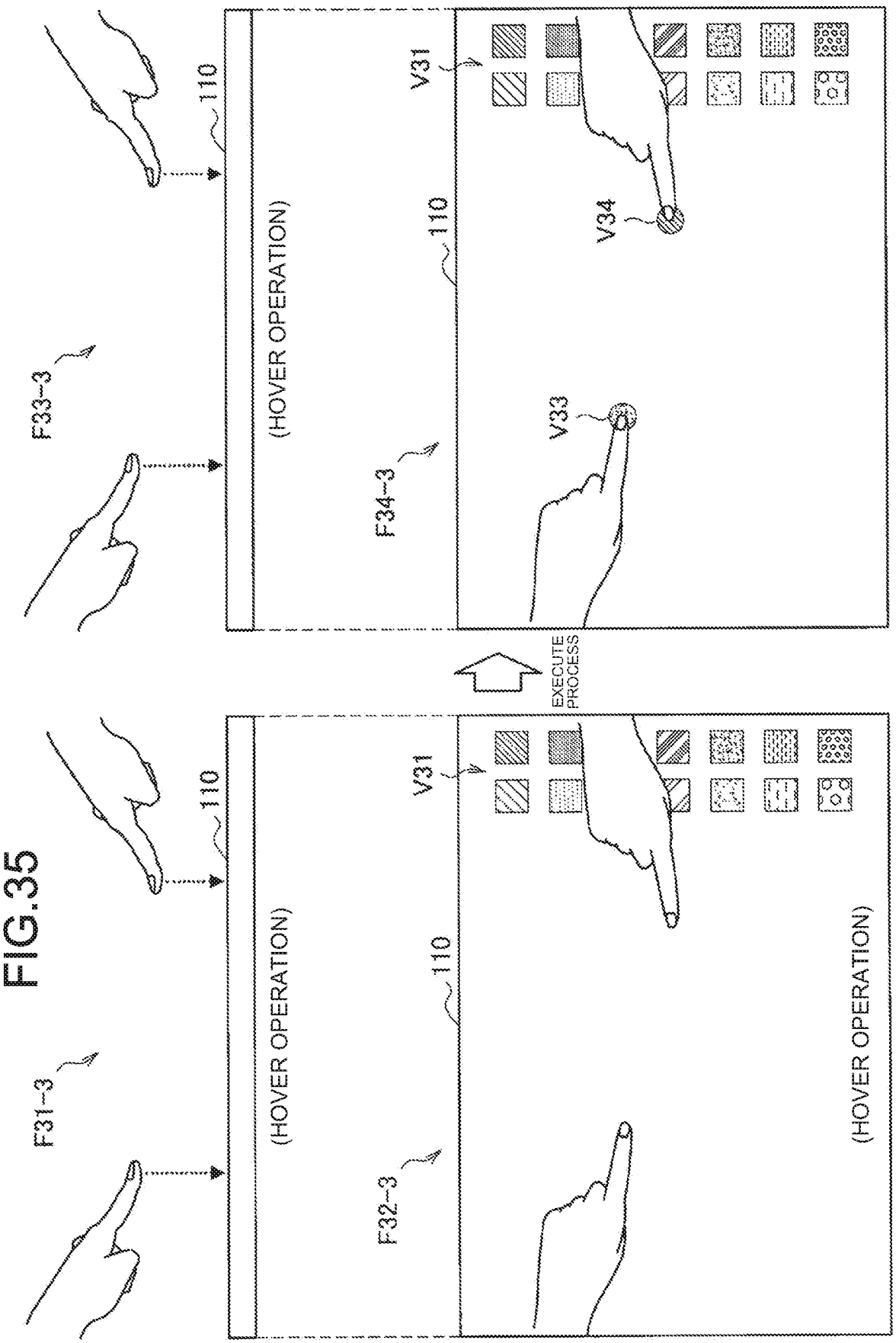
FIG. 35 is a view illustrating an example of a process executed when a hover operation is detected in an implementation example of a paint application.

FIG. 35 is a view illustrating an example of a process executed when a hover operation is detected in an implementation example of the paint application. Referring to a top view F32-3, a palette for selecting a pen color by a tap operation is projected on the projection surface 110 as the virtual object V31. As illustrated in a side view F31-3 and the top view F32-3, here assumes a case where the user performs a hover operation on an area (canvas) other than the virtual object V31 on the projection surface 110, and the pointing/hover determination processing unit 124 has detected the hover operation.

In such a case, the display control unit 121 performs a process of displaying the currently selected pen color as a process corresponding to the hover operation. With reference to a side view F33-3 and a top view F34-3, the currently selected pen colors of two users are projected on the projection surface 110 as a virtual object V33 (pen color) and a virtual object V34 (pen color) under the control of the display control unit 121.

Figure 36:
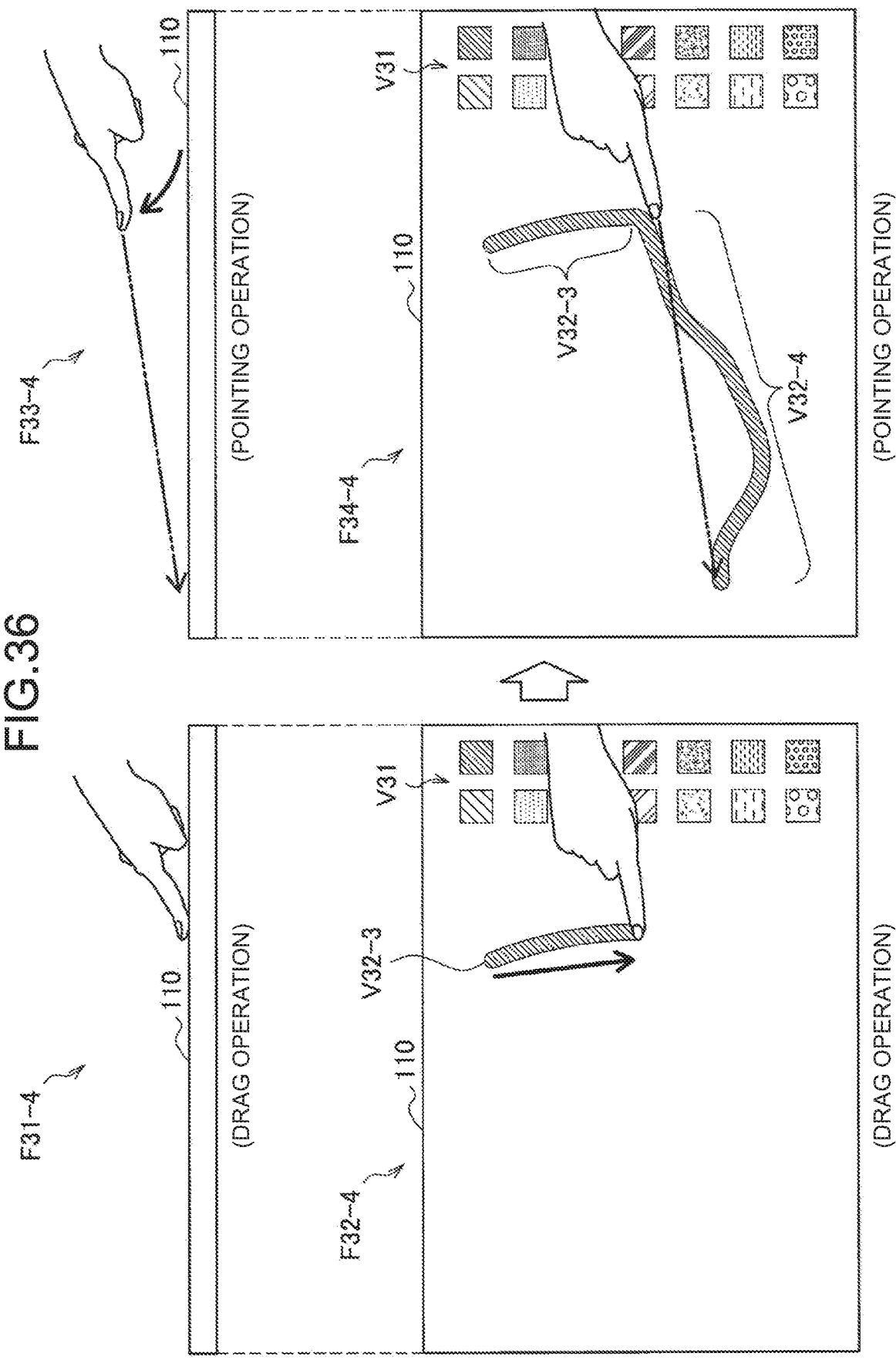
FIG. 36 is a view illustrating an example of a process executed when a pointing operation is detected in an implementation example of a paint application.

FIG. 36 is a view illustrating an example of a process executed when a pointing operation is detected in an implementation example of the paint application. Referring to a top view F32-4, a palette for selecting a pen color by a tap operation is projected on the projection surface 110 as the virtual object V31. As illustrated in a side view F31-4 and the top view F32-4, here assumes a case where the user performs a drag operation on an area (canvas) other than the virtual object V31 on the projection surface 110, and a virtual object V32-3 (picture) is projected on the basis of the drag operation.

Subsequently, as illustrated in a side view F31-4 and the top view F32-4, here assumes a case where the user performs a pointing operation on an area (canvas) other than the virtual object V31 on the projection surface 110, and the pointing/hover determination processing unit 124 has detected the pointing operation.

In such a case, the display control unit 121 performs a process of drawing a picture at the position (trajectory) where the pointing operation has been performed on the canvas, as a process corresponding to the pointing operation. Referring to a side view F33-4 and a top view F34-4, a virtual object V32-4 (picture) drawn by the pointing operation under the control of the display control unit 121 is projected on the projection surface 110 so as to follow the virtual object V32-3 drawn by the drag operation.

(1.2.7.3. Architectural Design Simulation Application)

Figures 37, 38:
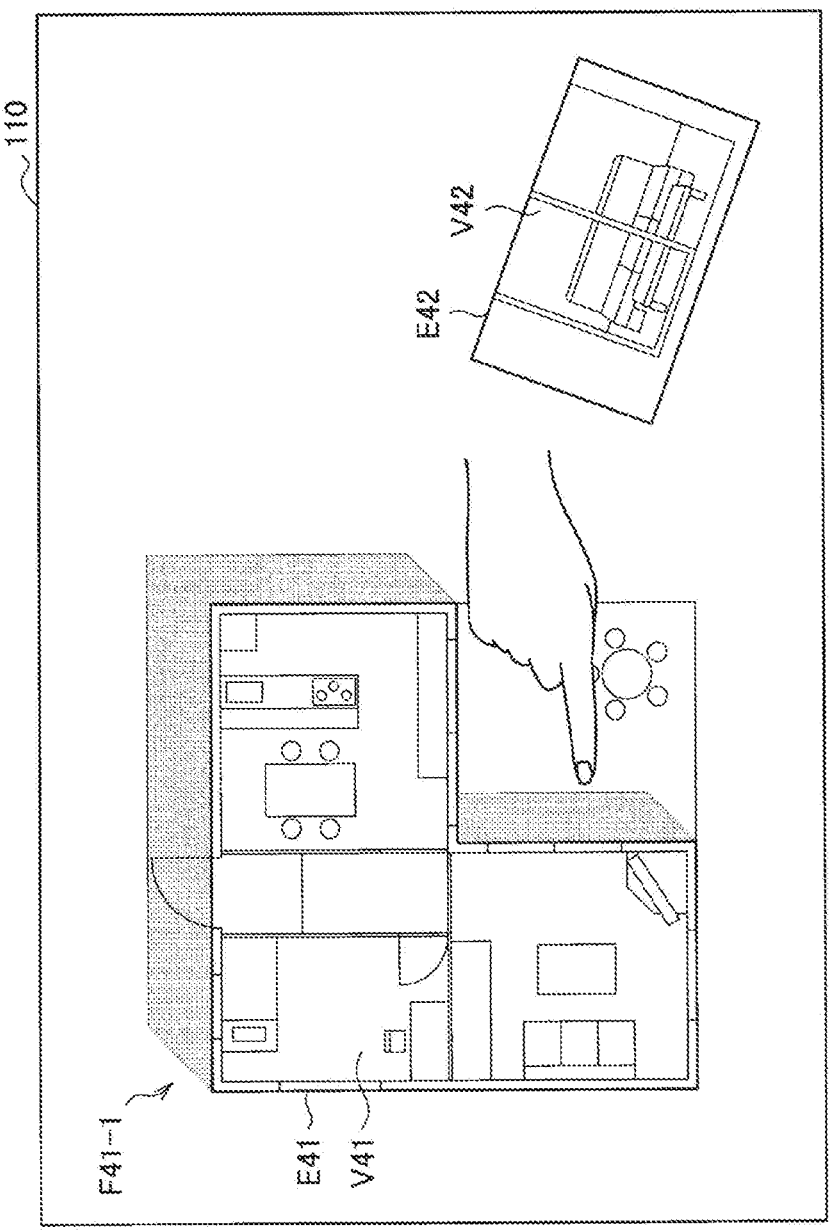
FIG. 37 is a diagram illustrating an example of correspondence information in an implementation example of an architectural design simulation application.
FIG. 38 is a view illustrating an example of a process executed when a tap operation is detected in an implementation example of an architectural design simulation application.

FIG. 37 is a diagram illustrating an example of correspondence information in an implementation example of an architectural design simulation application. As illustrated in FIG. 37, the correspondence information associates a process with each of the tap operation, the drag operation, the hover operation, and the pointing operation. In the architectural design simulation application, a process corresponding to each of operations is executed on the basis of the correspondence information. Hereinafter, an execution example of the process corresponding to each of the tap operation, the drag operation, the hover operation, and the pointing operation will be described with reference to FIGS. 38 to 40.

FIG. 38 is a view illustrating an example of a process executed when a tap operation is detected in an implementation example of the architectural design simulation application. Although here describes a case where a tap operation is performed, the process may be performed in a case where a drag operation is performed, similarly to the case where the tap operation is performed. Referring to a top view F41-1, a real object E41 (model) and a real object E42 (model) are placed on the projection surface 110.

At this time, the position and orientation of the real object E41 (model) are recognized by the input unit 120, and then, a virtual object V41 (building image) is projected (using projection mapping) by the output unit 130 in accordance with the position and orientation of the real object E41 (model). As illustrated in the top view F41-1, here assumes a case where a tap operation is performed on the virtual object V41 (building image) by the user and the tap operation is detected by the tap/drag determination processing unit 123.

In such a case, the display control unit 121 moves a walk-through camera (virtual camera) in accordance with the position and orientation of the tap operation as a process corresponding to the tap operation. Subsequently, as illustrated in the top view F41-1, the display control unit 121 projects (using projection mapping) a virtual object V42 (camera image) from the viewpoint of the position and orientation of the walk-through camera after movement in accordance with the position and orientation of the real object E42 (model).

Figure 39:
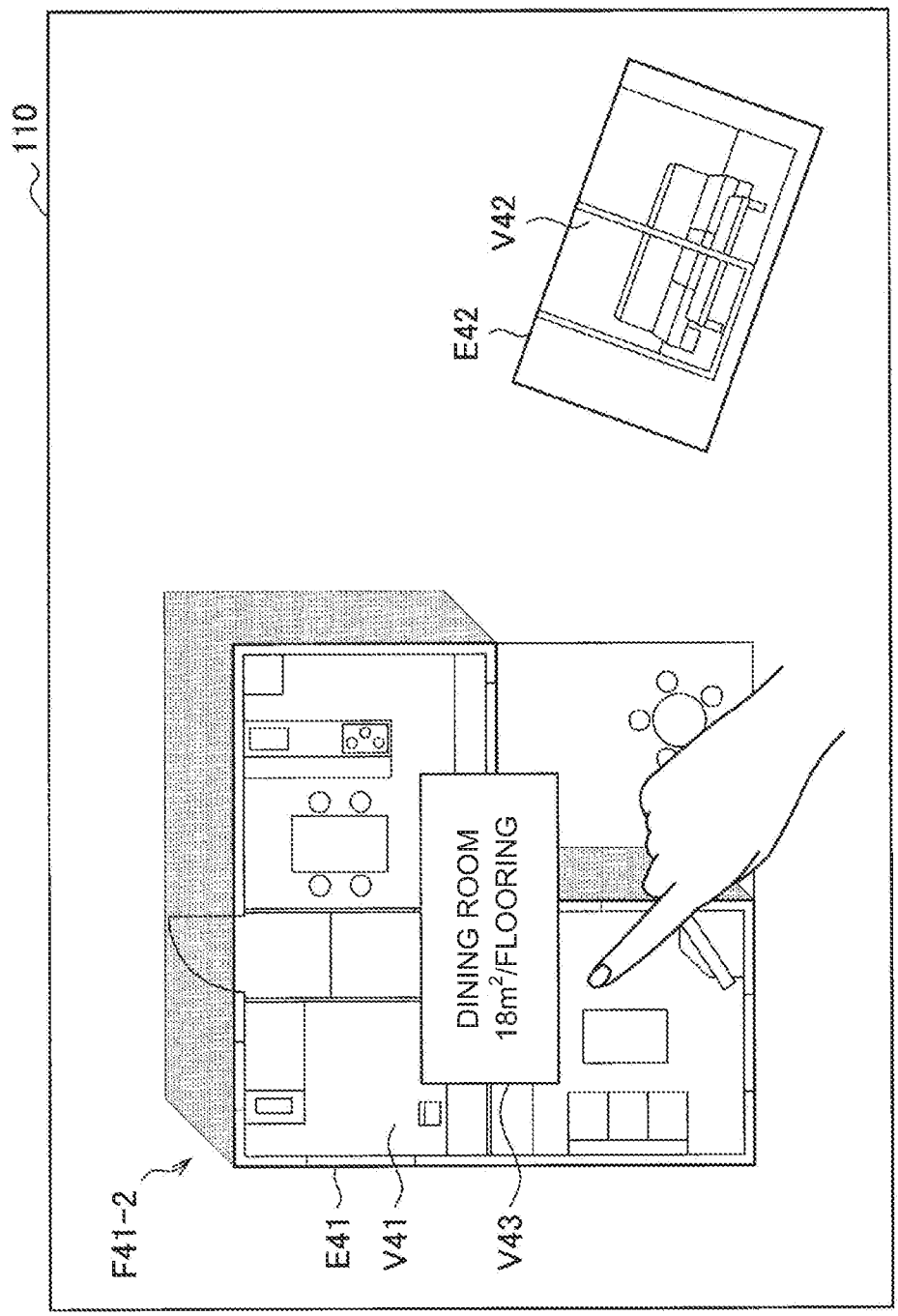
FIG. 39 is a view illustrating a processing execution example when a hover operation is detected in an implementation example of an architectural design simulation application.

FIG. 39 is a view illustrating a processing execution example when a hover operation is detected in an implementation example of the architectural design simulation application. Referring to a top view F41-2, a real object E41 (model) and a real object E42 (model) are placed on the projection surface 110. At this time, similarly to the example illustrated in FIG. 38, the output unit 130 projects (using projection mapping) the virtual object V41 (building image) in accordance with the position and orientation of the real object E41 (model). Furthermore, the output unit 130 projects (using projection mapping) the virtual object V42 (camera image) in accordance with the position and orientation of the real object E42 (model).

As illustrated in the top view F41-2, here assumes a case where a hover operation is performed on the virtual object V41 (photograph) by the user and the hover operation is detected by the pointing/hover determination processing unit 124.

In such a case, as a process corresponding to the hover operation, the display control unit 121 displays information (location information) regarding a location where the hover operation is performed in the virtual object V41 (building image). Referring to the top view F41-2, the information (location information) regarding the location where the hover operation is performed in the virtual object V41 (building image) is projected on the projection surface 110 as the virtual object V43 (location information) under the control of the display control unit 121.

FIG. 40 is a view illustrating an example of a process executed when a pointing operation is detected in an implementation example of the architectural design simulation application. Referring to a top view F41-3, the real object E41 (model) and the real object E42 (model) are placed on the projection surface 110. At this time, similarly to the example illustrated in FIG. 38, the output unit 130 projects (using projection mapping) the virtual object V41 (building image) in accordance with the position and orientation of the real object E41 (model). Furthermore, the output unit 130 projects (using projection mapping) the virtual object V42 (camera image) in accordance with the position and orientation of the real object E42 (model).

As illustrated in the top view F41-3, here assumes a case where a pointing operation is performed on the virtual object V41 (photograph) by the user and the pointing operation is detected by the pointing/hover determination processing unit 124.

In such a case, the display control unit 121 controls to move a virtual light source to a position above the fingertip as a process corresponding to the pointing operation. Subsequently, the display control unit 121 changes the virtual object V41 (building image) so that the illuminating light is emitted from the moved virtual light source, and then projects the virtual object V41 (building image) after the change to the real object E42 (model). Referring to the top view F41-3, the virtual object V41 (building image) with the shadow position changed by the movement of the virtual light source is projected under the control of the display control unit 121.

(1.2.7.4. Breakout Game Application)

FIG. 41 is a diagram illustrating an example of correspondence information in an implementation example of a breakout game application. As illustrated in FIG. 41, in the correspondence information, no process is associated with each of the tap operation and the drag operation, while a process is associated with each of the drag operation and the pointing operation. In the breakout game application, a process corresponding to each of the drag operation and the pointing operation is executed on the basis of the correspondence information. Hereinafter, an execution example of the process corresponding to each of the drag operation and the pointing operation will be described with reference to FIGS. 42 to 45.

Figure 42:
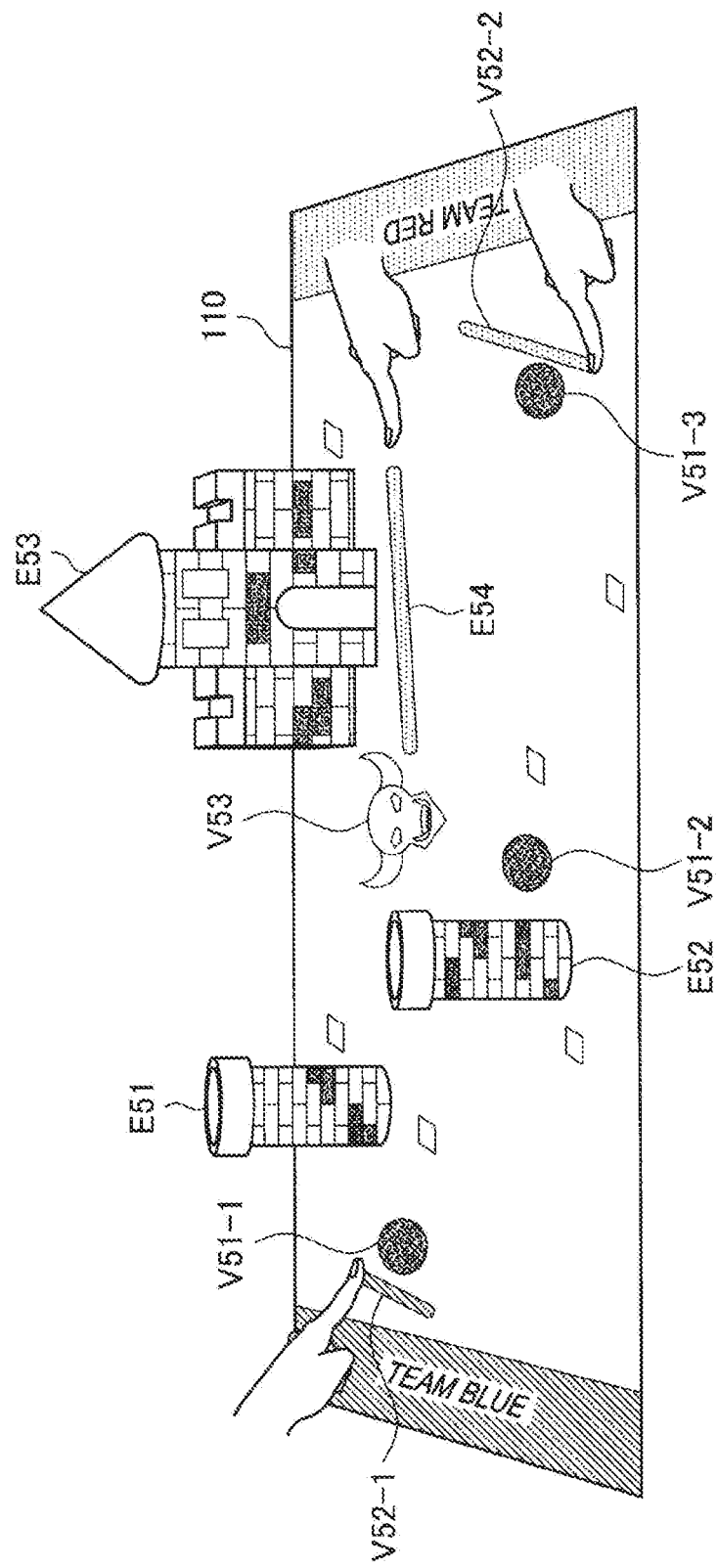
FIG. 42 is a view illustrating an example of a process execution in an implementation example of a breakout game application.

FIG. 42 is a view illustrating an example of a process execution in an implementation example of a breakout game application. Referring to FIG. 42, real objects E51 to E53 (castle wall models) are placed on the projection surface 110. At this time, the input unit 120 recognizes the position and orientation of each of the real objects E51 to E53 (castle wall model), and the output unit 130 projects (using projection mapping) each of virtual objects in accordance with the position and orientation. Furthermore, as illustrated in FIG. 42, the output unit 130 projects virtual objects V51-1 to V51-3 (balls). The virtual objects V51-1 to V51-3 (balls) move on a straight line unless they particularly collide with something.

As illustrated in FIG. 42, here is an assumed case where a drag operation is performed on the projection surface 110 by each of two users, and the drag operation has been detected by the tap/drag determination processing unit 123.

In such a case, the display control unit 121 displays virtual objects V52-1 to V52-2 (paddles) in accordance with the position of the drag operation, as a process corresponding to the drag operation. For example, when the virtual object V51-1 (ball) hits any of the virtual objects V52-1 to V52-2 (paddles), the display control unit 121 controls to move the virtual objects V51-1 to V51-3 (balls) to be reflected (bounced) at the paddle they hit. The virtual objects V51-2 to V51-3 (balls) may move in a similar manner.

Figure 43:
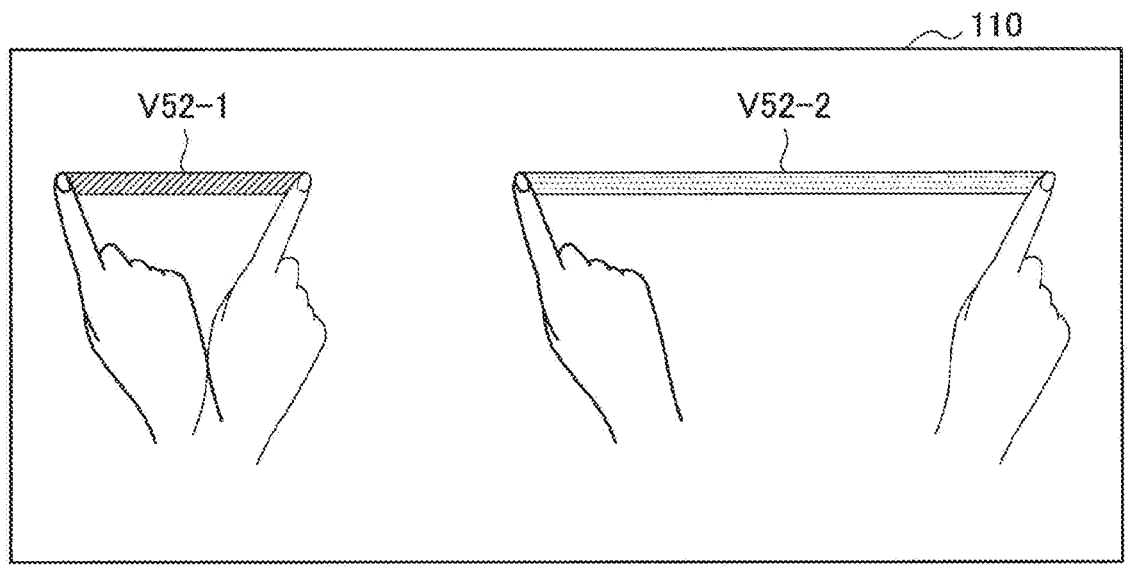
FIG. 43 is a view illustrating a relationship between a paddle and a repulsive force.

FIG. 43 is a view illustrating a relationship between the paddle and the repulsive force. Referring to FIG. 43, a relatively short virtual object V52-1 (paddle) and a relatively long virtual object V52-2 (paddle) are projected. The relatively short virtual object V52-1 (paddle) may have a relatively high repulsive force, but may have a relatively low possibility of hitting a ball. In contrast, the relatively long virtual object V52-2 (paddle) may have a relatively low repulsive force, but may have a relatively high possibility of hitting a ball. Here, when the ball hits any of the real objects E51 to E53 (castle wall models), the wall model hit by the ball will be broken.

Figure 44:
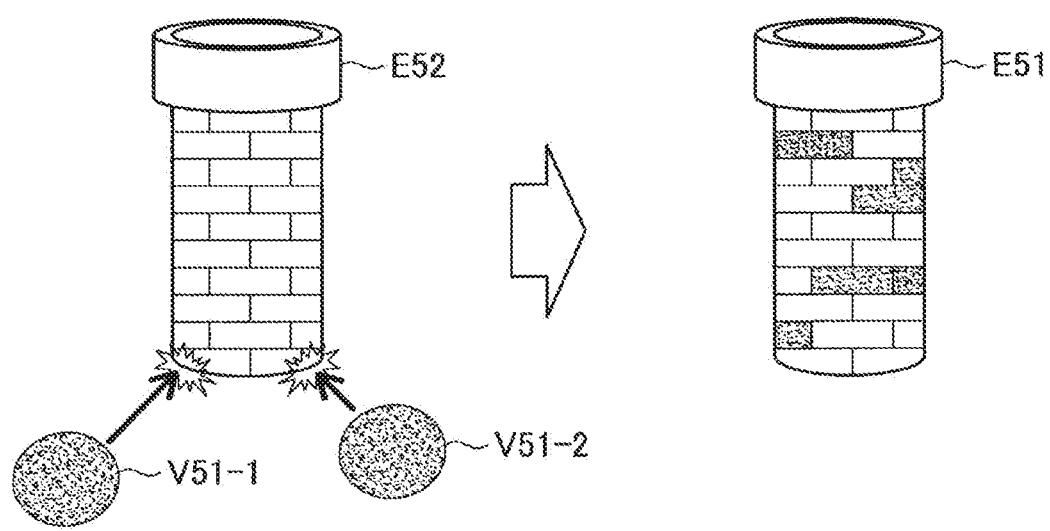
FIG. 44 is a view illustrating a state of breaking a castle wall model hit by a ball.

FIG. 44 is a view illustrating a state of breaking a castle wall model hit by a ball. FIG. 44 illustrates a state where the virtual objects V51-1 to V51-2 (balls) hit the real object E52 (castle wall model). In this manner, in a case where the virtual objects V51-1 to V51-2 (balls) hit the real object E52 (castle wall model), the display control unit 121 may project (using projection mapping) a pattern expressing a breakage on the real object E52 (castle wall model), as illustrated in FIG. 44.

Figure 45:
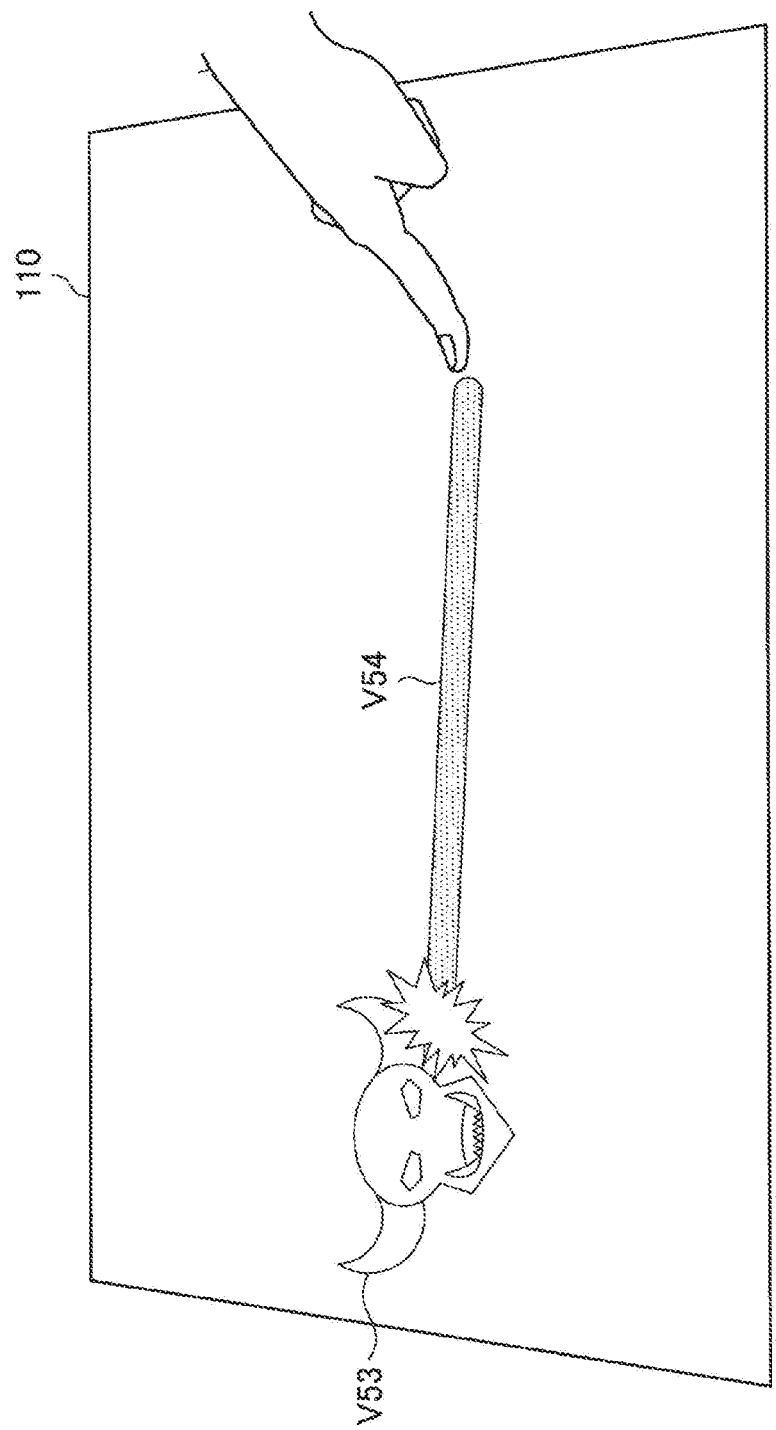
FIG. 45 is a diagram illustrating a state in which an enemy is attacked.

Subsequently, the display control unit 121 may project a virtual object V53 (enemy) running away from the castle wall model when the degree of breakage of the castle wall model exceeds a threshold. At this time, the user may be able to attack the running enemy by pointing operation. FIG. 45 is a diagram illustrating a state in which an enemy is attacked. As illustrated in FIG. 45, here is an assumed case where the user performs a pointing operation on the virtual object V53 (enemy) (in the example illustrated in FIG. 45, the pointing direction is projected as a virtual object V54) and the pointing/hover determination processing unit 124 has detected the pointing operation.

In such a case, the display control unit 121 performs a process of attacking the virtual object V53 (enemy) on which the pointing operation has been performed (that is, a process of damaging the enemy), as a process corresponding to the pointing operation. For example, in a case where the damage received by the enemy exceeds a threshold, the display control unit 121 can judge that the user has won the game (defeated the enemy) and can display an indication that the user has won the game.

(1.2.7.5. Association Game Application)

FIG. 46 is a diagram illustrating an example of correspondence information in an implementation example of an association game application. As illustrated in FIG. 46, the correspondence information associates a process with each of the tap operation, the drag operation, the hover operation, and the pointing operation. In the association game application, a process corresponding to each of the tap operation, the drag operation, the hover operation, and the pointing operation is executed on the basis of the correspondence information. Hereinafter, an execution example of the process corresponding to each of the tap operation, the drag operation, the hover operation, and the pointing operation will be described with reference to FIGS. 47 to 53.

Figure 47:
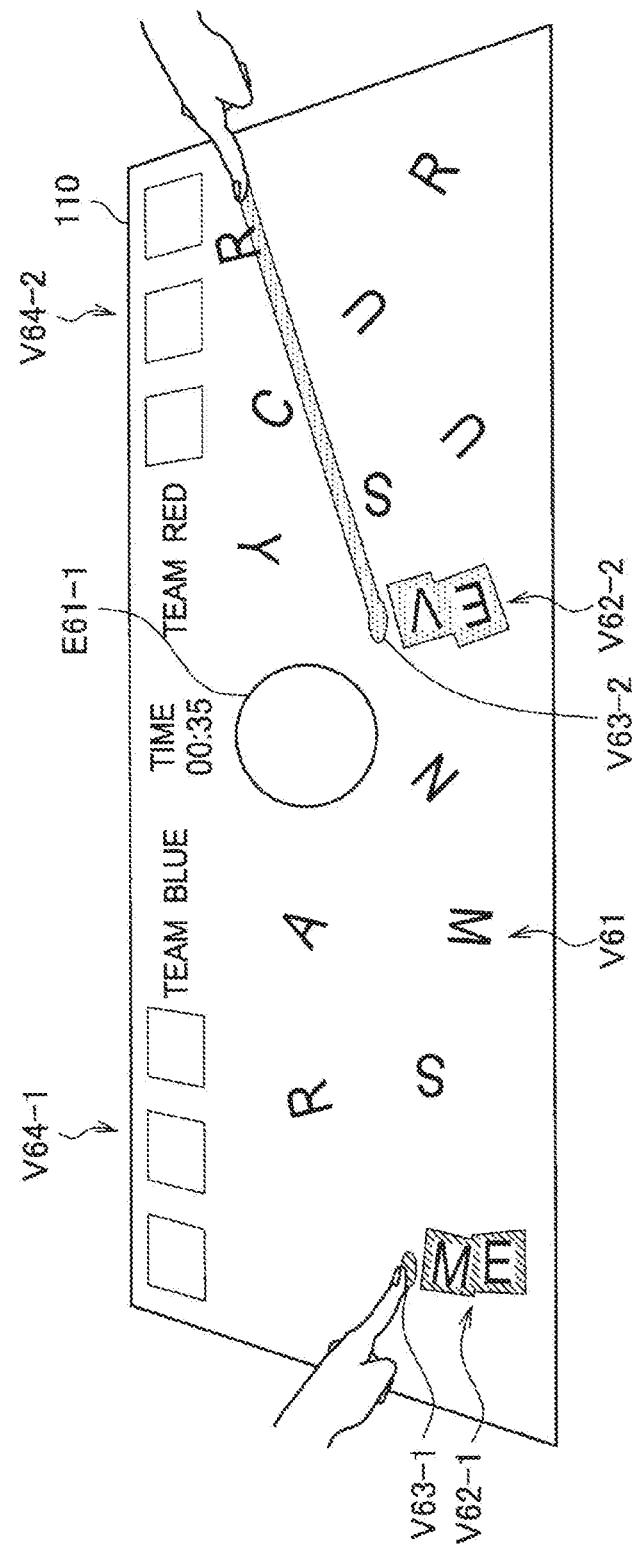
FIG. 47 is a view illustrating an example of a process executed in an implementation example of an association game application.

FIG. 47 is a view illustrating an example of a process executed in an implementation example of an association game application. Referring to FIG. 47, a real object E61-1 (abstract three-dimensional object) is placed on the projection surface 110. At this time, the real object E61-1 (abstract three-dimensional object) is recognized by the input unit 120, and a virtual object V61 (alphabet) corresponding to the abstract three-dimensional object is projected by the output unit 130. Two users compete for the speed in a race of creating a word corresponding to such an abstract three-dimensional object by moving and collecting the alphabets. Here, it is assumed that the word corresponding to the abstract three-dimensional object is "MERCURY".

Figure 48:
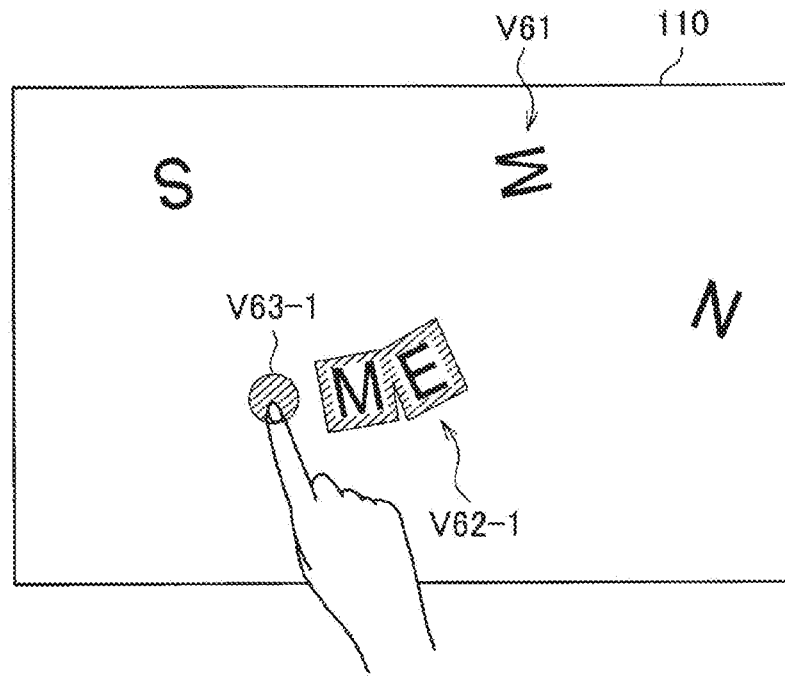
FIG. 48 is a view illustrating an example of moving an alphabet by a drag operation.

FIG. 48 is a view illustrating an example of moving an alphabet by a drag operation. A virtual object V62-1 is alphabets already collected by the first user. A virtual object V63-1 is displayed at the position (trajectory) of the drag operation by the first user. For example, the first user moves the already collected alphabets to the next alphabet to be collected, thereby forming the word corresponding to the abstract three-dimensional object.

The alphabet may be set movable by a tap operation or a pointing operation. Referring to FIG. 47, a virtual object V62-2 is projected as alphabets already collected by the second user, and a virtual object V63-2 is projected at the position of the pointing operation of the second user. In addition, it is allowable to enable the user who wants to know a hint for a word to view the hint for the word, using a hover operation.

Figure 49:
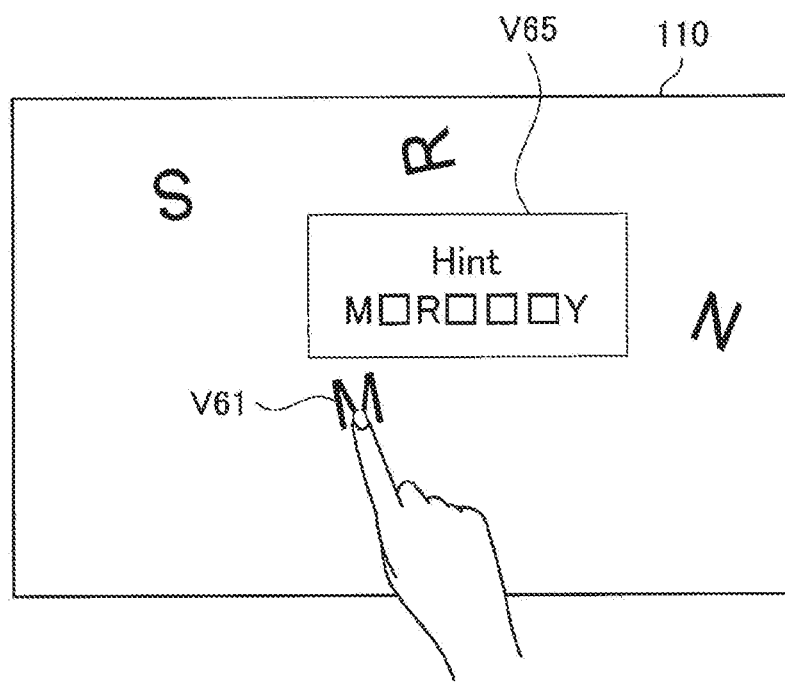
FIG. 49 is a view illustrating an example of displaying a hint by a hover operation.

FIG. 49 is a view illustrating an example of displaying a hint by a hover operation. Referring to FIG. 49, a hover operation is performed on the virtual object V61 (alphabet). At this time, as illustrated in FIG. 49, the display control unit 121 may project a virtual object V65 (hint) for a word. The user moves the collected alphabets to the real object E61-1 (abstract three-dimensional object).

In a case where there is a match between the alphabets collected by the first user and the words corresponding to the abstract three-dimensional object, the display control unit 121 determines that the first user wins, and adds a mark indicating the victory to a virtual object V64-1 (score field). Similarly, in a case where there is a match between the alphabets collected by the second user and the words corresponding to the abstract three-dimensional object, the display control unit 121 determines that the second user wins, and adds a mark indicating the victory to a virtual object V64-2 (score field).

The above has described an example in which the spherical real object E61-1 (abstract three-dimensional object) is placed on the projection surface 110. However, various real objects are assumed as the spherical real objects.

Figure 50:
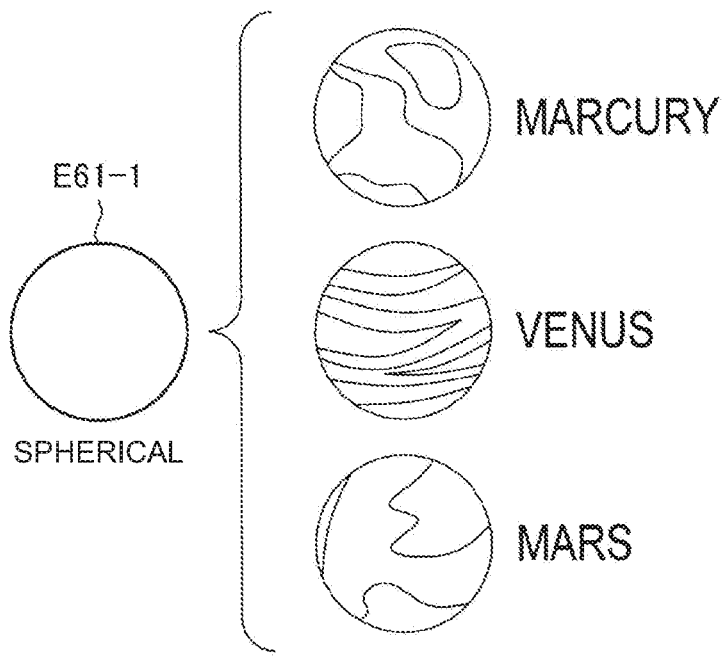
FIG. 50 is a view illustrating an example of a spherical real object.

FIG. 50 is a view illustrating an example of a spherical real object. As illustrated in FIG. 50, assumable examples of the spherical real object include "MERCURY", "VENUS", and "MARS". As described above, it is assumed that "MERCURY" is set as a word corresponding to the spherical real object E61-1 (abstract three-dimensional object). In such a case, although not illustrated in FIG. 47, a question such as "What is a smaller planet than the Earth?" corresponding to the word "MERCURY" may be projected on the projection surface 110.

Figure 51:
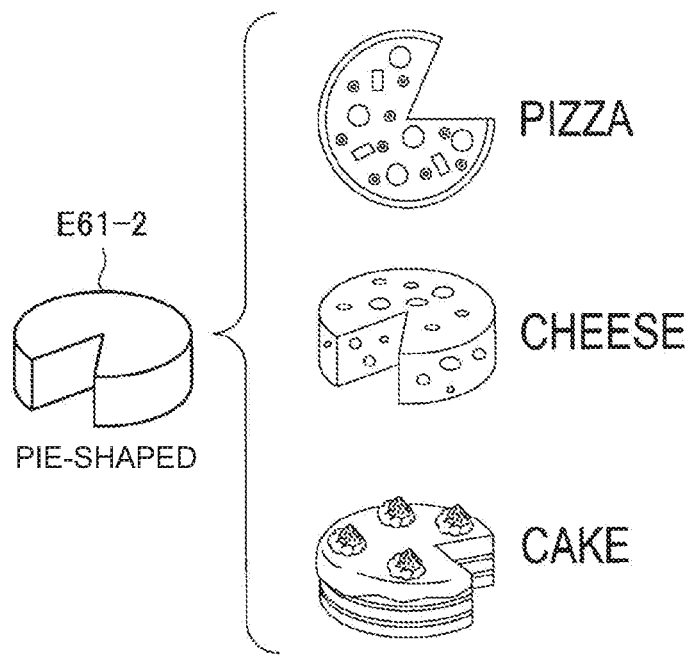
FIG. 51 is a view illustrating an example of a pie-shaped real object.

The shape of the abstract three-dimensional object is not limited to a spherical shape. FIG. 51 is a view illustrating an example of a pie-shaped real object. As illustrated in FIG. 51, examples of a pie-type real object include "PIZZA", "CHEESE", and "CAKE". Here, it is assumed that "CHEESE" is set as a word. In such a case, in a case where a pie-shaped real object E61-2 corresponding to "CHEESE" is placed on the projection surface 110, the question "What is the food of this shape?" may be projected on the projection surface 110.

FIG. 52 is a view illustrating an example of a semicircular real object. As illustrated in FIG. 52, assumable examples of the semicircular real object include "BRIDGE", and "RAINBOW". Here, it is assumed that "RAINBOW" is set as a word. In such a case, in a case where a semicircular real object E61-3 corresponding to "RAINBOW" is placed on the projection surface 110, the question "What is this shaped object?" may be projected on the projection surface 110.

FIG. 53 is a view illustrating an example of a stack type real object. As illustrated in FIG. 53, assumable examples of the stack type real object include "HAMBURGER", "MACARON", and "PANCAKE". Here, it is assumed that "MACARON" is set as a word. In such a case, in a case where a stacked type real object E61-4 corresponding to "MACARON" is placed on the projection surface 110, the question "What is the food of this shape?" may be projected on the projection surface 110.

(1.2.7.6. Word Search Game Search Game Application)

FIG. 54 is a diagram illustrating an example of correspondence information in an implementation example of a word search game application. As illustrated in FIG. 54, in the correspondence information, no process is associated with the drag operation, while a process is associated with each of the tap operation, the drag operation and the pointing operation. In the word search game application, a process corresponding to each of the tap operation, the hover operation, and the pointing operation is executed on the basis of the correspondence information. Hereinafter, an execution example of the process corresponding to each of the tap operation, the hover operation, and the pointing operation will be described with reference to FIGS. 55 to 58.

Figure 55:
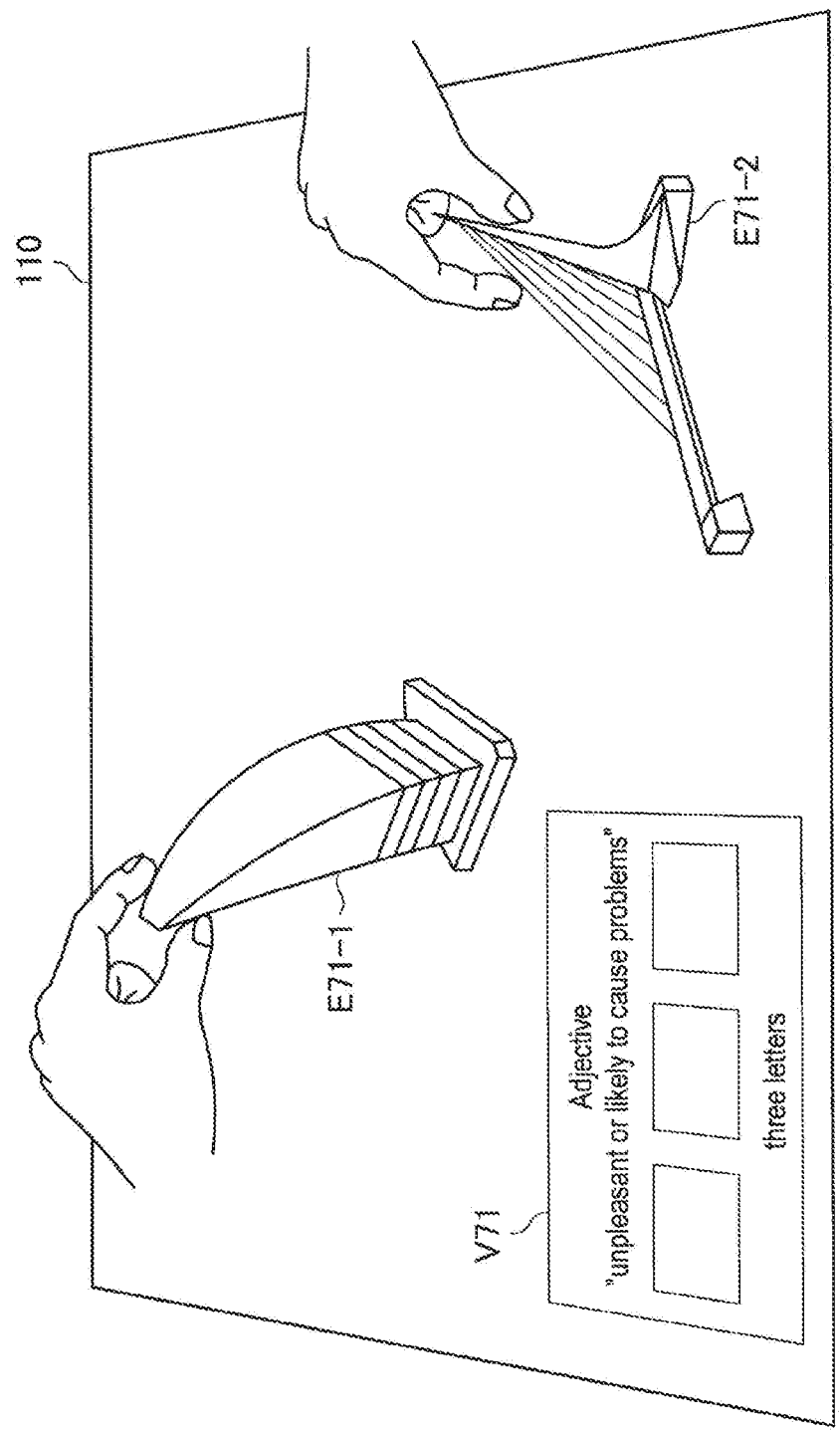
FIG. 55 is a view illustrating an implementation example of a word search game application.

FIG. 55 is a view illustrating an implementation example of the word search game application. Referring to FIG. 55, the output unit 130 projects a virtual object V71 (question). A user creates an answer to such a question by collecting alphabets. Here, it is assumed that the answer to the question is "BAD". Referring to FIG. 55, the user places a real object E71-1 (building model) and a real object E71-2 (building model) on the projection surface 110. At this time, the real object E71-1 (building model) is recognized by the input unit 120.

Figure 56:
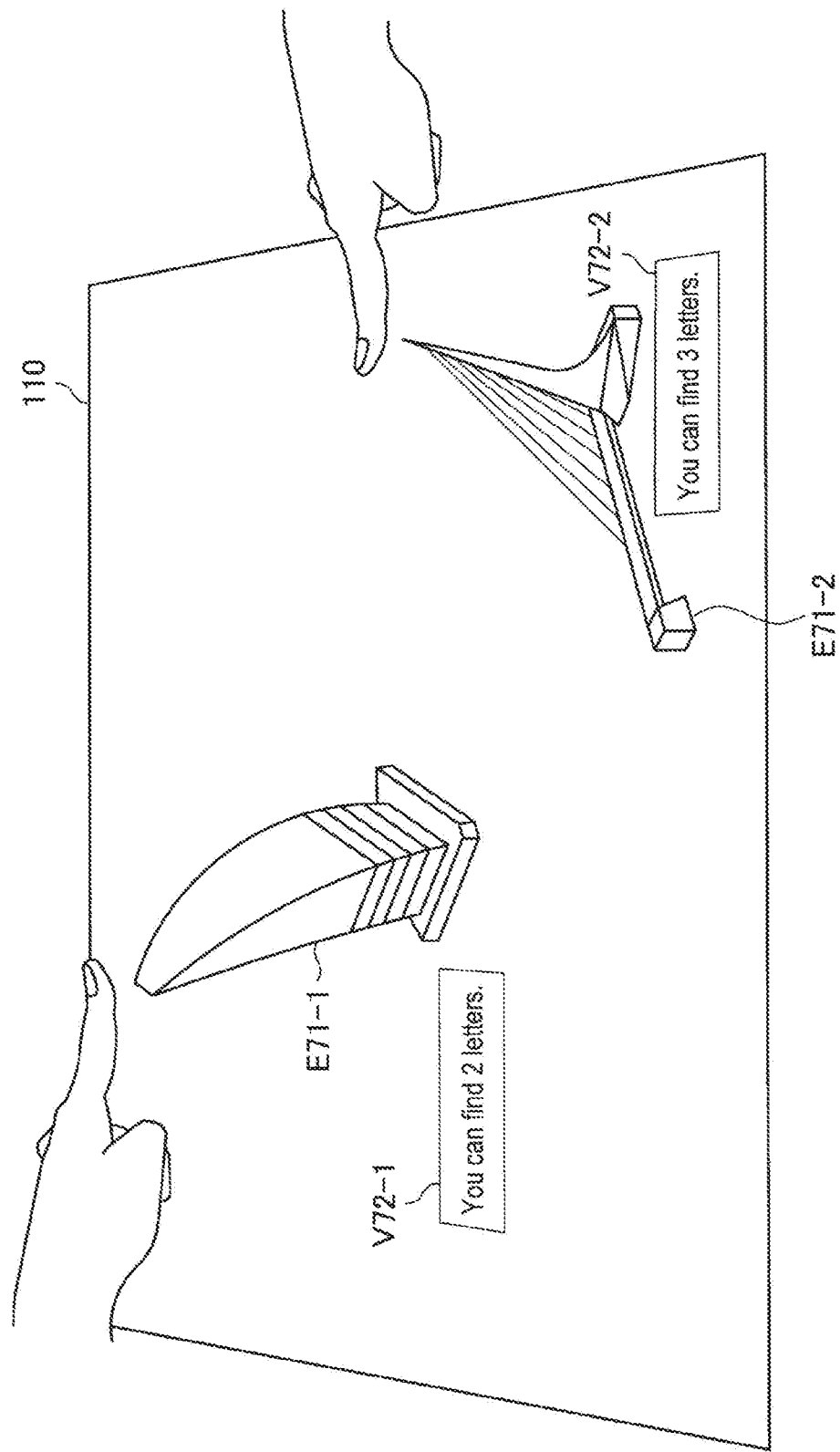
FIG. 56 is a view illustrating an example of displaying a hint by a hover operation.

FIG. 56 is a view illustrating an example of displaying a hint by a hover operation. As illustrated in FIG. 56, in a case where a hover operation is performed on the real object E71-1 (building model), the display control unit 121 projects a virtual object V72-1 (hint) corresponding to the real object E71-1 (building model). Here, the virtual object V72-1 (hint) is the number of alphabets to be found by pointing operation on the real object E71-1 (building model). The pointing operation will be described below.

Moreover, as illustrated in FIG. 56, when a hover operation is performed on the real object E71-2 (building model), the display control unit 121 projects a virtual object V72-2 (hint) corresponding to the real object E71-2 (building model). Here, the virtual object V72-2 (hint) is the number of alphabets to be found by pointing operation on the real object E71-2 (building model).

Figure 57:
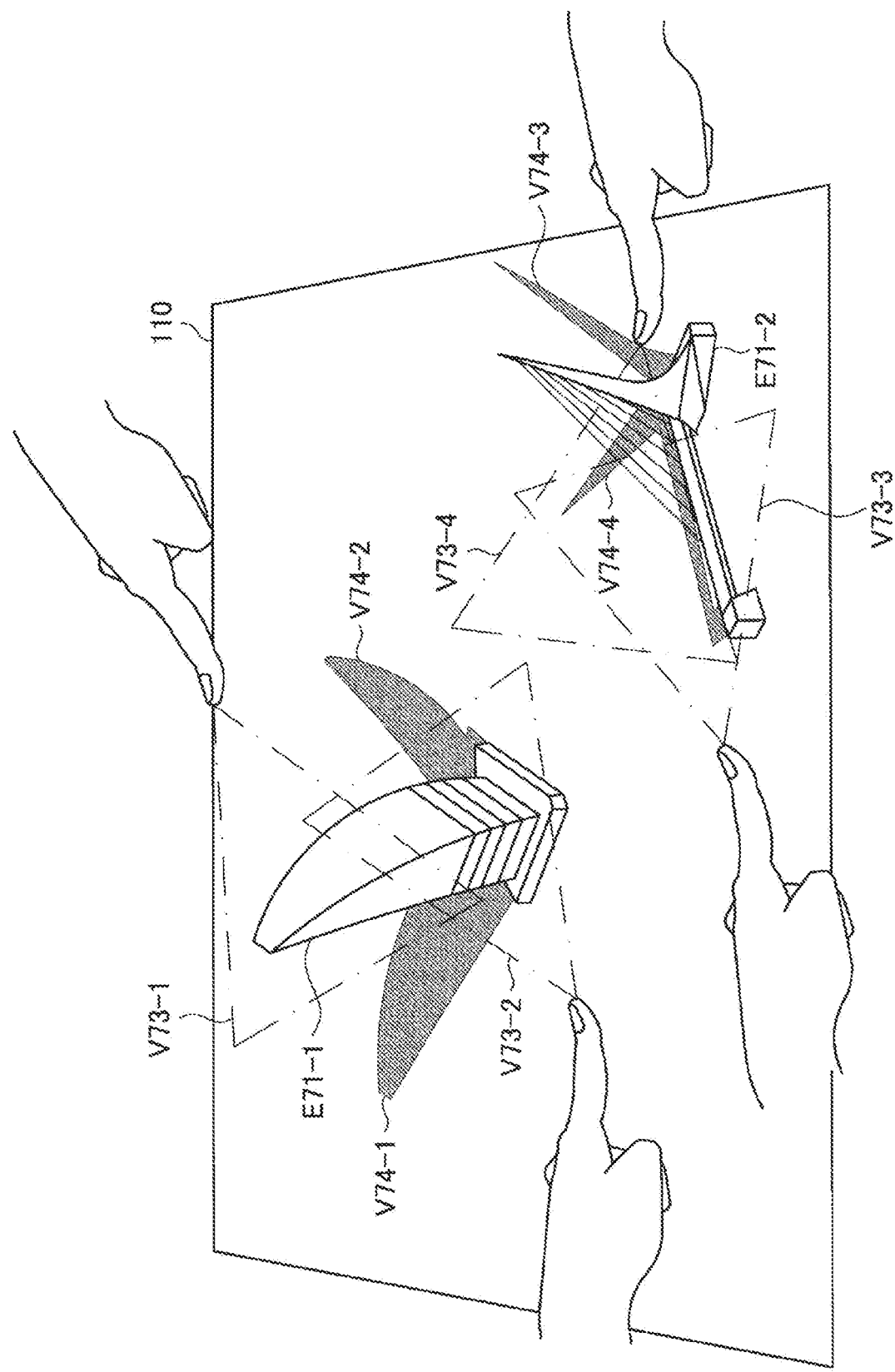
FIG. 57 is a view illustrating an example of displaying a shadow by a pointing operation.
Figure 58:
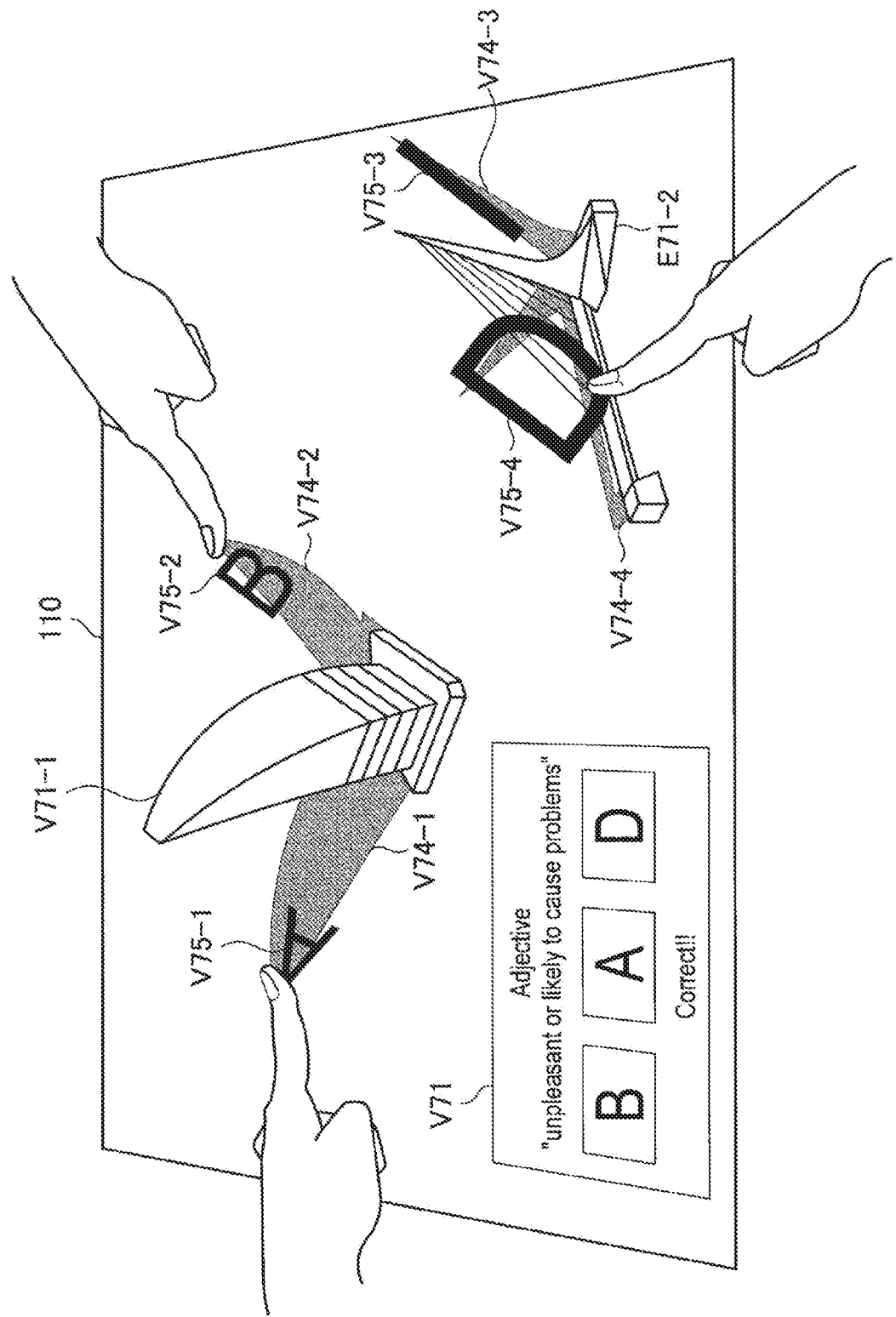
FIG. 58 is a view illustrating an example of selecting an alphabet by a tap operation.

FIG. 57 is a view illustrating an example of displaying a shadow by a pointing operation. As illustrated in FIG. 57, in a case where a pointing operation in a first direction is performed on the real object E71-1 (building model), the display control unit 121 expresses a virtual object V73-1 (light) corresponding to the real object E71-1 (building model) and the first direction, and projects a virtual object V74-1 (shadow) at a position to be a shadow. As will be described below, an alphabet is projected in the shadow portion (FIG. 58).

Similarly, when the pointing operation in a second direction different from the first direction is performed on the real object E71-1 (building model), the display control unit 121 expresses a virtual object V73-1 (light) corresponding to the real object E71-1 (building model) and the second direction, and projects a virtual object V74-2 (shadow) at a position to be a shadow. As will be described below, an alphabet is projected in the shadow portion (FIG. 58).

Similarly, in a case where a pointing operation in a third direction is performed on the real object E71-2 (building model), the display control unit 121 expresses a virtual object V73-3 (light) corresponding to the real object E71-2 (building model) and the third direction, and projects a virtual object V74-3 (shadow) at a position to be a shadow. As will be described below, an alphabet is projected in the shadow portion (FIG. 58).

Similarly, in a case where a pointing operation in a four direction different from the third direction is performed on the real object E71-2 (building model), the display control unit 121 expresses a virtual object V73-4 (light) corresponding to the real object E71-2 (building model) and the fourth direction, and projects a virtual object V74-4 (shadow) at a position to be a shadow. As will be described below, an alphabet is projected in the shadow portion (FIG. 58).

FIG. 58 is a view illustrating an example of selecting an alphabet by a tap operation. As illustrated in FIG. 58, virtual objects V75-1 to V75-4 (alphabets) are projected on virtual objects V74-1 to V74-4 (shadow). When a tap operation is performed on the alphabet, the alphabet on which the tap operation is performed is added to the already collected alphabets. FIG. 58 illustrates an example in which tap operations are performed in the order of the virtual object V75-2 (alphabet indicating B), the virtual object V75-1 (alphabet indicating A), and the virtual object V75-4 (alphabet indicating D), and the user has reached "BAD", an answer to the question.

(1.2.7.7. Music Performance Game Application)

FIG. 59 is a view illustrating an example of correspondence information in an implementation example of a music performance game application. As illustrated in FIG. 59, in the correspondence information, no process is associated with the tap operation, the drag operation, or the hover operation, while a process is associated with the pointing operation. In the music performance game application, a process corresponding to the pointing operation is executed on the basis of the correspondence information. Hereinafter, an execution example of the process corresponding to the pointing operation will be described with reference to FIG. 60.

Figure 60:
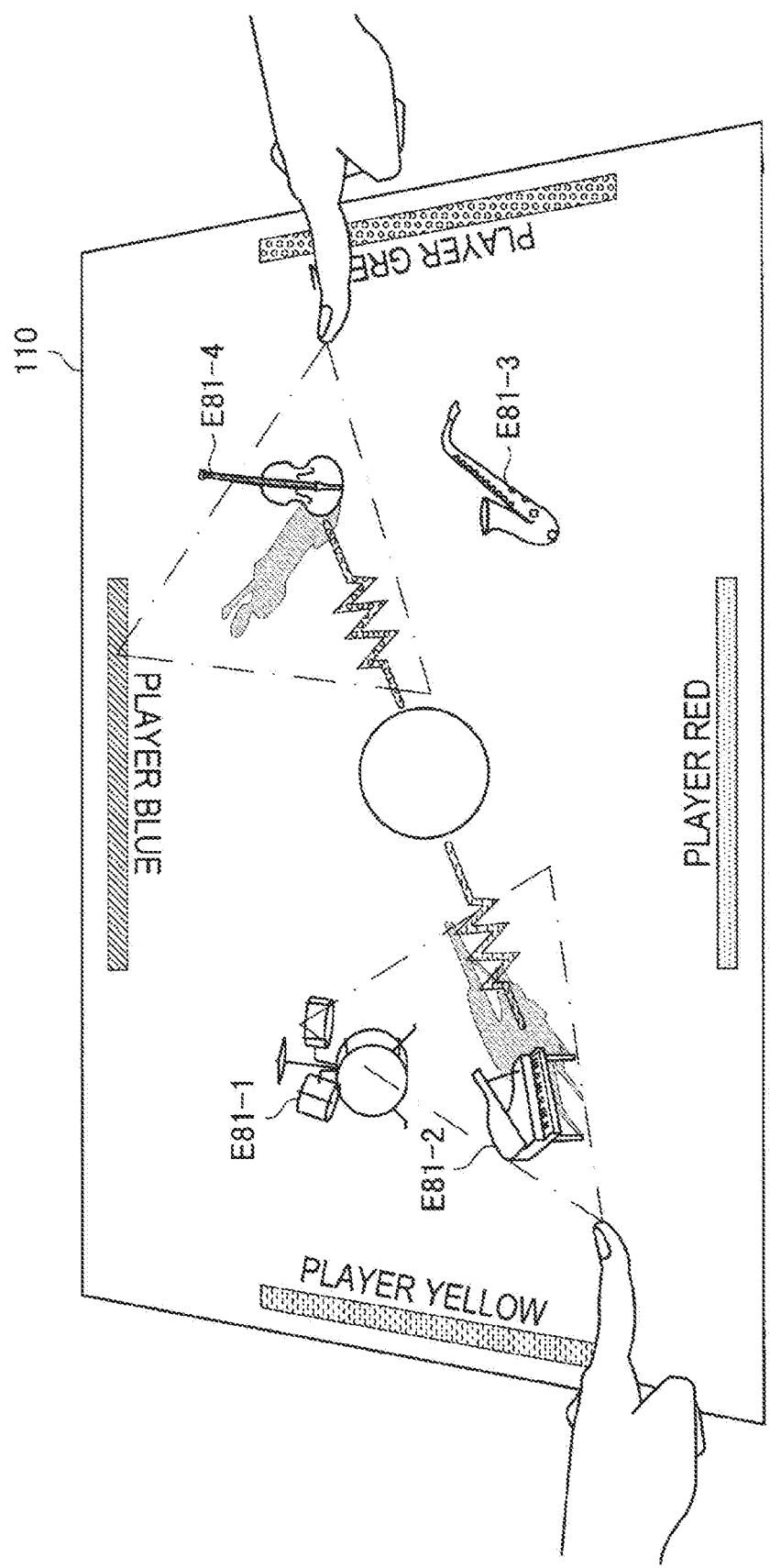
FIG. 60 is a view illustrating an example of correspondence information in an implementation example of a music performance game application.

FIG. 60 is a view illustrating an implementation example of a music performance game application. Referring to FIG. 60, a user places real objects E81-1 to E81-4 (musical instrument models) on the projection surface 110. At this time, the real objects E81-1 to E81-4 (musical instrument models) are recognized by the input unit 120. The user performs a pointing operation on a real object corresponding to the musical instrument from which the user wants to hear a music performance. In the example illustrated in FIG. 60, the user who wants to hear a piano performance performs a pointing operation on the real object E81-2 (piano model), and the user who wants to hear a violin performance performs a pointing operation on the real object E81-4 (violin model).

As illustrated in FIG. 60, the output unit 130 performs expression such that light is emitted from a fingertip to the real object E81-2 (piano model) on which the pointing operation has been performed (also performs expression of a shadow). Furthermore, the output unit 130 outputs a piano performance portion of a certain music piece. Furthermore, the output unit 130 performs expression such that light is emitted from a fingertip to the real object E81-4 (violin model) on which the pointing operation has been performed (also performs expression of a shadow). Furthermore, the output unit 130 outputs a violin performance portion of the music piece.

The implementation example of the applications using one embodiment of the present disclosure has been described above.

[1.3. Hardware Configuration]

Figure 61:
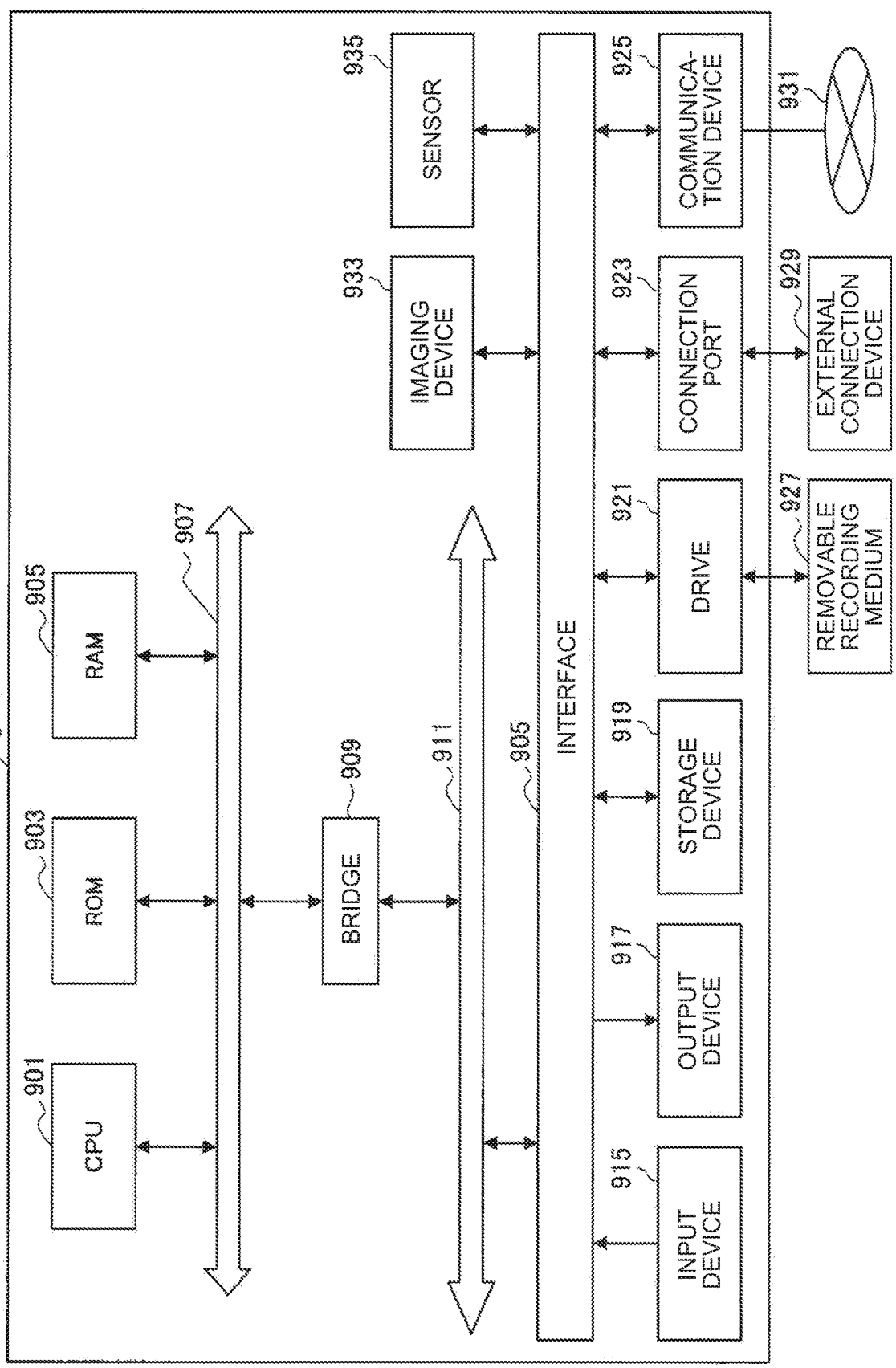
FIG. 61 is a block diagram illustrating a hardware configuration example of an information processing system.

Next, a hardware configuration of the information processing system 100 according to embodiments of the present disclosure will be described with reference to FIG. 61. FIG. 61 is a block diagram illustrating a hardware configuration example of the information processing system 100 according to the embodiment of the present disclosure.

As illustrated in FIG. 61, the information processing system 100 includes a central processing unit (CPU) 901, read only memory (ROM) 903, and random access memory (RAM) 905. The CPU 901, the ROM 903, and the RAM 905 enables implementation of the display control unit 121 and the operation detection processing unit 122. Furthermore, the information processing system 100 may include a host bus 907, a bridge 909, an external bus 911, an interface 913, an input device 915, an output device 917, a storage device 919, a drive 921, a connection port 923, and a communication device 925. Furthermore, the information processing system 100 may include an imaging device 933 and a sensor 935 as necessary. The information processing system 100 may include a processing circuit referred to as a digital signal processor (DSP) or an application specific integrated circuit (ASIC) instead of or together with the CPU 901.

The CPU 901 functions as an arithmetic processing device and a control device, and controls overall or part of operation of the information processing system 100 in accordance with various programs recorded in the ROM 903, the RAM 905, the storage device 919, or the removable recording medium 927. The ROM 903 stores programs, operation parameters, or the like, used by the CPU 901. The RAM 905 temporarily stores a program used in the execution of the CPU 901 and parameters that change as appropriate in the execution. The CPU 901, the ROM 903, and the RAM 905 are mutually connected by the host bus 907 including an internal bus such as a CPU bus. Furthermore, the host bus 907 is connected to an external bus 911 such as a peripheral component interconnect/interface (PCI) bus via the bridge 909.

The input device 915 is a device operated by the user, such as a button, for example. The input device 915 may include a mouse, a keyboard, a touch panel, a switch, a lever, or the like. In addition, the input device 915 may include a microphone that detects a user's sound. For example, the input device 915 may be a remote control device using infrared rays or other radio waves, or may be an external connection device 929 such as a mobile phone corresponding to the operation of the information processing system 100. The input device 915 includes an input control circuit that generates an input signal on the basis of information input by a user and outputs the generated input signal to the CPU 901. By operating the input device 915, the user inputs various types of data or instructs a processing operation to the information processing system 100. Furthermore, the imaging device 933, which will be described below, can also function as an input device by imaging the user's hand movement, the user's finger, or the like. At this time, the pointing position may be determined according to the movement of the hand or the direction of the finger. Note that the input device 915 enables implementation of the input unit 120 described above.

The output device 917 includes devices that can visually or audibly notify the user of acquired information. The output device 917 may be, for example, a display device such as a liquid crystal display (LCD) or an organic electroluminescence (EL) display, or a sound output device such as a speaker and headphones. Furthermore, the output device 917 may include a plasma display panel (PDP), a projector, a hologram, a printer device, or the like. The output device 917 outputs a result obtained by the process of the information processing system 100 as a video such as a text or an image, or outputs sound including voices and acoustics. Furthermore, the output device 917 may include a lighting device or the like for illuminating the surroundings. Note that the output device 917 enables implementation of the output unit 130 described above.

The storage device 919 is a device for data storage provided as an example of a storage unit of the information processing system 100. The storage device 919 includes a magnetic storage device such as a hard disk drive (HDD), a semiconductor storage device, an optical storage device, or a magneto-optical storage device, for example. The storage device 919 stores programs to be executed by the CPU 901 and various types of data, various types of data acquired from the outside, or the like.

The drive 921 is a reader/writer for a removable recording medium 927 such as a magnetic disk, an optical disk, a magneto-optical disk, or a semiconductor memory, and is used as a built in device or an external device of the information processing system 100. The drive 921 reads information recorded on the attached removable recording medium 927 and outputs the read information to the RAM 905. Furthermore, the drive 921 writes a record to the attached removable recording medium 927.

The connection port 923 is a port for directly connecting a device to the information processing system 100. The connection port 923 can be, for example, a universal serial bus (USB) port, an IEEE1394 port, a small computer system interface (SCSI) port, or the like. The connection port 923 may be an RS-232C port, an optical audio terminal, a high-definition multimedia interface (HDMI; registered trademark) port, or the like. Connecting the external connection device 929 to the connection port 923 enables exchange of various types data between the information processing system 100 and the external connection device 929.

The communication device 925 is a communication interface including a communication device for connecting to a network 931, for example. The communication device 925 may be, for example, a communication card for wired or wireless local area network (LAN), Bluetooth (registered trademark), or a wireless USB (WUSB). In addition, the communication device 925 may be a router for optical communication, a router for asymmetric digital subscriber line (ADSL), a modem for various types of communication, or the like. The communication device 925 transmits and receives signals to and from the Internet and other communication devices using a predetermined protocol such as TCP/IP, for example. Furthermore, the network 931 connected to the communication device 925 is a network connected by wire or wireless, and examples of this include the Internet, a home LAN, infrared communication, radio wave communication, and satellite communication.

The imaging device 933 is a device that uses an imaging element such as a charge coupled device (CCD) or a complementary metal oxide semiconductor (CMOS), and various members such as a lens for controlling imaging of a subject image onto the imaging element so as to image the real space and thereby generates a captured image. The imaging device 933 may capture a still image, or may capture a moving image.

The sensor 935 includes, for example, various sensors such as a distance measuring sensor, an acceleration sensor, a gyro sensor, a geomagnetic sensor, a vibration sensor, an optical sensor, and a sound sensor. The sensor 935 acquires information regarding the state of the information processing system 100, such as the posture of a housing of the information processing system 100, and environmental information of the information processing system 100, such as brightness and noise around the information processing system 100. Furthermore, the sensor 935 may include a global positioning system (GPS) sensor that receives a GPS signal and measures the latitude, longitude, and altitude of the device. Note that the sensor 935 enables implementation of the input unit 120 described above.

2. Conclusion

According to the embodiment of the present disclosure, it is possible to realize a spatial operation such as a hover operation or a pointing operation in addition to a planar operation such as a tap operation or a drag operation.

Specifically, according to the embodiment of the present disclosure, it is possible to estimate the intention of the finger floating in a recognition space by sensing, and discriminate whether the operation of the user is a hover operation or a pointing operation.

According to the embodiment of the present disclosure, it is possible to realize an operation system with a low learning cost that would not make the user conscious of details such as the shape of the finger by determining the operation of the user by using the behavioral characteristics of the human. Furthermore, according to the embodiment of the present disclosure, it is possible to adjust a discrimination algorithm so as to obtain a more natural operation system by combining discrimination algorithms for operations of the user in accordance with the environment or the purpose of the application.

The preferred embodiments of the present disclosure have been described in detail above with reference to the accompanying drawings. However, the technical scope of the present disclosure is not limited to such examples. It is obvious that a person having ordinary knowledge in the technological field of the present disclosure can conceive alterations or modifications within the scope of the technical concept described here in the claims, and these, of course, should understandably belong to the technical scope of the present disclosure.

For example, the positions of individual components are not particularly limited as long as the operation of the information processing system 100 described above is achieved. Part of the process of each of components in the information processing system 100 may be performed by a server (not illustrated).

Furthermore, the effects described in the present specification are merely illustrative or exemplary and are not limited. That is, the technology according to the present disclosure can exhibit other effects that are apparent to those skilled in the art from the description of the present specification in addition to or instead of the above effects.

The following configurations also belong to the technological scope of the present disclosure.

(1)
An information processing apparatus comprising a processing unit that determines whether an operation of a user is a pointing operation or a hover operation on a basis of an angle of at least a part of an upper limb of the user.

(2)
The information processing apparatus according to (1),
wherein the processing unit determines whether the operation of the user is a pointing operation or a hover operation on a basis of an angle formed by at least a part of the upper limb and a predetermined vector or a predetermined plane.

(3)
The information processing apparatus according to (2),
wherein the at least a part of the upper limb is at least a part of a hand of the user.

(4)
The information processing apparatus according to (3),
wherein the at least a part of the hand is a vector based on a predetermined position of the hand and a tip position of a first finger.

(5)
The information processing apparatus according to (4),
wherein the predetermined position of the hand is a center position of the hand or a joint position of the first finger.

(6)
The information processing apparatus according to (5),
wherein the predetermined vector or the predetermined plane is a surface of an object indicated by the operation of the user.

(7)
The information processing apparatus according to (5),
wherein the predetermined vector or the predetermined plane is a line-of-sight vector of the user.

(8)
The information processing apparatus according to (4),
wherein the predetermined position of the hand is a joint position of the first finger.

(9)
The information processing apparatus according to (8),
wherein the predetermined vector or the predetermined plane is a vector based on the joint position of the first finger and a center position of the hand.

(10)
The information processing apparatus according to (4),
wherein the predetermined position of the hand is a joint position of the first finger.

(11)
The information processing apparatus according to (10),
wherein the predetermined vector or the predetermined plane is a vector based on the joint position of a second finger and a tip position of the second finger.

(12)
The information processing apparatus according to (2),
wherein the at least a part of the upper limb is at least a part of an arm of the user.

(13)
The information processing apparatus according to (12),
wherein the at least a part of the arm is a vector based on a wrist position and an elbow joint position of the user.

(14)
The information processing apparatus according to (12) or (13),
wherein the predetermined vector or the predetermined plane is a vector based on an upper arm position and an elbow joint position of the user.

(15)
The information processing apparatus according to any one of (1) to (14),
wherein the processing unit determines whether the operation of the user is a pointing operation or a hover operation on a basis of a relationship between the angle and a threshold.

(16)
The information processing apparatus according to any one of (1) to (15), the apparatus further comprising
a control unit that controls a projector so that an object indicated by the operation of the user is to be projected by the projector.

(17)
The information processing apparatus according to any one of (1) to (15), the apparatus further comprising
a control unit that performs control to allow a first process to be executed in a case where the operation of the user is a pointing operation and performs control to allow a second process different from the first process to be executed in a case where the operation of the user is a hover operation.

(18)
The information processing apparatus according to any one of (1) to (17),
wherein a system and an application are executed in the information processing apparatus, and the system notifies the application of an indication position according to whether the operation of the user is a pointing operation or a hover operation.

(19)
The information processing apparatus according to (18), wherein in a case where the operation of the user is a hover operation, the system notifies the application of two-dimensional coordinates of a tip of the first finger in space.

(20)
The information processing apparatus according to (18), wherein in a case where the operation of the user is a pointing operation, the system notifies the application of coordinates on a display surface, indicated by an extension of a tip position of the first finger.

(21)
The information processing apparatus according to any one of (18) to (20),
wherein the system notifies the application of a gesture type indicating whether the operation of the user is a pointing operation or a hover operation.

(22)
The information processing apparatus according to any one of (1) to (17),
wherein a system and an application are executed in the information processing apparatus,
the application designates a gesture type determination condition indicating whether the operation of the user is a pointing operation or a hover operation, and
the system issues, to the application, a notification based on the determination of the gesture type according to the determination condition.

(23)
The information processing apparatus according to (22),
wherein the application designates, as the determination condition, a weight assigned to one or more parameters used for determining the gesture type.

(24)
The information processing apparatus according to (23),
wherein in a case of designating the weight assigned to each of the plurality of parameters as the determination condition, the application sets the weight assigned to each of the plurality of parameters to be mutually different.

(25)
An information processing method comprising
determining whether an operation of a user is a pointing operation or a hover operation on a basis of an angle of at least a part of an upper limb of the user.

(26)
A program for causing a computer to function as
an information processing apparatus including a processing unit that determines whether an operation of a user is a pointing operation or a hover operation on a basis of an angle of at least a part of an upper limb of the user.

REFERENCE SIGNS LIST

10 INFORMATION PROCESSING APPARATUS
100 INFORMATION PROCESSING SYSTEM
110 PROJECTION SURFACE
120 INPUT UNIT
121 DISPLAY CONTROL UNIT
122 OPERATION DETECTION PROCESSING UNIT
123 DRAG DETERMINATION PROCESSING UNIT
124 HOVER DETERMINATION PROCESSING UNIT
125 CORRESPONDENCE INFORMATION ACQUISITION UNIT
130 OUTPUT UNIT

The invention claimed is:
1. An information processing apparatus, comprising:
circuitry configured to:
acquire input information associated with a user, wherein the acquired input information comprises an operation of the user;
determine, based on the input information, an angle between at least a part of an upper limb of the user and one of a first vector or a specific plane, wherein each of the first vector and the specific plane corresponds to a surface of an object indicated by the operation of the user;
determine that the operation of the user is a pointing operation based on the angle that is larger than a threshold angle;
determine that the operation of the user is a hover operation based on the angle that is smaller than the threshold angle; and
control, based on the operation that is one of the pointing operation or the hover operation, execution of a specific process corresponding to the object.

2. The information processing apparatus according to claim 1, wherein at least the part of the upper limb is at least a part of a hand of the user.

3. The information processing apparatus according to claim 2, wherein
at least the part of the hand corresponds to a second vector, and
the second vector is based on a specific position of the hand and a tip position of a first finger of the user.

4. The information processing apparatus according to claim 3,
wherein the specific position of the hand is one of a center position of the hand or a joint position of the first finger.

5. The information processing apparatus according to claim 3,
wherein the specific position of the hand is a joint position of the first finger.

6. The information processing apparatus according to claim 5,
wherein each of the first vector and the specific plane is based on the joint position of the first finger and a center position of the hand.

7. The information processing apparatus according to claim 5,
wherein each of the first vector and the specific plane is based on a joint position of a second finger and a tip position of the second finger.

8. The information processing apparatus according to claim 1,
wherein at least the part of the upper limb is at least a part of an arm of the user.

9. The information processing apparatus according to claim 8, wherein
at least the part of the arm corresponds to a second vector, and
the second vector is based on a wrist position of the user and an elbow joint position of the user.

10. The information processing apparatus according to claim 8,
wherein each of the first vector or the specific plane is based on an upper arm position of the user and an elbow joint position of the user.

11. The information processing apparatus according to claim 1, wherein the circuitry is further configured to control a projector to project the object indicated by the operation of the user.

12. The information processing apparatus according to claim 1, wherein the circuitry is further configured to:
control execution of a first process based on the operation of the user is the pointing operation; and
control execution of a second process different from the first process based on the operation of the user is the hover operation.

13. The information processing apparatus according to claim 1, wherein
the circuitry is further configured to execute a system program and an application program, and
the system program notifies the application program of an indication position based on the operation of the user is one of the pointing operation or the hover operation.

14. The information processing apparatus according to claim 13,
wherein based on the operation of the user is the hover operation, the system program notifies the application program of two-dimensional coordinates of a tip of a first finger of the user in space.

15. The information processing apparatus according to claim 13,
wherein based on the operation of the user is the pointing operation, the system program notifies the application program of coordinates on a display surface, indicated by an extension of a tip position of a first finger of the user.

16. The information processing apparatus according to claim 13,
wherein the system program notifies the application program of a gesture type operation that indicates the operation of the user is one of the pointing operation or the hover operation.

17. The information processing apparatus according to claim 1, wherein
the circuitry is further configured to execute a system program and an application program,
the application program designates a gesture type determination condition that indicates the operation of the user is one of the pointing operation or the hover operation, and
the system program issues, to the application program, a notification of a gesture type operation based on the designation of the gesture type determination condition.

18. The information processing apparatus according to claim 17, wherein
the application program designates, as the gesture type determination condition, a weight assigned to at least one parameter, and
the application program determines the gesture type operation based on the designation of the weight assigned to the at least one parameter.

19. The information processing apparatus according to claim 18,
wherein based on the designation of the weight assigned to the at least one parameter as the gesture type determination condition, the application program sets the weight assigned to each of a plurality of parameters to be mutually different.

20. An information processing method, comprising:
acquiring input information associated with a user, wherein the acquired input information comprises an operation of the user;
determining, based on the input information, an angle between at least a part of an upper limb of the user and one of a specific vector or a specific plane, wherein each of the specific vector and the specific plane corresponds to a surface of an object indicated by the operation of the user;
determining that the operation of the user is a pointing operation based on the angle that is larger than a threshold angle;
determining that the operation of the user is a hover operation based on the angle that is smaller than the threshold angle; and
controlling, based on the operation that is one of the pointing operation or the hover operation, execution of a specific process corresponding to the object.

21. A non-transitory computer-readable medium having stored thereon computer-executable instructions which, when executed by circuitry of an information processing apparatus, cause the circuitry to execute operations, the operations comprising:
acquiring input information associated with a user, wherein the acquired input information comprises an operation of the user;
determining, based on the input information, an angle between at least a part of an upper limb of the user and one of a specific vector or a specific plane, wherein each of the specific vector and the specific plane corresponds to a surface of an object indicated by the operation of the user;
determining that the operation of the user is a pointing operation based on the angle that is larger than a threshold angle;
determining that the operation of the user is a hover operation based on the angle that is smaller than the threshold angle; and
controlling, based on the operation that is one of the pointing operation or the hover operation, execution of a specific process corresponding to the object.

* * * * *